US012698678B2

(12) United States Patent
Casey et al.

(10) Patent No.: US 12,698,678 B2
(45) Date of Patent: Aug. 4, 2026

(54) IMPACTABLE GATE SYSTEMS AND APPARATUS

(71) Applicant: Rite-Hite Holding Corporation, Milwaukee, WI (US)

(72) Inventors: Nicholas John Casey, Cascade, IA (US); Jason T. Dondlinger, Bellevue, IA (US); Tony W. Duesing, Bellevue, IA (US); Joseph D. Korman, Dubuque, IA (US); Michael John Sahm, Dubuque, IA (US)

(73) Assignee: Rite-Hite Holding Corporation, Milwaukee, WI (US)

( * ) Notice: Subject to any disclaimer, the term of this patent is extended or adjusted under 35 U.S.C. 154(b) by 44 days.

(21) Appl. No.: 18/760,915

(22) Filed: Jul. 1, 2024

(65) Prior Publication Data

US 2025/0003289 A1 Jan. 2, 2025

Related U.S. Application Data

(60) Provisional application No. 63/511,124, filed on Jun. 29, 2023.

(51) Int. Cl.
*E06B 11/02* (2006.01)

(52) U.S. Cl.
CPC .................................. *E06B 11/025* (2013.01)

(58) Field of Classification Search
CPC ........... E06B 11/025; E06B 11/00; E06B 3/80
See application file for complete search history.

(56) References Cited

U.S. PATENT DOCUMENTS 5,271,183 A * 12/1993 Hahn .................... E05F 15/665 49/73.1
5,564,238 A * 10/1996 Ellis ..................... B65G 69/008 49/447
5,617,697 A * 4/1997 Erwin ....................... E04C 3/29 52/843
5,649,396 A * 7/1997 Carr ........................ E01F 13/06 49/34
5,701,701 A * 12/1997 Desrosiers ................ E05C 1/12 49/73.1
5,755,064 A * 5/1998 Meyer ...................... E04H 6/025 52/169.9
5,862,642 A * 1/1999 Erwin ..................... E04H 17/20 52/832

(Continued)

OTHER PUBLICATIONS

International Searching Authority, "Search Report," issued in connection with International Patent Application No. PCT/US2024/036402, mailed on Sep. 30, 2024, 4 pages.

(Continued)

*Primary Examiner* — Muhammad Ijaz
*Assistant Examiner* — Susan M. Heschel
(74) *Attorney, Agent, or Firm* — Hanley, Flight & Zimmerman, LLC

(57) ABSTRACT

Example impactable gate systems disclosed herein include a track to be coupled to a base post, a drive strip slidable along the track, a rail including a tube, the rail to move with the drive strip relative to the track between an opened position and a closed position, and a bracket to be disposed within the track, the bracket to couple the rail to the drive strip, the bracket to be disposed within the base post when the rail is in the closed position.

22 Claims, 41 Drawing Sheets

(56) References Cited

U.S. PATENT DOCUMENTS

| | | | | |
|---|---|---|---|---|
| 6,279,276 | B1 * | 8/2001 | Knoll | B65G 69/2876 160/205 |
| 8,955,265 | B1 * | 2/2015 | Harkrader | B65G 69/008 52/173.2 |
| 2004/0231806 | A1 * | 11/2004 | Leum | E06B 11/00 160/113 |
| 2007/0277942 | A1 | 12/2007 | Dondlinger et al. | |
| 2011/0302844 | A1 * | 12/2011 | Morey | E05D 15/16 49/360 |
| 2018/0238101 | A1 * | 8/2018 | Monaghan | E06B 7/16 |

OTHER PUBLICATIONS

International Searching Authority, "Written Opinion," issued in connection with International Patent Application No. PCT/US2024/036402, mailed on Sep. 30, 2024, 9 pages.

Rite-Hite Holding Corporation, "RacKeeper Safety Gate," accessed on Jun. 26, 2024, available at https://www.ritehite.com/en/am/products/barrier-safety-systems/mezzanine-and-platform-barriers/rackeeper, 3 pages.

Rite-Hite Holding Corporation, "FasTrax Doors," accessed on Jun. 26, 2024, available at https://www.ritehite.com/en/am/products/industrial-doors/high-speed-doors/fastrax, 2 pages.

Rite-Hite Holding Corporation, "GateKeeper Mezzanine Safety Gate," accessed on Jun. 26, 2024, available at https://www.ritehite.com/en/am/products/barrier-safety-systems/mezzanine-and-platform-barriers/gatekeeper, 3 pages.

International Searching Authority, "International Preliminary Report on Patentability," issued in connection with International Patent Application No. PCT/US2024/036402, mailed on Jan. 8, 2026, 9 pages.

* cited by examiner

IMPACTABLE GATE SYSTEMS AND APPARATUS

RELATED APPLICATION

This patent claims the benefit of U.S. Provisional Patent Application No. 63/511,124, titled "Impactable Gate Systems and Apparatus," filed on Jun. 29, 2023. U.S. Provisional Patent Application No. 63/511,124 is hereby incorporated herein by reference in its entirety. Priority to U.S. Provisional Patent Application No. 63/511,124 is hereby claimed.

FIELD OF THE DISCLOSURE

This disclosure relates generally to gates and, more particularly, to impactable gate systems and apparatus.

BACKGROUND

Gates are used in various industrial settings to selectively permit access to certain areas. For example, a gate (e.g., a vertically retractable gate) can be installed at a loading dock where cargo is loaded/unloaded from a trailer using a vehicle (e.g., forklift). As the vehicle drives toward the loading dock, the gate can open to provide access.

BRIEF DESCRIPTION OF THE DRAWINGS

FIG. 7B is a top view of the bracket of FIG. 7A taken along line B-B in

FIG. 1A.

Figure 1A:
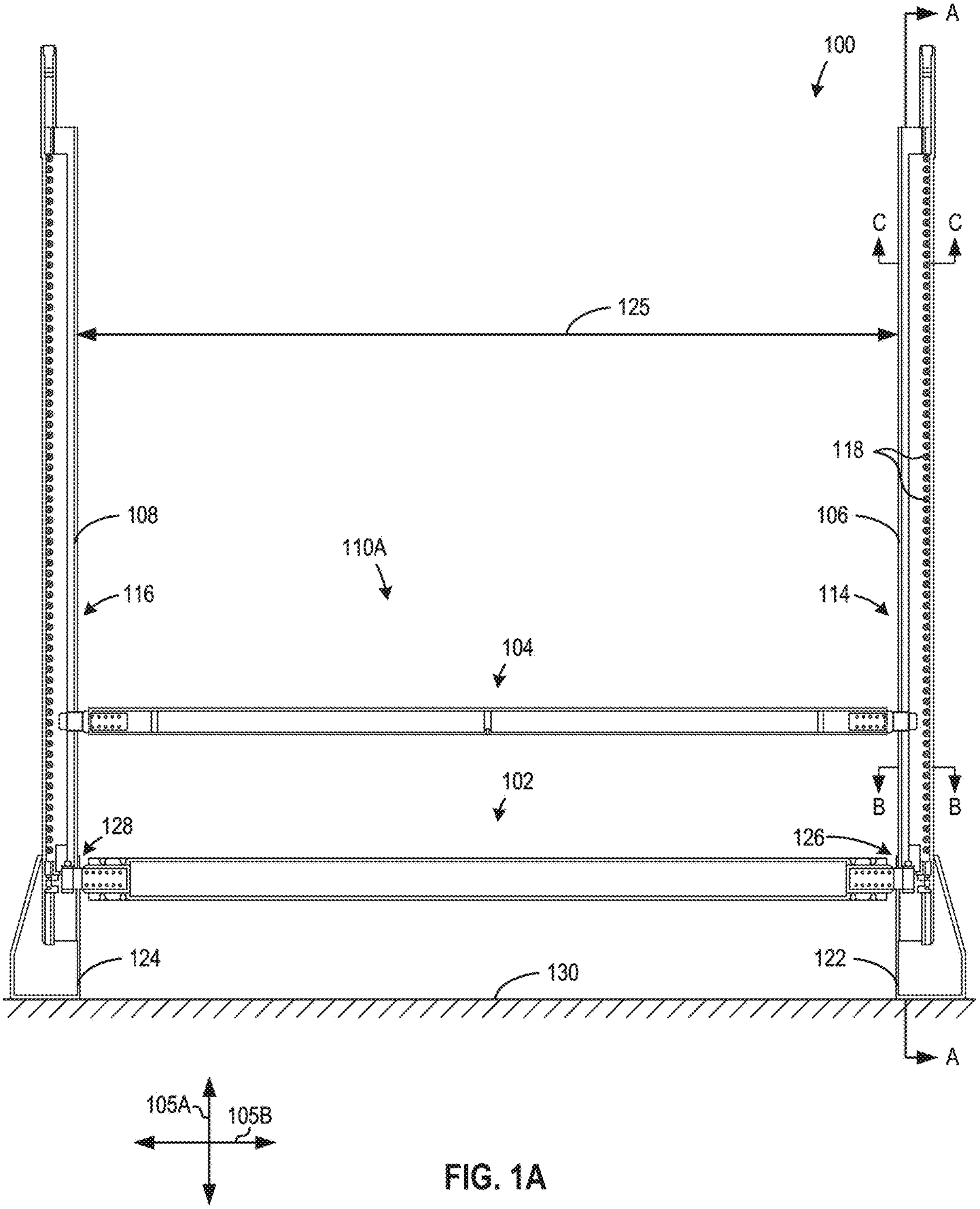
FIG. 1A is a cross-sectional front view of an example impactable gate in a closed position in accordance with teachings disclosed herein.

Certain examples are shown in the above-identified figures and described in detail below. In describing these examples, like or identical reference numbers are used to identify the same or similar elements. The figures are not necessarily to scale and certain features and certain views of the figures can be shown exaggerated in scale or in schematic for clarity and/or conciseness. Additionally, several examples have been described throughout this specification.

Any features from any example can be included with, a replacement for, or otherwise combined with other features from other examples.

As used in this patent, stating that any part is in any way positioned on (e.g., located on, disposed on, formed on, coupled to, etc.) another part, means that the referenced part is either in contact with the other part, or that the referenced part is spaced from the other part with one or more intermediate part(s) located therebetween. Stating that any part is in contact with another part means that there is no intermediate part between the two parts. Connection references (e.g., attached, coupled, connected, joined, detached, decoupled, disconnected, separated, etc.) are to be construed broadly and may include intermediate members between a collection of elements and relative movement between elements unless otherwise indicated. As used herein, the term "decouplable" refers to the capability of two parts to be attached, connected, and/or otherwise joined and then be detached, disconnected, and/or otherwise non-destructively separated from each other (e.g., by removing one or more fasteners, removing a connecting part, etc.). As such, connection/disconnection references do not necessarily infer that two elements are directly connected and in a permanently fixed relation to each other.

Descriptors "first," "second," "third," etc., are used herein when identifying multiple elements or components which may be referred to separately. Unless otherwise specified or understood based on their context of use, such descriptors are not intended to impute any meaning of priority, physical order or arrangement in a list, or ordering in time but are merely used as labels for referring to multiple elements or components separately for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for ease of referencing multiple elements or components.

DETAILED DESCRIPTION

Example impactable gate systems or apparatus disclosed herein can withstand impacts from industrial vehicles. Furthermore, example gates disclosed herein can be electrically powered. For example, disclosed impactable gates can open and close automatically based on input signals (e.g., remote signal(s), motion detection, etc.) to an operating system including a motor. Additionally or alternatively, disclosed impactable gates can be opened and/or closed manually. In some examples, impactable gates disclosed herein are vertically acting gates, where the impactable gates move in a vertical direction (e.g., substantially orthogonal to the ground) between open and closed positions. In some examples, the magnitude(s) of force that the impactable gates can withstand is modifiable based on configurations of rail and post assemblies.

Example impactable gates disclosed herein include one or more example rails to selectively block and/or enable traffic through the impactable gates. In some examples, an impactable gate includes an example brace (e.g., a brace assembly) internal to a rail to augment strength of the rail in the vertical direction (e.g., substantially orthogonal to the floor) while allowing flexibility of the rail in the horizontal direction (e.g., substantially parallel to the floor, perpendicular to the vertical direction). In some examples, the brace is constructed of pieces of round tube attached to a flat material. The round tube can be used to facilitate positioning of the brace assembly inside the rail, and the flat material can be oriented to lie in a vertical plane (e.g., substantially orthogonal to the floor) along the rail to provide strength in the vertical direction. As a result of the relatively smaller thickness of the flat material in the horizontal direction (e.g., relative to the vertical direction), the flat material can flex without fracturing and/or permanently deforming. In some examples, a configuration of the brace assembly can vary based on the size and/or the length of the rail.

Example impactable gates disclosed herein include one or more example brackets to provide a connection between a rail and a post. For example, the rail can be coupled (e.g., pinned) to the bracket, and the bracket can be attached to a drive strip and/or another object that moves the rail. In some examples, the bracket fits within the post to create a load bearing support when the rail is impacted, and the bracket is able to move freely from the post. In some examples, when the rail is impacted, the bracket contacts the post to inhibit bending of the rail and/or restrict forward movement of the impacting vehicle. In some examples, the pinned connection between the rail and the bracket provides flexibility to the rail, which increases the impact force example impactable gates are able to withstand (e.g., before fracturing and/or deformation occur).

Example impactable gates disclosed herein include an example trolley (e.g., a spring-loaded trolley) to guide the rail along a track. In some examples, the trolley can retain a position of the rail as the impactable gate moves between a raised position (e.g., an open position, an unblocking position) and a lowered position (e.g., a closed position, a blocking position). Furthermore, the trolley can enable additional movement of the rail during an impact. In some examples, the bracket rides inside of a primary channel of the track and the trolley rides inside of a secondary channel of the track, where the secondary track is inside the primary channel. In some examples, the bracket rides outside of the track, but is disposed within the post when the rail is in the lowered (e.g., blocking) position.

Figure 1B:
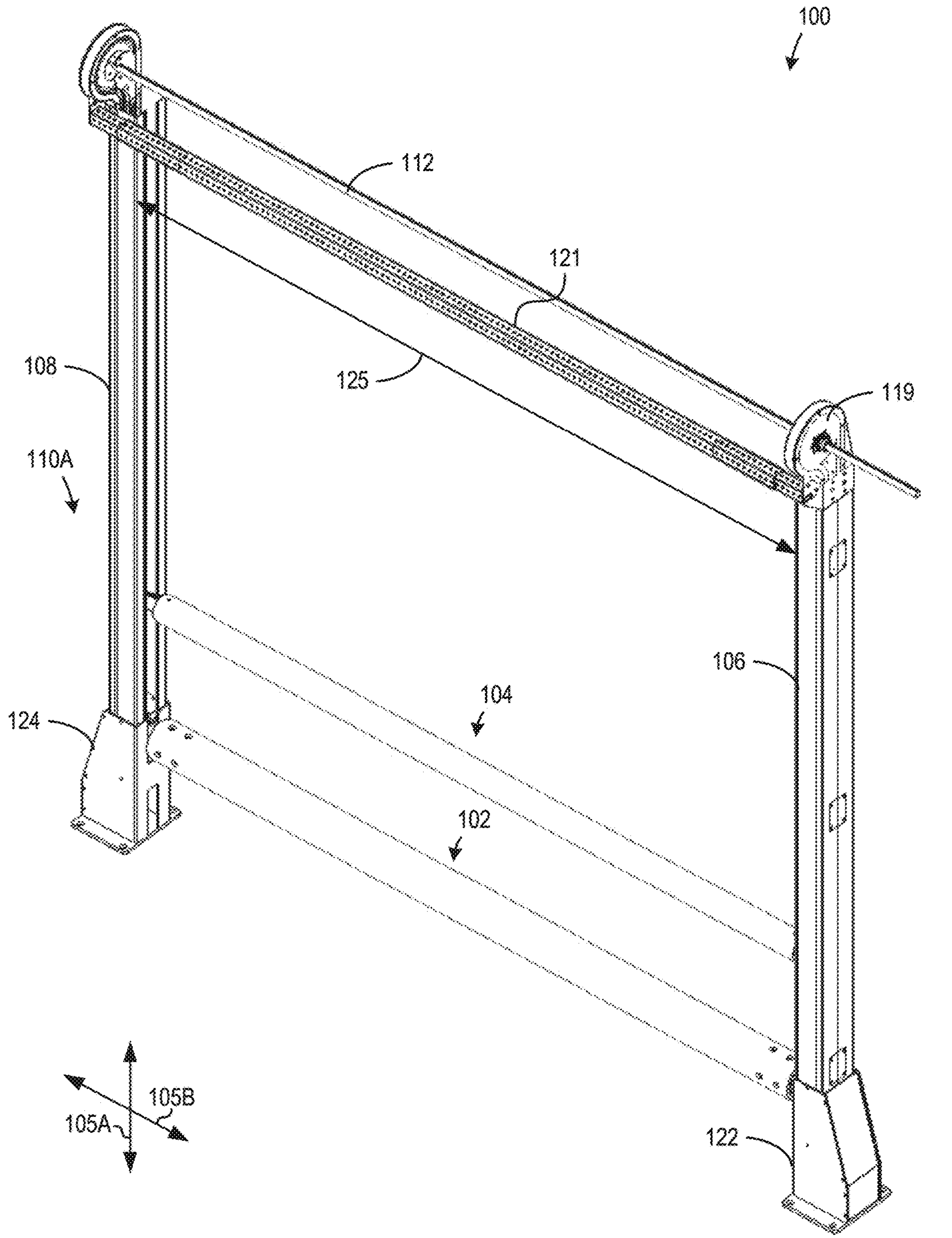
FIG. 1B is a perspective view of the impactable gate of FIG. 1A.
Figure 1C:
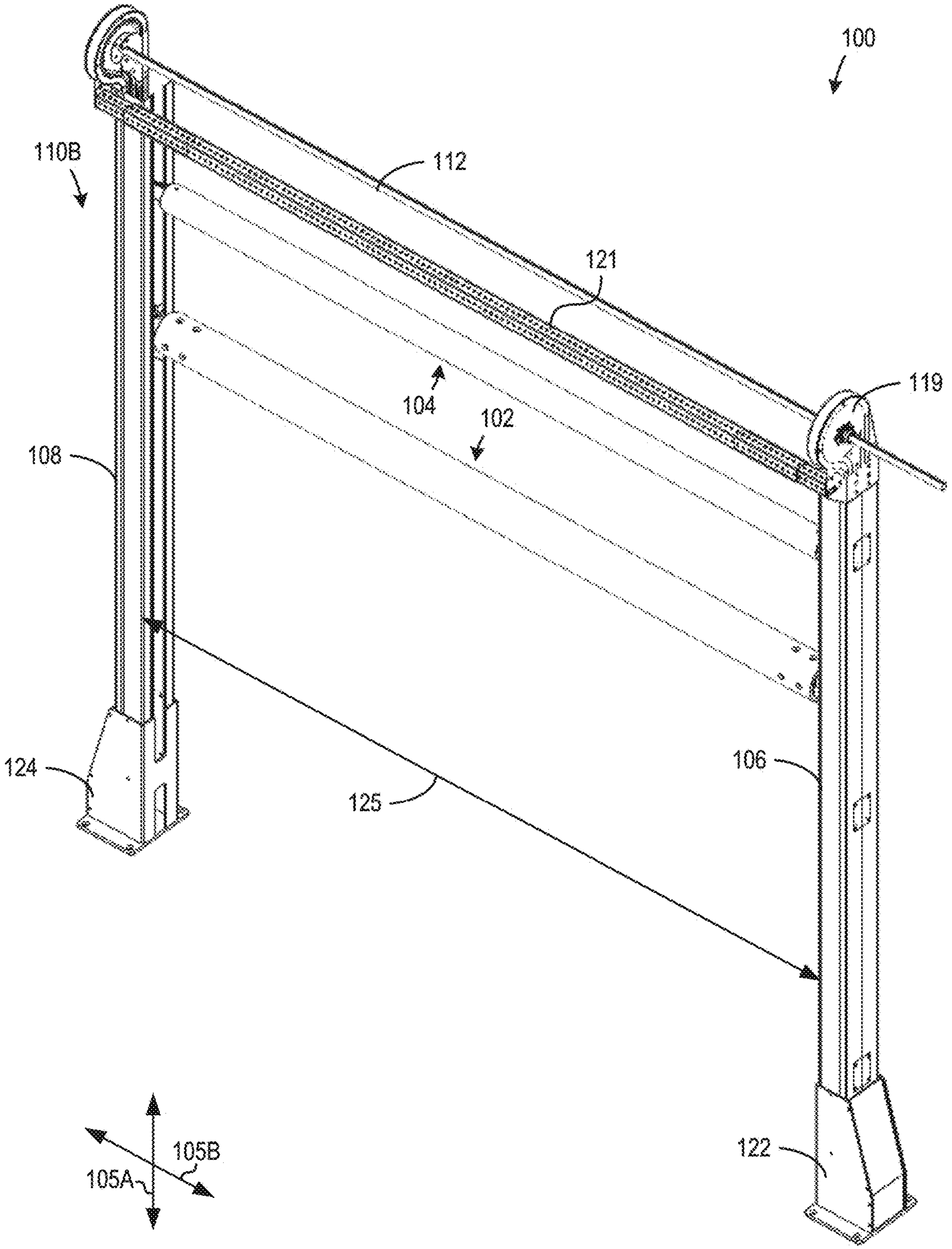
FIG. 1C is a perspective view of the impactable gate of FIG. 1A in an open position.
Figure 1D:
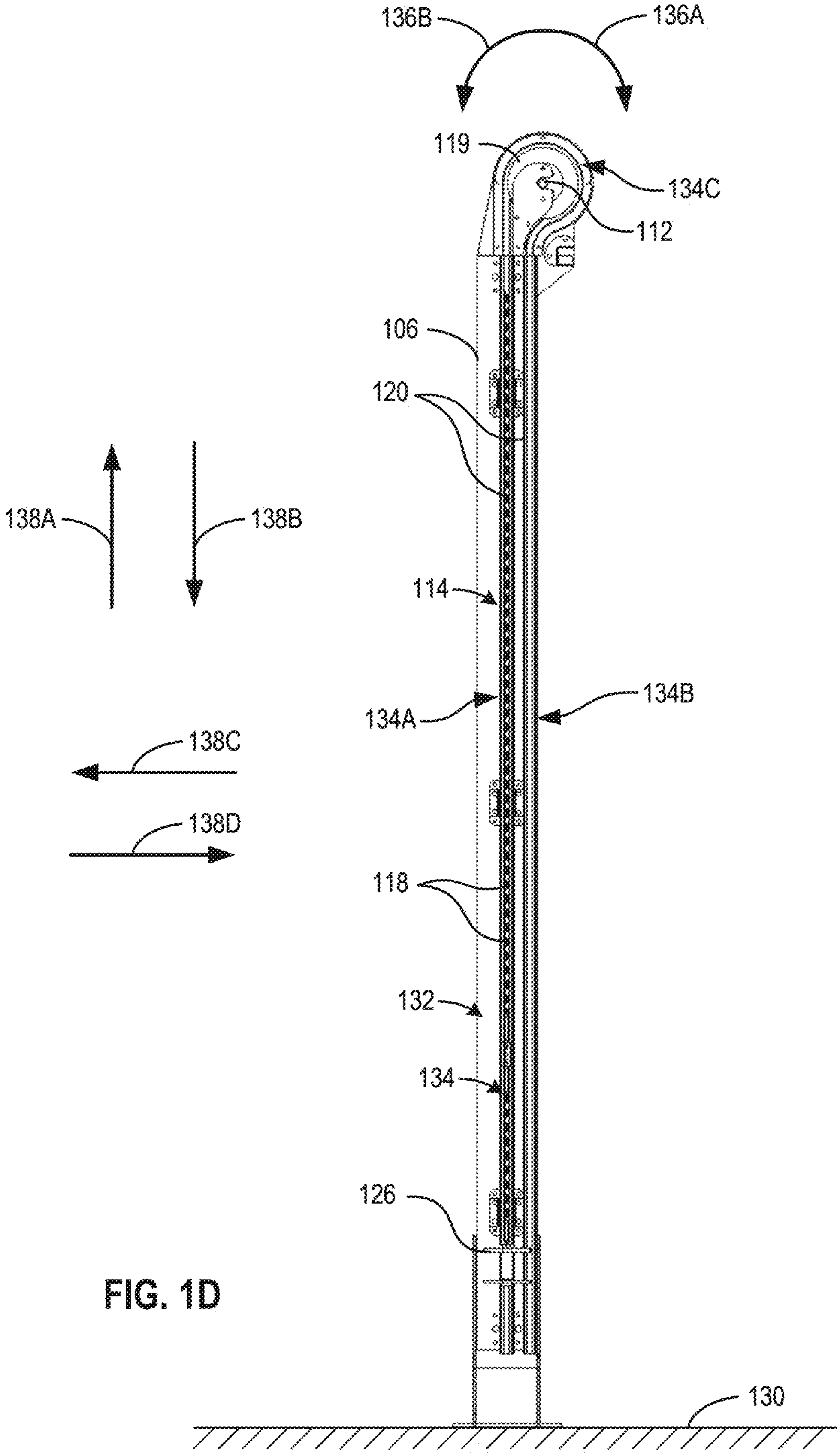
FIG. 1D is a cross-sectional side view of a track of the impactable gate of FIG. 1A taken along line A-A in FIG. 1A.
Figure 1E:
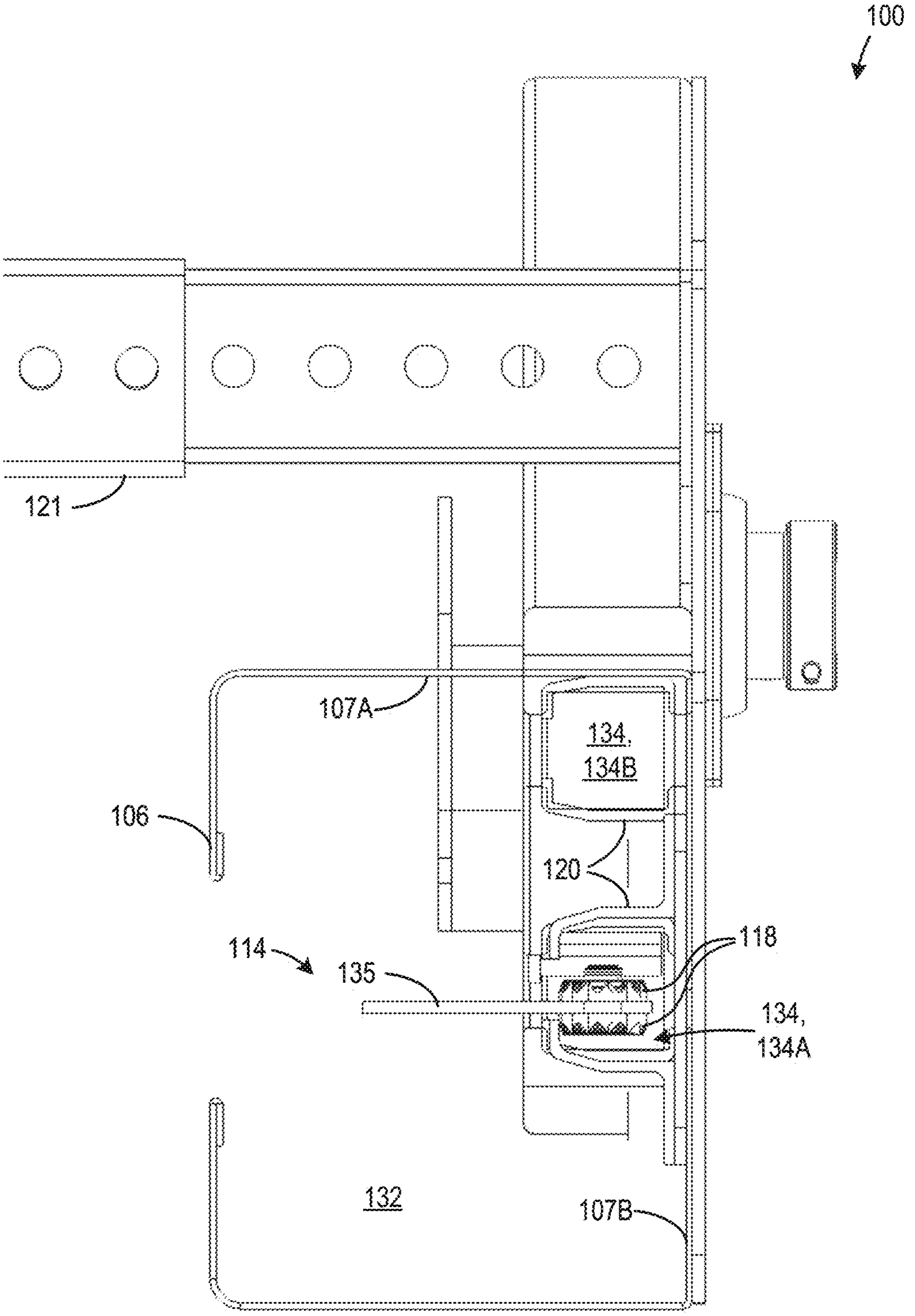
FIG. 1E is a cross-sectional bottom view of a track of the impactable gate of FIG. 1A taken along line C-C in FIG. 1A.

FIG. 1A is a cross-sectional front view of an example impactable gate (e.g., a first impactable gate) 100 in accordance with teachings disclosed herein. Further, FIG. 1B is a perspective view of the impactable gate 100 of FIG. 1A. In the illustrated examples of FIGS. 1A and 1B, the impactable gate 100 is shown in a closed position (e.g., a blocking position, a lowered position). FIG. 1C is the same perspective view of the impactable gate as shown in FIG. 1B, except that the impactable gate 100 of FIG. 1C is shown in an open position (e.g., an unblocking position, a raised position). FIG. 1D is a cross-sectional side view of a track of the impactable gate 100 taken along line A-A of FIG. 1A. FIG. 1E is a cross-sectional bottom view of a track of the impactable gate of FIG. 1A taken along line C-C of FIG. 1A.

In some examples, the impactable gate 100 of FIGS. 1A-1E can be implemented as an impactable gate system and/or apparatus. In some examples, the impactable gate 100 can be employed in factories, hardware stores, hangars, machine shops, warehouses, material handling facilities, and/or other industrial or commercial environments. For example, the impactable gate 100 can be positioned (e.g., installed, mounted, etc.) at and/or near a corral to safely control access to certain racks and/or equipment. In some examples, the impactable gate 100 can be positioned at one or more entrances of an intersection, loading dock, and/or other areas associated with traffic of industrial vehicles (e.g., forklifts, pallet stackers, tow tractors, electric lifts, etc.).

In the illustrated examples of FIGS. 1A-1C, the impactable gate 100 includes an example post rail (e.g., a first rail) 102 and an example track rail 104 (e.g., a second rail) 104 to selectively block traffic through the impactable gate 100. For example, the rails 102, 104 can block and/or restrict traffic through the impactable gate 100 when the impactable gate 100 is in the closed position of FIGS. 1A and/or 1B, and the rails 102, 104 can enable traffic through the impactable gate 100 when the impactable gate 100 is in the open position of FIG. 1C. In some examples, the post rail 102 and the track rail 104 are flexible (e.g., elastically deformable) to reduce damage incurred in the event of an impact. In some examples, the post and track rails 102, 104 are able to withstand impacts or collisions from vehicles driving at operational speeds (e.g., 5 miles per hour (mph), 10 mph, 15 mph, etc.) without deforming, dislodging, fracturing, or otherwise being damaged.

In some examples, the post rail 102 is constructed to bear a majority of the force of an impact on the impactable gate 100 and to transfer the impact force to example base posts 122, 124 (shown in FIGS. 1A-1C) that are anchored to the floor or ground. Thus, the post rail 102 is also referred to herein as an impact bearing rail. By contrast, in some examples, the track rail 104 is not intended to bear significant impact forces. Instead, the track rail 104 is constructed to elastically deform in response to an impact in a manner that reduces (e.g., minimizes) the transfer of impact forces to tracks 106, 108 supporting the track rail 104. Thus, rather than serving to bear the force of an impact, in some examples, the track rail 104 is positioned at a suitable height (e.g., around 42 inches from the floor, less than or more than 42 inches from the floor, etc.) to serve as a guard rail. Accordingly, the track rail 104 is also referred to herein as a guard rail.

The impactable gate 100 of the illustrated examples is vertically actuated to allow passage of traffic (e.g., vehicles and/or operators) therethrough. The impactable gate 100 includes a first example track 106 and a second example track 108 to guide the post and track rails 102, 104 along a longitudinal axis (e.g., a vertical axis) 105A between a blocking position (e.g., a closed position, a lowered position) 110A (shown in FIG. 1B) and an unblocking position (e.g., an open position, a raised position) 110B (shown in FIG. 1C). In other words, the post and track rails 102, 104 can move upward or downward along the first track 106 and the second track 108. In this example, the first track 106 is similar to the second track 108. Thus, unless otherwise specified, descriptions of the first track 106 can likewise apply to the second track 108. In some examples, the first track 106 can be made of a metal material (e.g., aluminum, aluminum alloy, steel alloy, etc.).

In the illustrated examples, the post and track rails 102, 104 are moved between the blocking position 110A of FIGS. 1A and/or 1B to the unblocking position 110B of FIG. 1C based on rotation of a shaft 112 of FIGS. 1B and 1C. In some examples, the shaft 112 can be rotated based on a powered (e.g., motor-driven) control system operatively coupled to the shaft 112. Thus, the impactable gate 100 can be automatically opened and/or closed in some examples. In some examples, the post and track rails 102, 104 can be raised to the unblocking position 110A of FIG. 1C based on a control signal (e.g., from a remote control and/or other device). For example, the impactable gate 100 can include one or more motion sensors (not shown) that can detect movement and/or objects (e.g., humans, vehicles, etc.) at or near the impactable gate 100, and can signal a motor and/or other drive system to rotate the shaft 112 when at least one of a person, object, or vehicle approaches the rails 102, 104. Further examples of motor-driven impactable gates are provided in connection with FIG. 11A-13B. Additionally or alternatively, the shaft 112 can be rotated based on manual operation, such as via a crank, pulley, lever, etc.

In some examples, the impactable gate 100 can include different numbers, combinations, and/or arrangements of the post rail 102 and the track rail 104. For example, the impactable gate 100 can include two or more rails similar to the post rail 102 positioned below the track rail 104. In some examples, the impactable gate 100 can include two or more of the post rail 102 and two or more of the track rail 104. Alternatively, the impactable gate 100 can omit one of the post rail 102 or the track rail 104. Additional example impactable gates in accordance with teachings disclosed herein are described further below in connection with FIGS. 11A-13B.

As illustrated most clearly in FIGS. 1A, 1D, and 1E, the impactable gate 100 includes a first example drive strip 114 and a second example drive strip 116 to move the rails 102, 104 along the first and second tracks 106, 108. The first drive strip 114 is movable (e.g., slidable) along the first track 106, and the second drive strip 116 is movable (e.g., slidable) along the second track 108. In this example, the first drive strip 114 is similar to the second drive strip 116. Thus, unless otherwise specified, descriptions in connection with the first drive strip 114 can likewise apply to the second drive strip 116.

In some examples, the first drive strip 114 corresponds to a flat band or edging that extends along an example length. In this example, the first drive strip 114 has a width that is less than the width of the first track 106, such that the entire width of the first drive strip 114 can be retained within the first track 106. In some examples, the first drive strip 114 can protrude out of the first track 106. As shown most clearly in the illustrated example of FIGS. 1A and 1D, the impactable gate 100 includes example protrusions 118 distributed along the length of the first drive strip 114 to engage an example drive gear (e.g., a sprocket) 119 rotatably coupled to the shaft 112. In some examples, the drive gear 119 includes depressions to receive the protrusions 118. In some examples, the drive gear 119 includes teeth and/or grooves to interlock with the protrusions 118 of the first drive strip 114. Thus, rotation of the drive gear 119 via the shaft 112 causes the first drive strip 114 (and, thus, the rails 102, 104 coupled thereto) to move along the first track 106. Thus, the first drive strip 114 can be referred to as a positive band that is driven based on the shaft 112 and the drive gear 119.

Furthermore, in some examples, the protrusions 118 can be used to retain the first drive strip 114 within the first track 106. More specifically, the protrusions 118 project from the surface of the drive strip 114 to engage and/or be retained by an example secondary track 120 (e.g., a relatively smaller track) inside of the first track 106 (e.g., a relatively larger track) as shown most clearly in FIG. 1E. The drive strip 114 can guide the rails 102, 104 between the closed position 110A and the open position 110B based on engagement of the protrusions 118 with the secondary track 120. In this example, the secondary track 120 is coupled to a first internal surface 107A and a second internal surface 107B of the first track 106. In some examples, the secondary track 120 is formed within the first track 106 (e.g., via casting). Thus, the track 106 surrounds the secondary track 120. In some examples, the track 106 and the secondary track 120 are separate structures positioned adjacent to one another.

In some examples, the first drive strip 114 corresponds to a belt drive that is driven based on the shaft 112 and at least two gear wheels (e.g., the drive gear 119 and at least one other drive gear). In some examples, the first drive strip 114 can be made of a flexible material such as rubber, leather, nylon, etc. Although flexible so that the drive strip 114 can bend around the drive gear 119, in some examples, the first drive strip 114 is sufficiently stiff so that it can be either pulled or pushed through the track 106 based the direction of rotation of the shaft 112 and/or the gear wheel and/or based on a position of the first drive strip 114 relative to the shaft 112 and the drive gear 119. In some examples, the protrusions 118 can be made of a plastic material such as polymer, acrylic, composite, etc.

The post rail 102 and the track rail 104 of the illustrated examples are coupled to the first drive strip 114. Thus, the post rail 102 and the track rail 104 move with the first drive strip 114 relative to the first track 106 between the unblocking position 110B and the blocking position 110A as the first drive strip 114 is driven by the shaft 112. In some examples, the first drive strip 114 causes the post and track rails 102, 104 to travel together (e.g., synchronously) along the first track 106. In some examples, the first drive strip 114 moves through one or more channels (e.g., the secondary track 120) internal to the first track 106 as discussed further below in connection with FIGS. 1D and 1E.

In the illustrated examples of FIGS. 1B and/or 1C, the impactable gate 100 includes an example bar (e.g., a support bar) 121 coupled to the first and second tracks 106, 108 to provide support to and/or enhance stability of the impactable gate 100 during operation. For example, the bar 121 can transfer movement (e.g., sway, oscillation, vibration, etc.) from the first track 106 to the second track 108 to dampen overall movement of the impactable gate 100. In some examples, the first and second tracks 106, 108 of FIGS. 1A-1C are spaced apart along an example lateral axis (e.g., a horizontal axis) 105B based on positions of the first and second base posts 122, 124. Thus, the first and second base posts 122, 124 define an example distance 125 along which the bar 121 extends between the first and second tracks 106, 108. In some examples, the bar 121 is extendable and/or retractable to conform to the distance 125. Thus, the first and second base posts 122, 124 can be installed at access points (e.g., intersections, doorways, mezzanines, platforms, etc.) of variable size. Furthermore, in some examples, the bar 121 can be coupled to the first and second tracks 106, 108 after the first and second base posts 122, 124 are installed.

In the illustrated examples of FIGS. 1A-1C, the impactable gate 100 includes the first base post 122 and the second base post 124 to mount and/or secure a position and/or orientation of the impactable gate 100 (e.g., relative to a floor 130). The first track 106 is to be coupled to the first base post 122, and the second track 108 is coupled to the second base post 124. The first base post 122 is similar to the second base post 124. Thus, unless otherwise specified, descriptions of the first base post 122 also apply to the second base post 124. In some examples, the first base post 122 can be made of metal material of higher strength than the first track 106, such as steel, iron, etc.

In the illustrated example of FIG. 1A, the impactable gate 100 includes a first example bracket 126 to be disposed within the first track 106 and a second example bracket 128 to be disposed within the second track 108. The first bracket 126 is similar to the second bracket 128. Thus, unless otherwise specified, descriptions of the first bracket 126 can likewise apply to the second bracket 128. In this example, the first bracket 126 is to couple the post rail 102 to the first drive strip 114. Furthermore, the first bracket 126 is to be disposed within the first base post 122 when the post rail 102 is in the blocking position 110A. As described further in connection with FIGS. 8A and 8B, the first bracket 126 presses against (e.g., abuts, interfaces, etc.) the first track 106 and the first base post 122 in response to impact forces acting on the post rail 102. That is, the first bracket 126 is to be urged toward the first base post 122 in response to an impact with the post rail 102.

In some examples, the first base post 122 can be fastened (e.g., bolted, welded, etc.) to the floor 130 to bear loads imparted on the post and track rails 102, 104. That is, when a vehicle impacts the rails 102, 104, impact forces are transferred to the first base post 122 and, thus, to the floor 130 on which the first base post 122 is mounted. More specifically, forces applied to the post rail 102 are transferred to the first base post 122 via the first bracket 126. Additionally, forces applied to the track rail 104 are transferred to the first base post 122 via the first track 106. However, in some examples, the track rail 104 is constructed to deform and/or adjust shape in response to an impact in such a way that little or no impact forces are transferred to the first track 106.

In the illustrated example of FIGS. 1D and 1E, the first track 106 includes the secondary track 120 disposed within the first track 106. For purposes of explanation, the first track 106 is referred to herein as a primary track defining an example primary channel (e.g., a first channel) 132, and the secondary track 120 is referred to herein as a secondary track that defines an example secondary channel (e.g., a second channel) 134. The impactable gate 100 includes the secondary channel 134 to guide the first drive strip 114 along the first track 106. The protrusions 118 cause the first drive strip 114 to be retained within the secondary channel 134 of first track 106. In some examples, the track 106 encloses and/or covers a free edge 135 of the drive strip 114, where the free edge 135 of the drive strip 114 projects from the secondary channel 134 into the primary channel 132. Further, in some examples, the first bracket 126 moves along the first track 106 within the primary channel 132 and external to the secondary channel 134. Thus, the first bracket 126 is to be retained within the primary channel 132 of the first track 106.

In the illustrated examples of FIGS. 1D and/or 1E, the primary channel 132 is oriented substantially orthogonal to the floor 130. In some examples, the secondary channel 134 of the secondary track 120 includes a first portion (e.g., ascending portion, lowered portion, etc.) 134A and a second portion (e.g., descending portion, raised portion, etc.) 134B that are positioned proximate one another and oriented substantially orthogonal to the floor 130. The secondary channel 134 also includes a third portion (e.g., curved portion, wraparound portion, etc.) 134C (shown in FIG. 1D) that loops around a portion of the drive gear 119 of the impactable gate 100 and connects the first and second portions 134A, 134B to define a continuous path for the drive strip 114, where the continuous path extends along the first portion 134A, around the third portion 134C, and along the second portion 134C adjacent the first portion 134A. In some examples, rotation of the shaft 112 and the drive gear 119 causes the first drive strip 114 to move along the continuous path defined in the secondary channel 134.

In some examples, the shaft 112 can rotate the drive gear 119 in a first direction 136A (e.g., clockwise FIG. 1D) to cause the post and track rails 102, 104 to move from the blocking position 110A (shown in FIGS. 1A and/or 1B) to the unblocking position 110B (shown in FIG. 1C). Conversely, the shaft 112 can rotate the drive gear 119 in a second direction 136B (e.g., counterclockwise in FIG. 1D) to cause the post and track rails 102, 104 to move from the unblocking position 110B (shown in FIG. 1C) to the blocking position 110A (shown in FIGS. 1A and/or 1B). More specifically, rotation of the drive gear 119 in the first direction 136A of FIG. 1D feeds the first drive strip 114 through the first portion 134A in an upward direction (e.g., a first vertical direction) 138A of FIG. 1D and through the second portion 134B in a downward direction (e.g., a second vertical direction) 138B of FIG. 1D. Conversely, rotation of the drive gear 119 in the second direction 136B of FIG. 1D feeds the first drive strip 114 through the second portion 134B in the upward direction 138A of FIG. 1D and through the first portion 134A in the downward direction 138B of FIG. 1D. The impactable gate 100 includes the protrusions 118 to retain the first drive strip 114 within the secondary track 120.

In some examples, the second portion 134B of the secondary channel 134 is not orthogonal to the floor 130. Rather, the second portion 134B can extend from the third portion 134C in a forward direction (e.g., first horizontal direction) 138C of FIG. 1D, a rearward direction (e.g., second horizontal direction) 138D of FIG. 1D, and/or any other suitable direction. Thus, in some examples, the second portion 134B can be aligned with and/or or substantially parallel to the floor 130. In such examples, the first track 106 and/or another housing can extend horizontally to support the second portion 134B of the secondary channel 134.

Figure 2A:
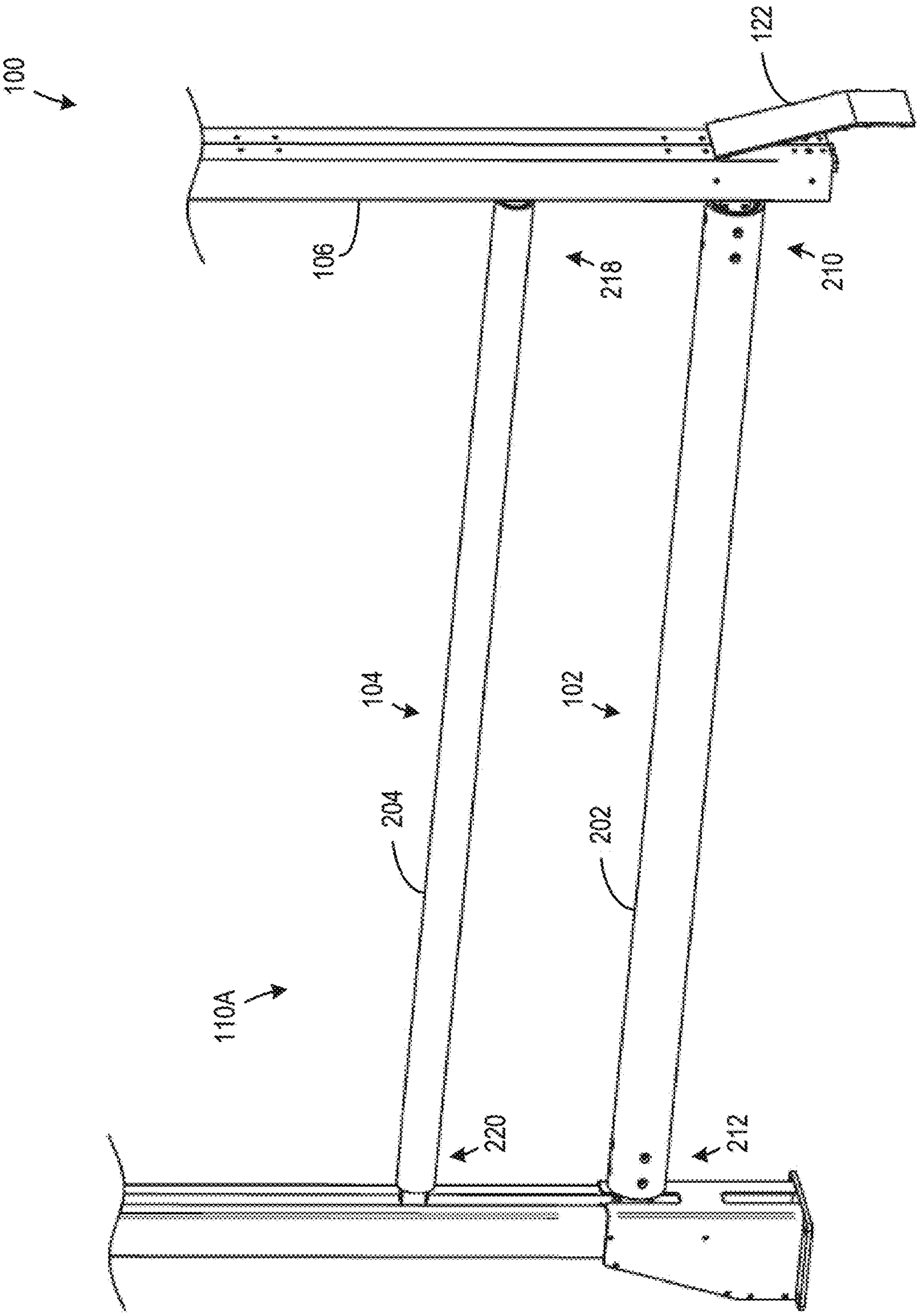
FIG. 2A is a partial perspective view of the impactable gate of FIG. 1A.

FIG. 2A is a partial perspective view of the impactable gate 100 of FIG. 1A. In the illustrated example of FIG. 2A, the post rail 102 includes a first example tube 202 and the track rail 104 includes a second example tube 204. In FIG. 2A, some surfaces of the first base post 122 are omitted for clarity. Further, FIG. 2B is a partial perspective view of the impactable gate of FIG. 2A with the first tube 202 and the second tube 204 omitted.

In the illustrated example of FIG. 2A, the first tube 202 and the second tube 204 are made of a resilient plastic material, such as a polymer. Thus, the first and second tubes 202, 204 can bend and/or deform based on an impact to the impactable gate 100 and, in some examples, can return to their original shape. For example, the first tube 202 can elastically deform (e.g., without destructive damage) and return to an original shape and/or position. In some examples, the material of the first tube 202 is selected based on an expected mass and/or momentum of an impacting vehicle. For example, the material can be selected such that the post rail 102 can elastically deform responsive to an impact from a vehicle having up to threshold weight (e.g., 9,000 pounds) and traveling at up to a threshold speed (e.g., 15 mph), and can return to a pre-impacted position after the vehicle backs away.

Figure 2B:
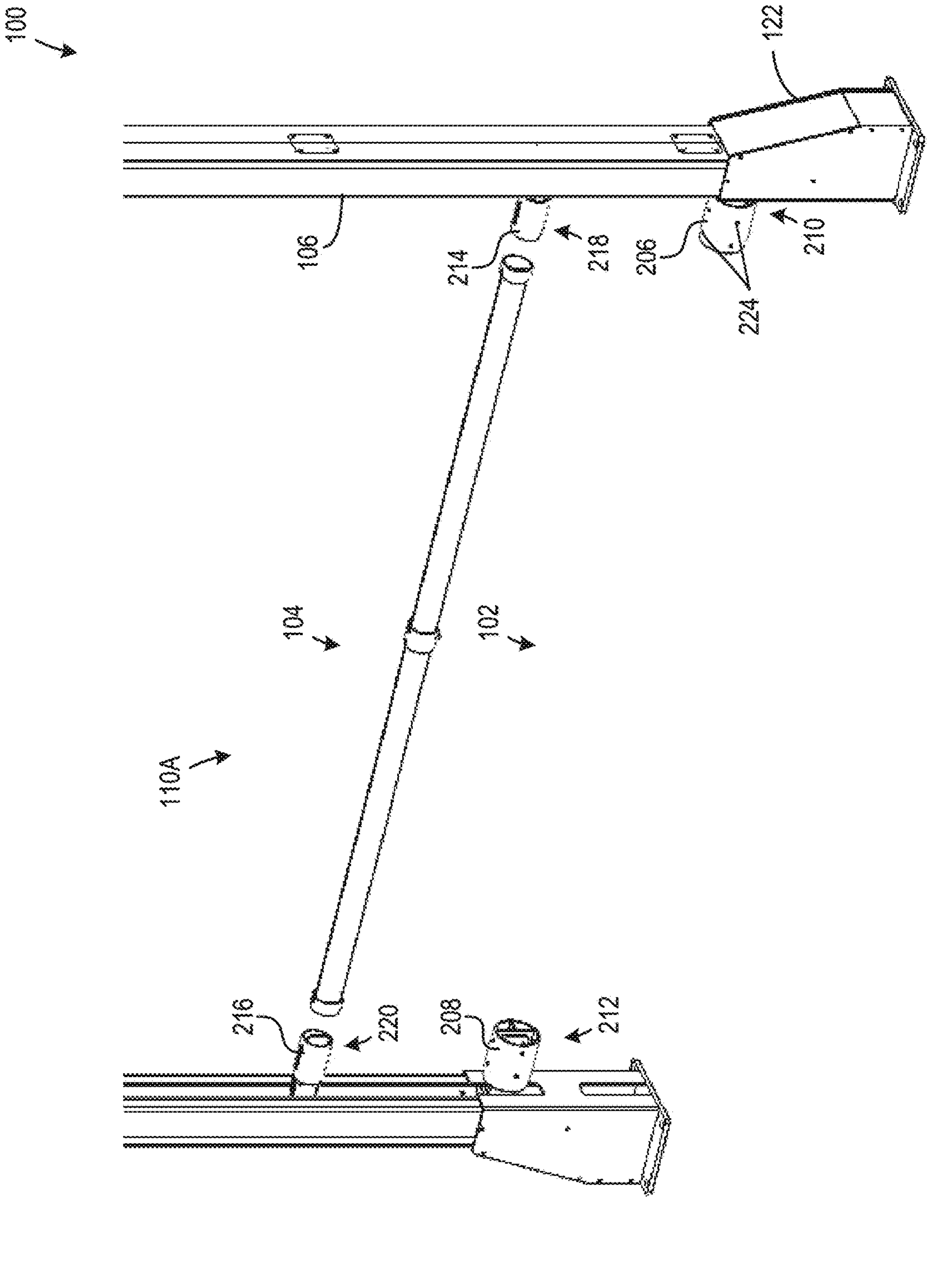
FIG. 2B a partial perspective view of the impactable gate of FIG. 2A with some components omitted.

In the illustrated example of FIG. 2B, the impactable gate 100 includes a first example anchor sleeve (e.g., a first collar) 206 to couple the post rail 102 to the first drive strip 114, and a second example anchor sleeve (e.g., a second collar) 208 to couple the post rail 102 to the second drive strip 116 (FIG. 1A). In some examples, the first anchor sleeve 206 is to be coupled to the first tube 202 of FIG. 2A at a first end 210 of the post rail 102, and the second anchor sleeve 208 is to be coupled to the first tube 202 of FIG. 2A at a second end 212 of the post rail 102 opposite the first end 210. The first anchor sleeve 206 is similar to the second anchor sleeve 208. Thus, unless otherwise specified, descriptions of the first anchor sleeve 206 can likewise apply to the second anchor sleeve 208.

In the illustrated example of FIG. 2B, the impactable gate 100 includes a first example slip sleeve 214 to couple the track rail 104 to the first drive strip 114 (FIG. 1A), and a second example slip sleeve 216 to couple the track rail 104 to the second drive strip 116 (FIG. 1A). In some examples, the first slip sleeve 214 is to be coupled to the second tube 204 of FIG. 2A at a first end 218 of the track rail 104, and the second slip sleeve 216 is to be coupled to the second tube 204 of FIG. 2A at a second end 220 of the track rail 104 (e.g., opposite the first end 218). The first slip sleeve 214 is similar to the second slip sleeve 216. Thus, unless otherwise specified, descriptions of the first slip sleeve 214 can likewise apply to the second slip sleeve 216.

In the illustrated example of FIG. 2B, the first anchor sleeve 206 is coupled to the first tube 202 of FIG. 2A based on a plurality of fastenings 224, such as bolts, pins, rivets, etc. Thus, in some examples, the first tube 202 of FIG. 2A is fixedly coupled or rigidly anchored to the first anchor sleeve 206 such that the first end 210 of the first tube 202 does not move relative to the first anchor sleeve 206. By contrast, the track rail 104 is coupled to the first slip sleeve 214 based on at least one slotted hole (described further below in connection with FIG. 4). Thus, in some examples, the second tube 204 of FIG. 2A is slidably coupled to the first slip sleeve 214 such that the first end 218 of the tube 204 can move or translate relative to the slip sleeve 214. In some examples, the second tube 204 can rotate relative to the first slip sleeve 214.

Figure 3:
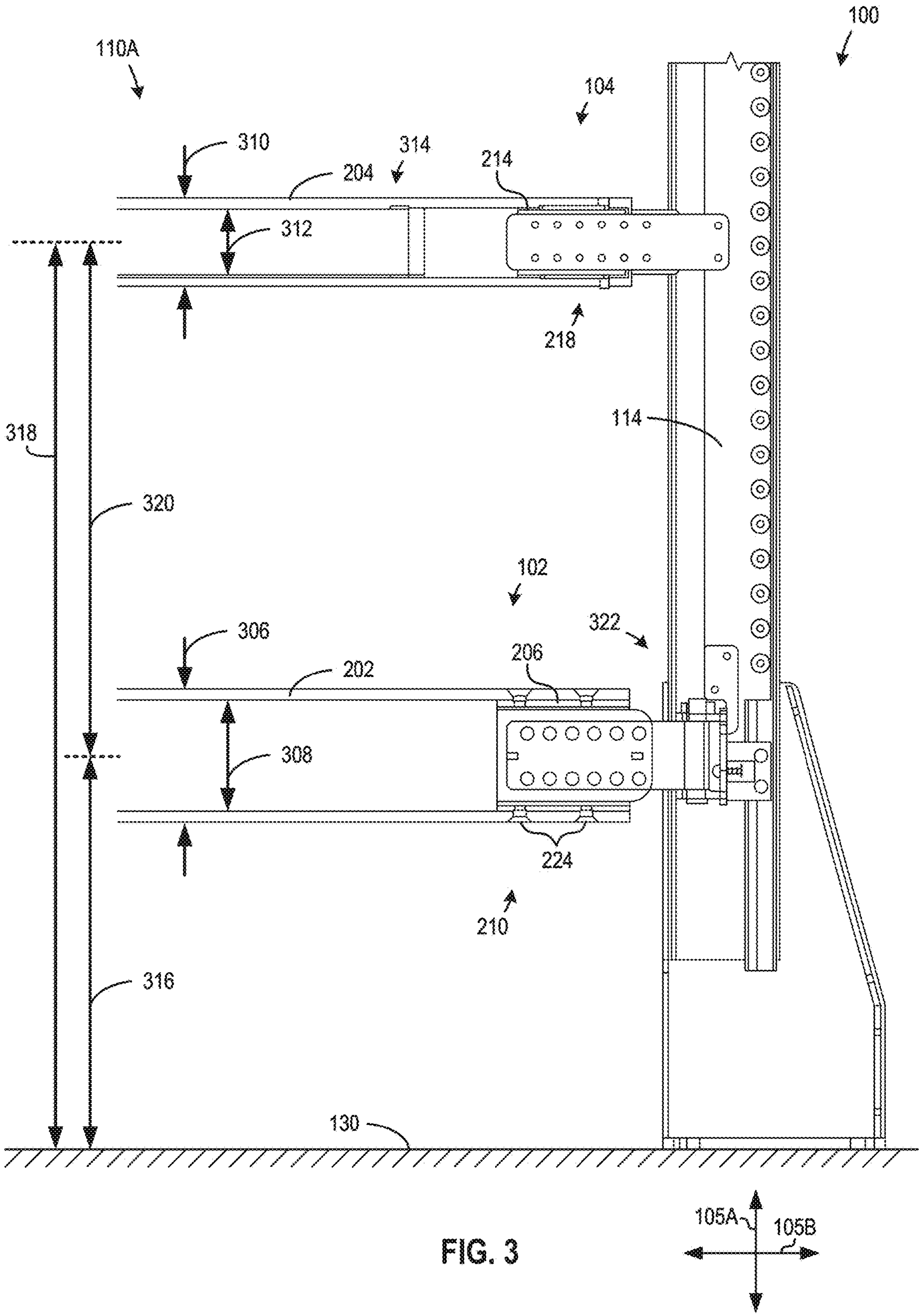
FIG. 3 is a cross-sectional front view of a portion of the impactable gate of FIG. 2A.

FIG. 3 is a cross-sectional front view of a portion of the impactable gate 100 of FIGS. 1A-1C. In the illustrated example of FIG. 3, the first tube 202 of the post rail 102 has a first example outer diameter (OD) 306 and first example inner diameter (ID) 308. Furthermore, the second tube 204 has a second example OD 310 and a second example ID 312. In some examples, the strength and/or ductility of the first and second tubes 202, 204 are based on the respective ODs 306, 310 and/or the respective IDs 308, 312. For example, in FIG. 3, the first tube 202 has a greater material strength relative to the second tube 204 because the first OD 306 is greater than the second OD 310. In some examples, the track rail 104 includes an example brace (e.g., a brace assembly) 314 disposed within the second tube 204 to improve the bending strength of the track rail 104 along the longitudinal axis 105A. In some examples, the post rail 102 may include a similar brace. Further descriptions of the brace 314 are provided in connection with FIG. 5.

In the illustrated example of FIG. 3, when the impactable gate 100 is in the blocking position 110A, the post rail 102 is positioned at a first example height 316 (e.g., along the longitudinal axis 105A) relative to the floor 130, and the track rail 104 is positioned at a second example height 318 (e.g., along the longitudinal axis 105A) relative to the floor 130. In this example, the second height 318 is greater than the first height 316. The track rail 104 is spaced away from the post rail 102 along the longitudinal axis 105A by a third example height 320. In some examples, the first height 316 corresponds to a height at which the post rail 102 is expected to engage with objects (e.g., forklifts and/or other vehicles) that may impact the post rail 102. In some examples, the second height 318 corresponds to the height of a guardrail (e.g., 42 inches). However, in other examples, the second height 318 may be less than or greater than the height of a typical guardrail (e.g., less than or greater than 42 inches).

In some examples, the post rail 102 is coupled to a first end (e.g., a bottom end) 322 of the first drive strip 114. As such, in some examples, the length of the first drive strip 114 and its position relative to the drive gear 119 (FIG. 1D) when in the closed position defines the first height 316. Alternatively, the post rail 102 can be coupled to another point along the length of the first drive strip 114 to adjust the first height

316 (e.g., based on an expected height of a vehicle expected to pass through the impactable gate 100). Similarly, the second height 318 and, thus, the third height 320 can be adjusted based on a point at which the track rail 104 is coupled to the first drive strip 114. In the illustrated examples, the third height 320 is greater than the first height 316. However, in some examples, the third height 320 can be less than or equal to the first height 316.

Figure 4:
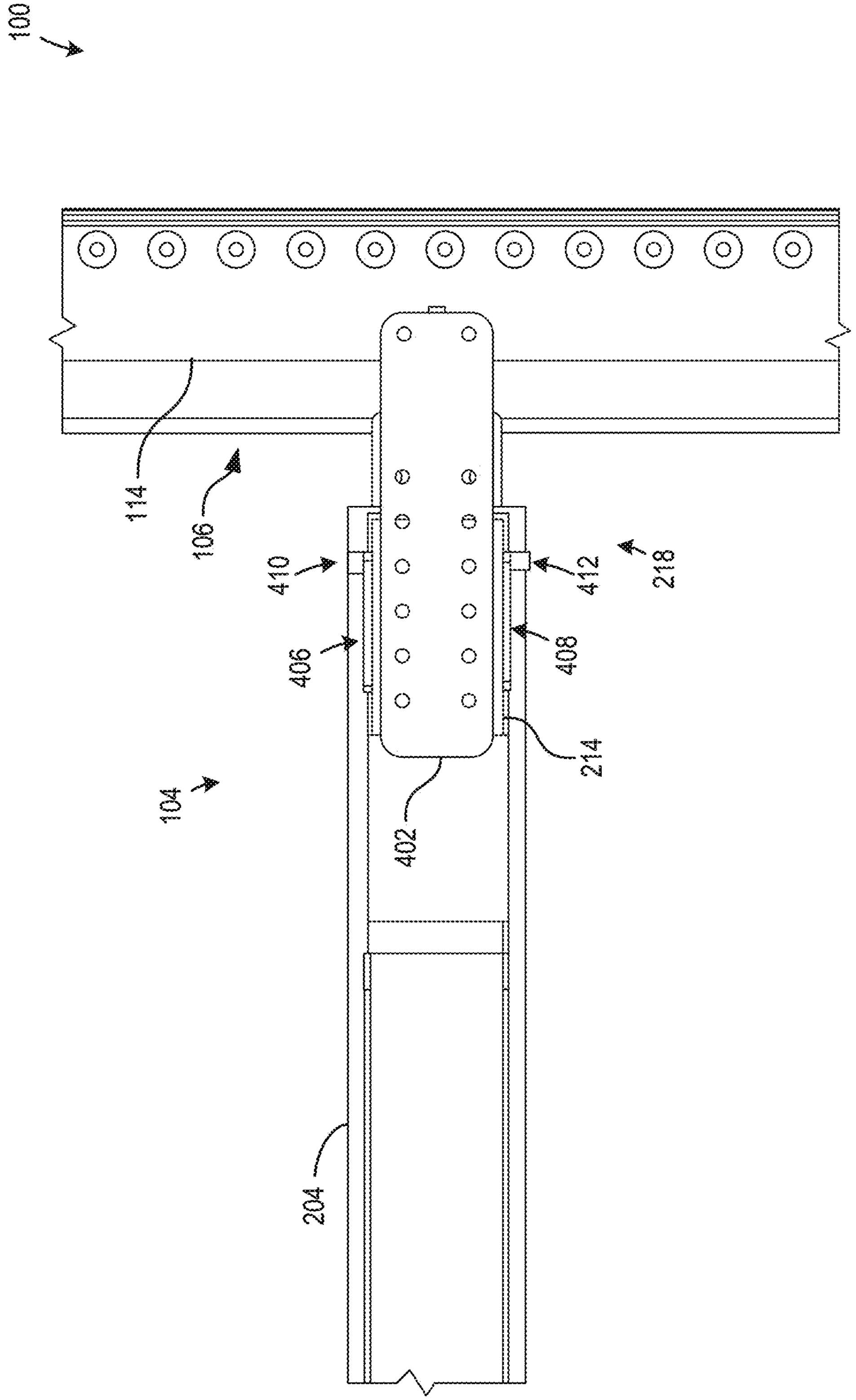
FIG. 4 is a front view of a rail of the impactable gate of FIG. 1A.

FIG. 4 is a front view of the first end 218 of the track rail 104 of the impactable gate 100 of FIGS. 1A-1E. In the illustrated example of FIG. 4, the second tube 204, the first slip sleeve 214, and the first track 106 are illustrated in phantom. The slip sleeve 214 of the track rail 104 is fixedly coupled to a perforated plate 402, and the perforated plate 402 is coupled to the first drive strip 114. The impactable gate 100 includes the perforated plate 402 to provide relative ease of assembly. For example, the track rail 104 can be coupled (e.g., selectively coupled) to the perforated plate 402 after the first base post 122 (FIG. 1A) is installed using different ones of the holes in the perforated plate 402 depending on the spacing of the base posts 122, 124. Thus, the impactable gate 100 can have a variable overall width (e.g., the distance 125 of FIG. 1A) prior to installation of the track rail 104. In some examples, the range of the overall width is based on a length of the perforated plate 402.

In the illustrated example of FIG. 4, the second tube 204 is slidably coupled to the slip sleeve 214 at the first end 218 of the track rail 104. In some examples, the second tube 204 can slide or translate along the slip sleeve 214 (e.g., away from the first track 106) in response to an impact. For example, when a vehicle collides with the impactable gate 100 in the closed position 110A, the track rail 104 can bend and/or extend along the direction of the moving vehicle. Thus, the track rail 104 can "stretch" while the post rail 102 works to stop the vehicle. As mentioned, in some examples, the post rail 102 bears most of the loading from the impacting vehicle (e.g., compared to the track rail 104). To that end, the post rail 102 works to stop the vehicle while the track rail 104 bends and/or translates along the slip sleeve 214. In some examples, the track rail 104 shares the loading with the post rail 102 after being fully bent or extended and/or after the post rail 102 has reduced the impact load. Thus, in some examples, the slip sleeve 214 reduces the amount of loading the track rail 104 is to bear and/or reduces an amount of shear stress the track rail 104 applies to the drive strip 114. In some examples, the impactable gate 100 includes the slip sleeve 214 to enable the track rail 104 to reduce the momentum of the vehicle while reducing loads on the first track 106 and/or reducing shear stresses on the first drive strip 114.

In the illustrated example of FIG. 4, the slip sleeve 214 includes a first example slotted hole 406 and a second example slotted hole 408. Further, the second tube 204 includes a first example through hole 410 and a second example through hole 412. In some examples, the track rail 104 includes a first fastening (e.g., bolt, pin, etc.) that extends all the way through the second tube 204 through the first and second through holes 410, 412 and the first and second slotted holes 406, 408. Based on this arrangement, the second tube 204 can slide along a length of the first slotted hole 406 to provide slack to the track rail 104 upon impact. In other words, when the second tube 204 bends from a vehicle collision or other impact with the impactable gate 100 (as shown in FIG. 10B), the second tube 204 can translate along the slip sleeve 214 to reduce strain on the first drive strip 114. In some examples, the slip sleeve 214 includes one or more additional slotted holes in addition to the first and second slotted holes 406, 408 of FIG. 4. In some examples, the perforated plate 402 is offset from the slotted holes 406, 408 so as to not interfere with fastenings of the slip sleeve 214.

Figure 5:
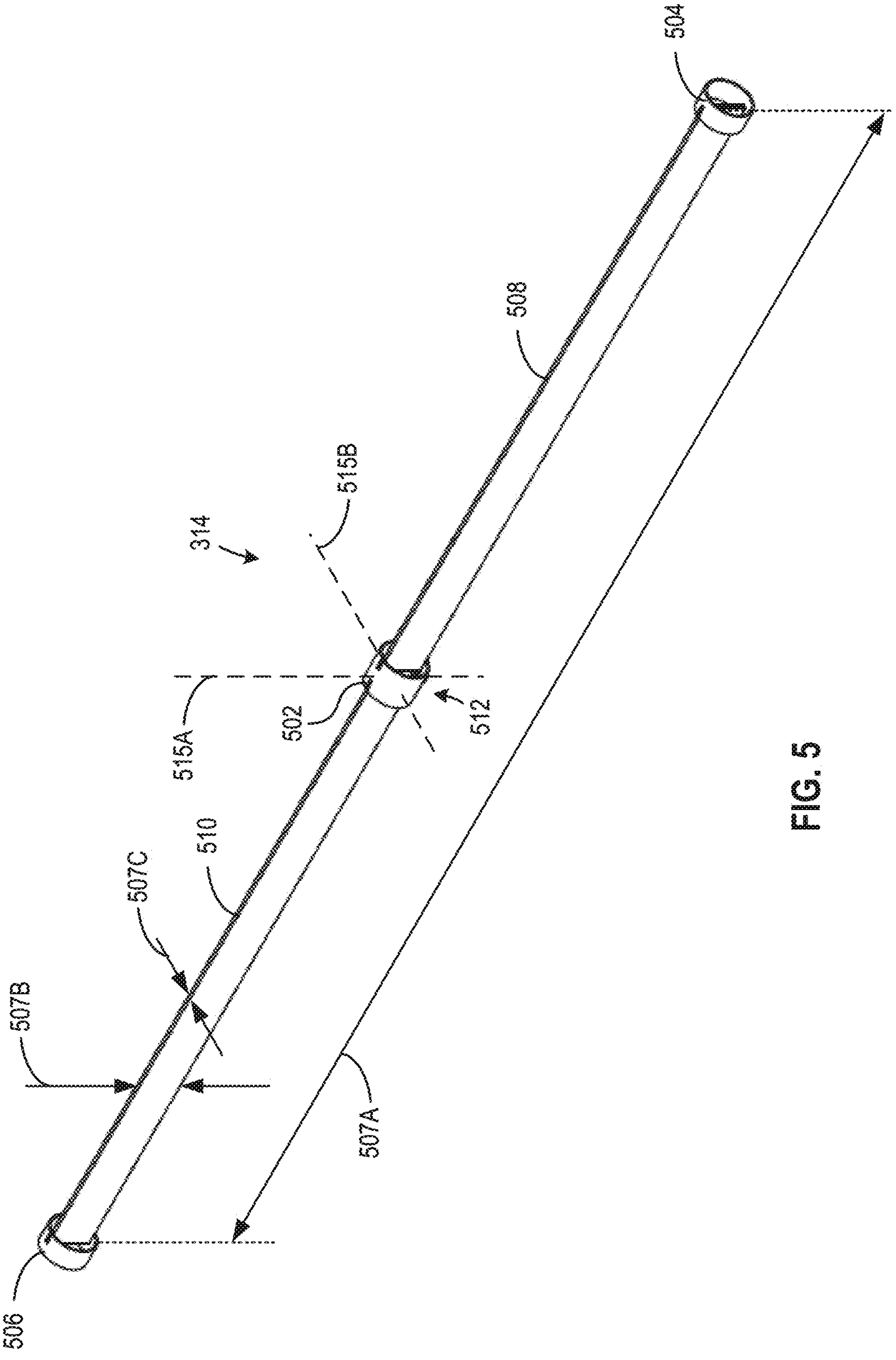
FIG. 5 is a perspective view of a brace of the rail of FIG. 4.

FIG. 5 is a perspective view of the example brace 314 of the track rail 104 of FIG. 3. The brace 314 is to be disposed within the second tube 204 of FIGS. 2A, 3, and/or 4. In this example, the brace 314 includes an example central collar 502, a first example end collar 504, and a second example end collar 506 to position the brace 314 along a length of the track rail 104 (FIG. 1A). In some examples, the collars 502-506 orient the brace 314 to lie in a plane that is substantially vertical (e.g., substantially aligned with and/or parallel to a plane of the drive strip 114 of FIG. 3). More specifically, the brace 314 includes an example length 507A, an example width 507B, and an example thickness 507C. In some examples, the thickness 507C extends in a direction transverse to a direction of travel of the drive strip 114 (FIG. 1D) along the track 106 (FIG. 1A). Further, the brace 314 includes a first example plate 508 and a second example plate 510 to provide bending support to the track rail 104. The first plate 508 is coupled between the central collar 502 and the first end collar 504, and the second plate 510 is coupled between the central collar 502 and the second end collar 506. In some examples, the first and second plates 508, 510 are a single (e.g., unitary, continuous) plate extending between the first end collar 504 and the second end collar 506. In other examples, the brace 314 can include more than two plates and/or a different number of collars than what is shown in the illustrated examples.

In some examples, at least one of the collars 502, 504, 506 is fixed to the second tube 204. In this example, the central collar 502 is fixed to the second tube 204. For example, the central collar 502 can be fastened to the second tube 204 with one or more threaded fasteners (e.g., bolts, screws, etc.). In the illustrated example, the central collar 502 can be coupled to the second tube 204 based on a fastener (e.g., bolt) positioned at an underside 512 of the brace 314. In some examples, the first and second end collars 504, 506 are to be disposed within the second tube 204 without fastenings. As a result, the first and second end collars 504, 506 can slide or translate along the track rail 104. Thus, as the track rail 104 bends from an impact, the brace 314 can also bend without restriction within the second tube 204.

During an impact, the track rail 104 of the impactable gate 100 bends about a first example axis 515A (e.g., substantially orthogonal to the floor 130). However, the track rail 104 can also partially bend about a second example axis 515B (e.g., orthogonal to the first axis 515A and/or substantially parallel to the floor 130). For example, based on a position of the track rail 104 along the drive strip 114 and the second height 318 of FIG. 3B, a vehicle may impact slightly underneath the track rail 104. Thus, some bending about the second axis 515B can occur, resulting in additional stress on the slip sleeve 214 in some examples. The impactable gate 100 includes the brace 314 to reduce bending of the track rail 104 about the second axis 515B while still allowing the track rail 104 to bend about the first axis 515A.

Figure 6A:
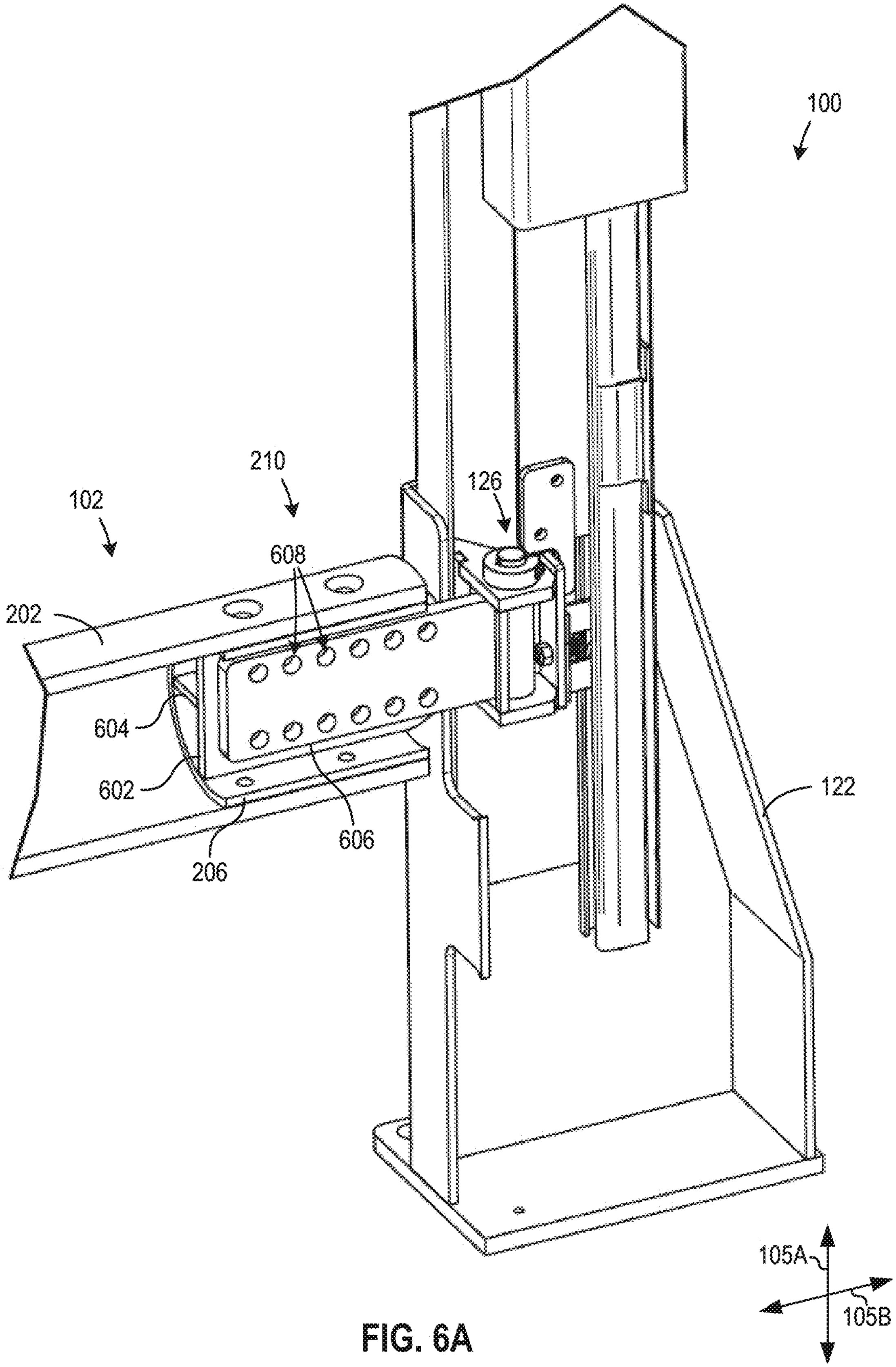
FIG. 6A is a cross-sectional perspective view of another rail of the impactable gate of FIG. 1A.
Figure 6B:
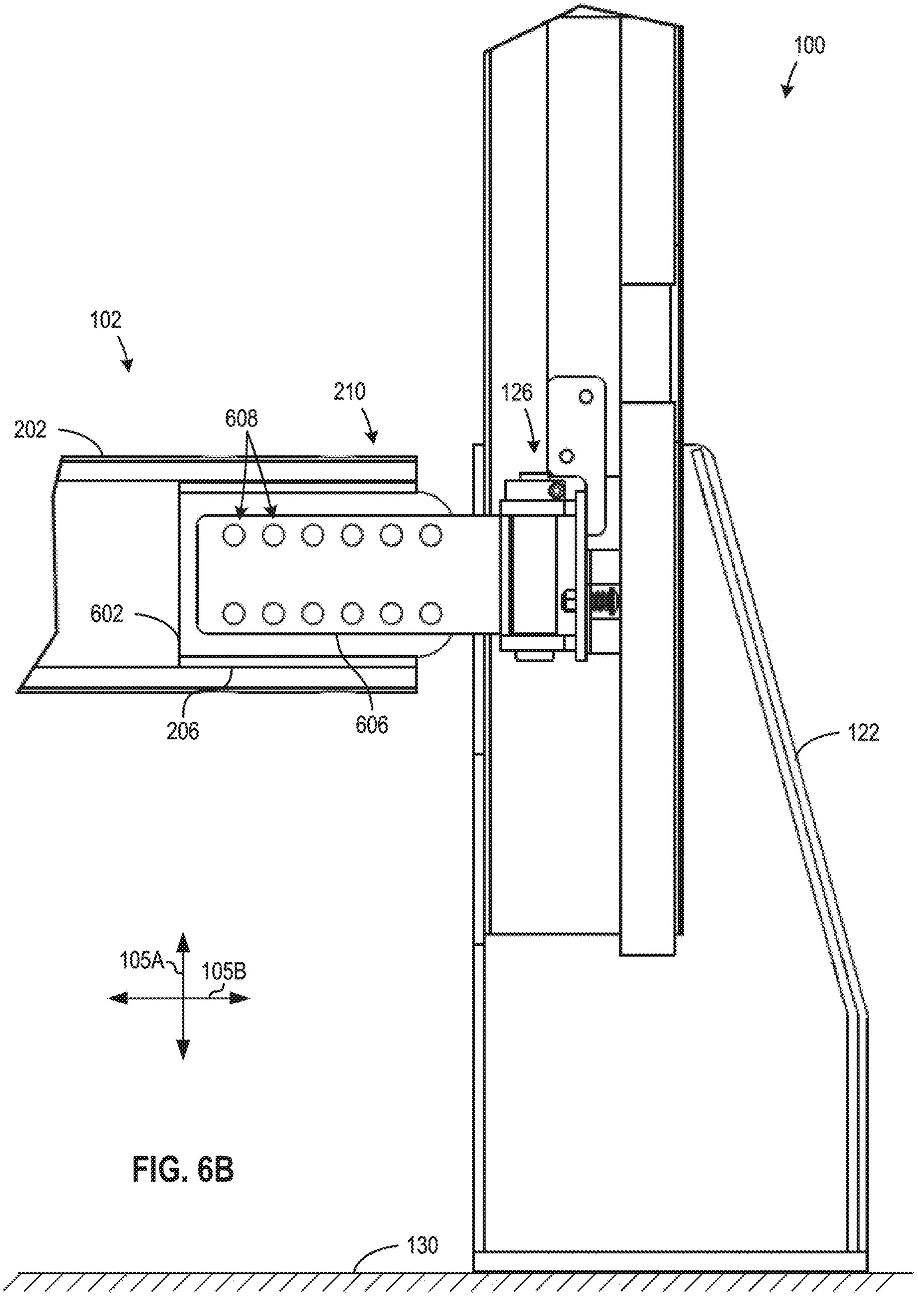
FIG. 6B is a cross-sectional front view of the rail of FIG. 6A.

FIG. 6A is a cross-sectional perspective view of the first end 210 of the post rail 102 of the impactable gate 100 of FIG. 1A. Further, FIG. 6B is a cross-sectional front view of the first end 210 of the post rail 102 of the impactable gate 100 of FIG. 1A. In the illustrated examples of FIGS. 6A and 6B, the first anchor sleeve 206 is disposed within the first tube 202. In some examples, the first anchor sleeve 206 surrounds the first end 210 and is disposed outside of the first tube 202.

In the illustrated examples of FIGS. 6A and/or 6B, the impactable gate 100 includes a first example plate 602 and a second example plate 604 within the first anchor sleeve 206. In the illustrated examples, the first plate 602 is aligned with the longitudinal axis 105A and is oriented substantially orthogonal to the floor 130. Furthermore, the second plate 604 is aligned with the lateral axis 105B and is oriented substantially parallel to the floor 130. In some examples, the first plate 602 is fastened (e.g., welded, etc.) to internal surfaces of the first anchor sleeve 206. In some examples, the first plate 602 extends radially along an internal diameter of the first sleeve 206 and extends axially along a length of the first anchor sleeve 206. In some examples, the second plate 604 is fastened (e.g., welded, etc.) to an internal surface of the first anchor sleeve 206 and the first plate 602.

In the illustrated examples of FIGS. 6A and/or 6B, the first plate 602 couples the first anchor sleeve 206 to an example perforated plate 606, and the second plate 604 couples the first plate 602 to the first anchor sleeve 206. In some examples, the second plate 604 is to maintain the position and/or orientation of the first plate 602 within the first sleeve 206 while providing additional strength to the first sleeve 206.

In the illustrated examples of FIGS. 6A and/or 6B, the impactable gate 100 includes the perforated plate 606 to couple the post rail 102 to the first bracket 126. In some examples, the perforated plate 606 includes a plurality of holes 608 that can align with corresponding through-holes of the first plate 602. For example, the perforated plate 606 can be coupled to the first plate 602 with bolts, pins, rivets, etc. Furthermore, the plurality of holes 608 can provide relative ease of assembly of the impactable gate 100 by enabling adjustments in the reach of the perforated plate 606 beyond the end of the first tube 202. In other words, the post rail 102 can be coupled to the perforated plate 606 without needing to reposition the first base post 122.

Figure 7A:
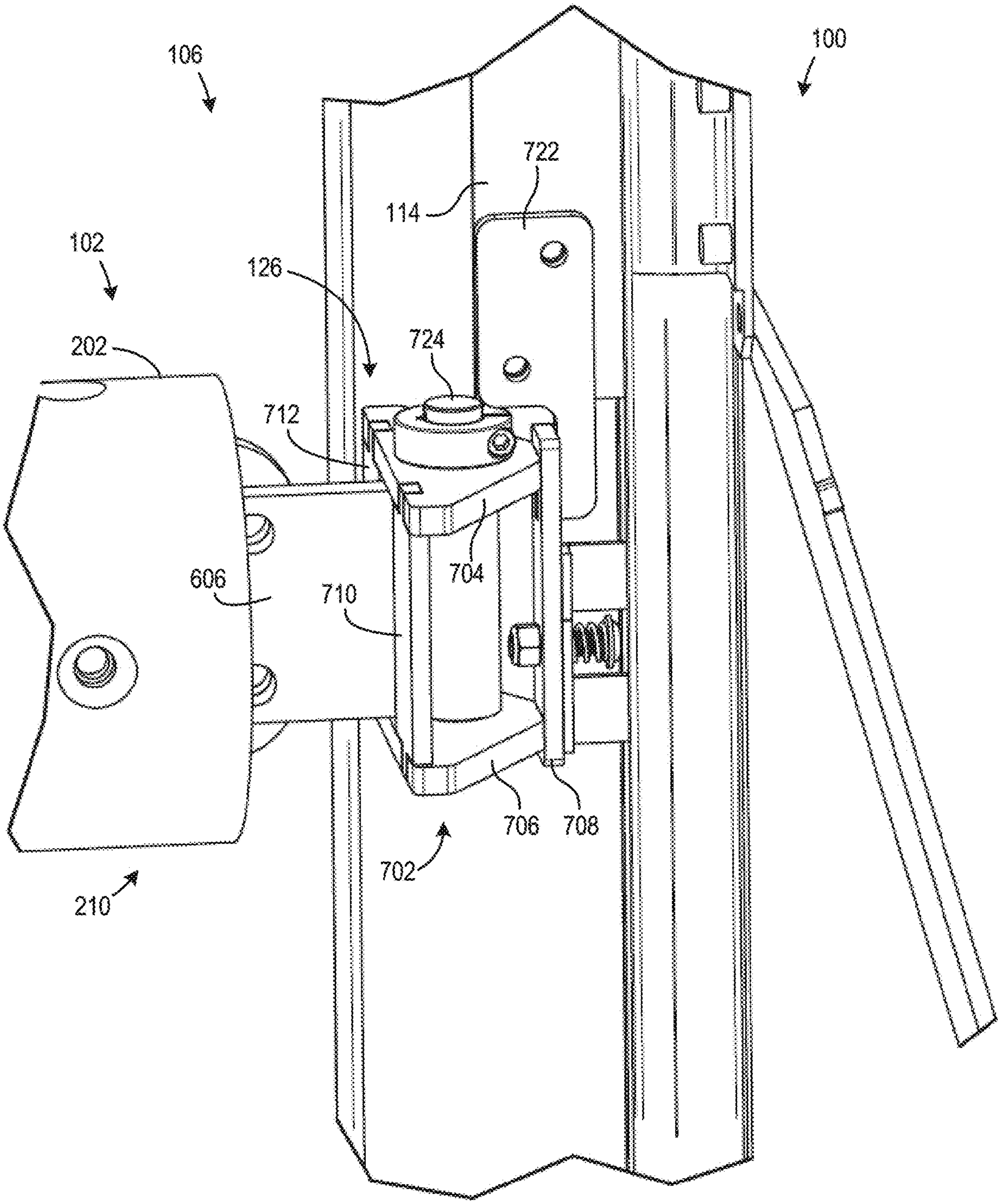
FIG. 7A is a perspective view of a bracket of the impactable gate of FIG. 1A with the track in phantom.
Figure 7B:
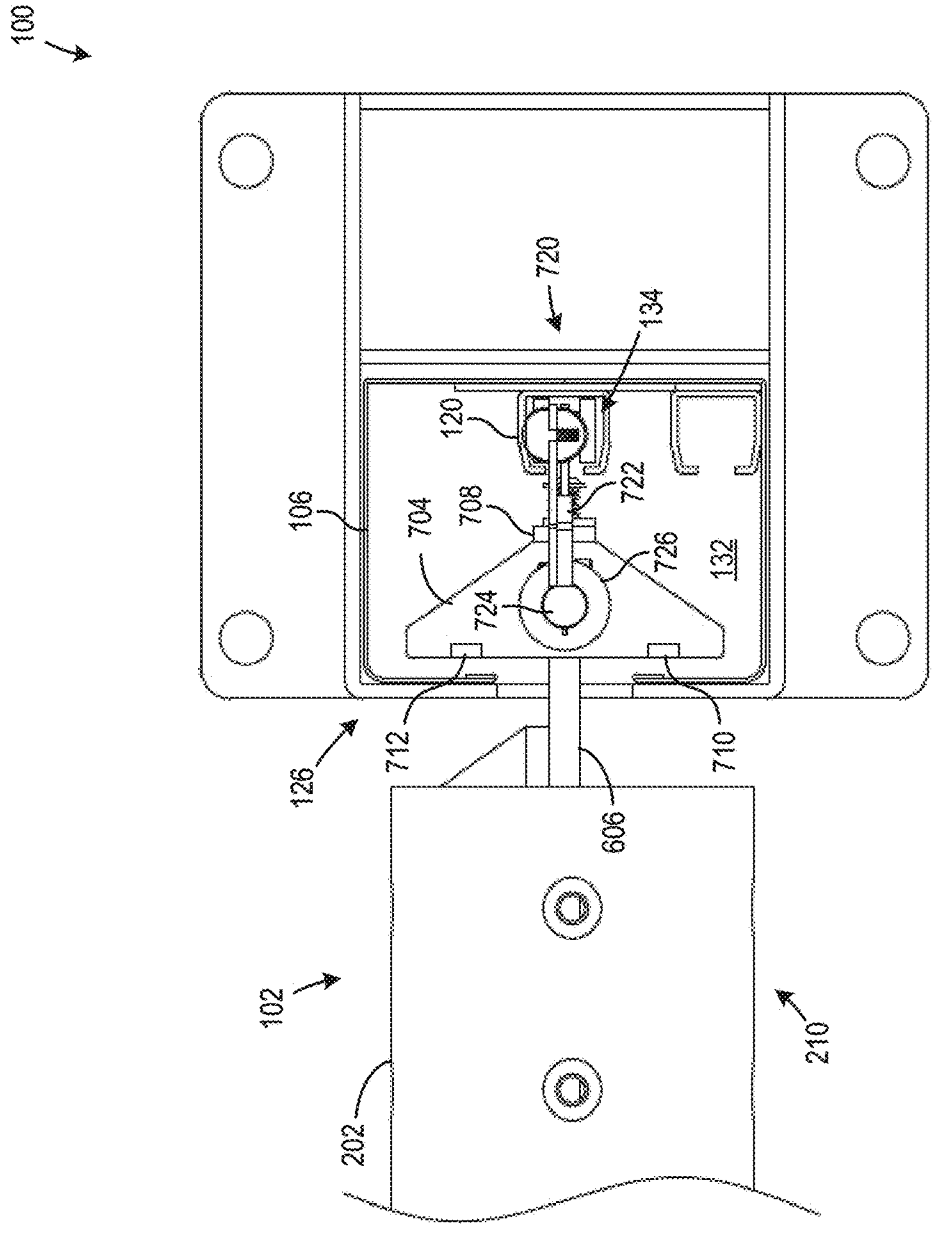

FIG. 7A is a perspective view of the first bracket 126 of the impactable gate 100 of FIG. 1A with the first track 106 in phantom. Further, FIG. 7B is a top view of the first bracket 126 of the impactable gate 100 of FIG. 1A. In the illustrated example of FIGS. 7A, the first bracket 126 includes an example body 702 coupled to the post rail 102. In the illustrated example, the body 702 includes elements coupled (e.g., welded, etc.) together. More specifically, the body 702 of the first bracket 126 includes a first example plate 704 spaced apart from a second example plate 706. In this example, the plates 704, 706 have a triangular shape. However, in other examples, the plates 704, 706 can have any other suitable shape (e.g., rectangular, circular, etc.). Furthermore, the body 702 includes a first example brace 708, a second example brace 710, and a third example brace 712 coupled to (e.g., extending between) the first and second plates 704, 706. Additionally or alternatively, the body 702 can be a single unified part based on manufacturing processes, such as machining or casting.

In the illustrated examples, the first bracket 126 is coupled to the secondary track 120 within the first (e.g., primary) track 106. As described further below in connection with FIGS. 10A, 10B, and 11A-11D, the impactable gate 100 includes an example trolley (e.g., a spring-loaded trolley) 720 (FIG. 7B) disposed within the secondary track 120. In some examples, the trolley 720 can slide and/or roll along the secondary channel 134 (FIG. 7B). In this example the trolley 720 is coupled to the first brace 708, and the bracket 126 can translate or slide along the primary channel 132 (FIG. 7B) of the first track 106 as the bracket 126 is guided by the trolley 720 in the secondary channel 134. Furthermore, the first bracket 126 includes an example tab 722 extending from the body 702 (e.g., the first brace 708) to fasten to the first drive strip 114. Thus, the bracket 126 is coupled to the first drive strip 114 and moves along the first track 106 in conjunction with movement of the first drive strip 114.

In the illustrated example of FIG. 7B, the first bracket 126 includes an example pin 724 within the body 702 that extends between the first and second plates 704, 706. Furthermore, the bracket 126 includes one or more example retaining rings 726 mounted in the first plate 704 and/or the second plate 706 to support and orient the pin 724. The retaining rings 726 allow the pin 724 to rotate relative to the bracket 126. In some examples, the retaining rings 726 include bearings (e.g., journal bearings, rolling element bearings, etc.). In the example of FIG. 7B, the perforated plate 606 of the post rail 102 is coupled to the pin 724. Thus, the first end 210 of the post rail 102 can rotate as the first tube 202 bends from an impact. Additionally or alternatively, in some examples, the perforated plate 606 includes a tube and/or sleeve at a distal end that slides or fits around the pin 724. In such examples, the post rail 102 is capable of rotating relative to the pin 724 and the body 702 of the bracket 126 regardless of whether the pin 724 is able to rotate relative to the body 702.

Figure 8A:
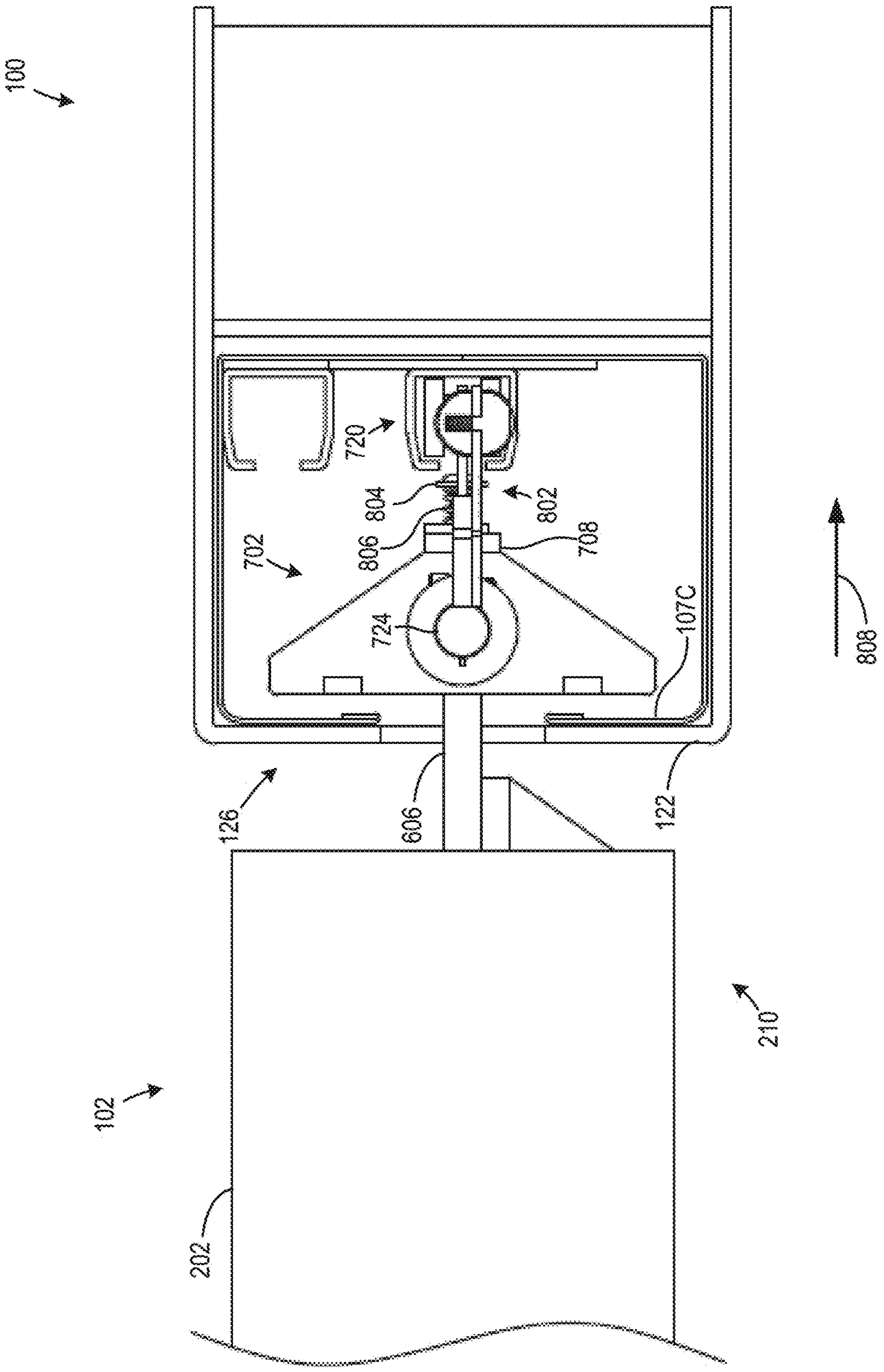
FIG. 8A is a bottom view of the bracket of FIG. 7A prior to an impact from a vehicle.
Figure 8B:
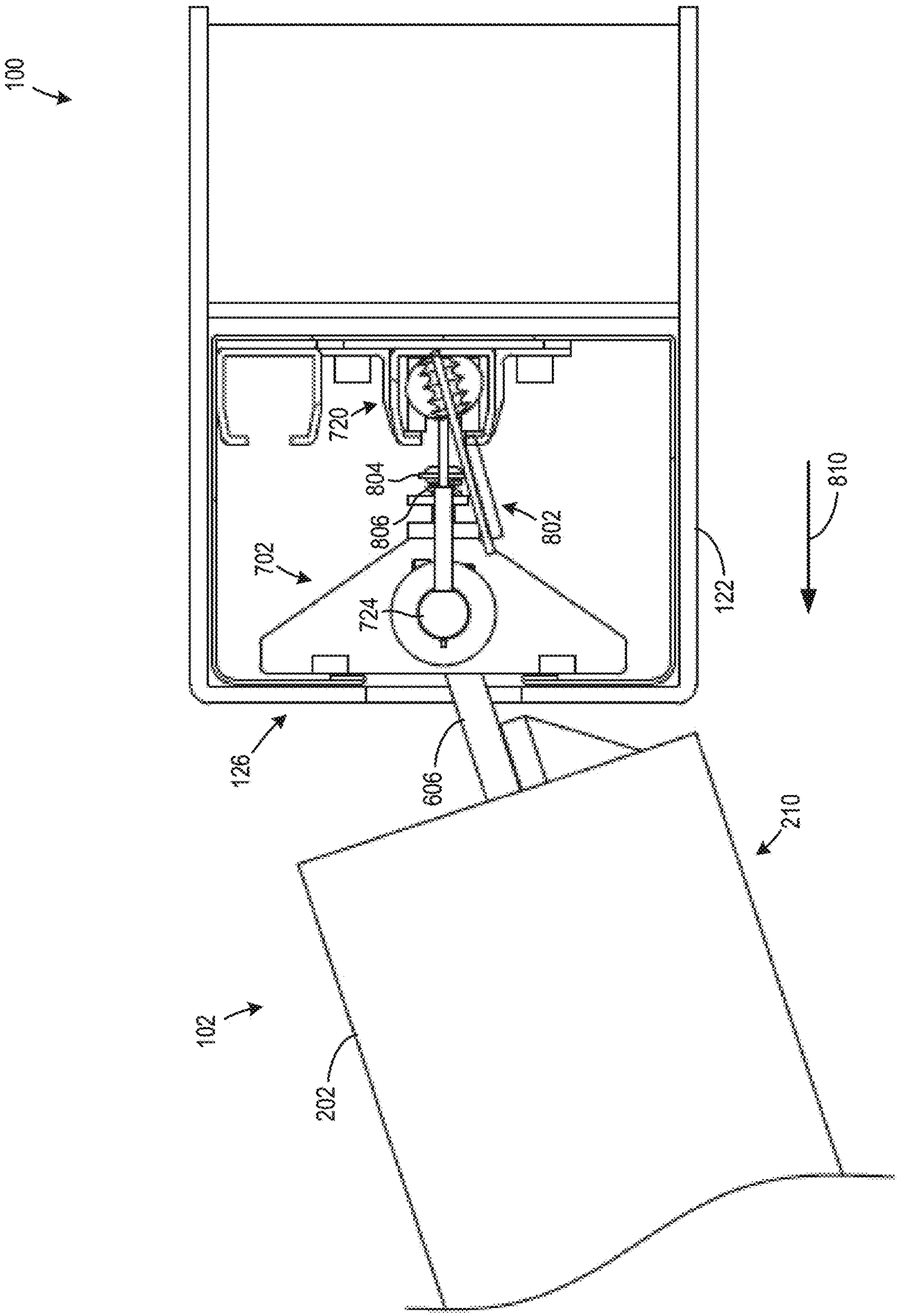
FIG. 8B is a bottom view of the bracket of FIG. 7A during an impact from a vehicle.

FIG. 8A is a bottom view of the first bracket 126 of the impactable gate 100 of FIG. 1A prior to an impact from a vehicle. Further, FIG. 8B is a bottom view of the first bracket 126 of the impactable gate 100 of FIG. 1A during an impact from a vehicle. In the illustrated examples of FIGS. 8A and/or 8B, the impactable gate 100 includes an example spring-loaded fastener 802 to couple the trolley 720 to the bracket 126. The spring-loaded fastener 802 includes an example fastener (e.g., a bolt) 804 and an example spring 806. The fastener 804 is fixed to the trolley 720 and slidably coupled to the bracket 126. For example, the fastener 804 can slide into and/or out of the first brace 708 of the bracket 126. Furthermore, the spring 806 is disposed around a portion of the fastener 804. The spring 806 interfaces the fastener 804 and the trolley 720. In some examples, the spring 806 influences or urges the bracket 126 toward the trolley 720 and away from a third internal surface 107C of the first track 106. That is, the spring 806 applies a force to the fastener 804 that acts in a first direction 808. Thus, the spring 806 maintains separation of the bracket 126 and the third internal surface 107C of the first track 106 under normal operations (e.g., prior to an impact with the post rail 102 as shown in FIG. 8A). Furthermore, the bracket 126 is to remain spaced apart from the first track 106 when the post rail 102 moves between opened and closed positions based on the spring 806.

In the illustrated example of FIG. 8B, the impactable gate 100 experiences an impact (e.g., from a vehicle) that causes the post rail 102 to bend or flex. The first bracket 126 is to be disposed within the first base post 122 when the post rail 102 is in the blocking position 110A (FIG. 1A). Thus, the bracket 126 can provide support to the post rail 102 in the event of an impact. As the post rail 102 bends, the perforated plate 606 rotates about an axis of the pin 724 (e.g., out of the page in FIG. 8B). Furthermore, the post rail 102 pulls the bracket 126 in a second direction 810 (e.g., opposite the first direction 808 of FIG. 8A). Thus, the first bracket 126 presses against (e.g., abuts, interfaces, engages, etc.) the first base post 122 based on impact forces acting on the post rail 102. That is, the bracket 126 is to be urged toward the first base post 122 in response to an impact with the post rail 102. The bracket 126 of FIG. 8B transfers loads from the impact to the first base post 122. As shown in FIG. 8B, during an impact, the spring 806 is compressed such that the bracket 126 moves laterally (in the second direction 810) relative to the trolley 720. As a result, the impacts forces can be transferred to the base post 122 without dislodging the trolley 720 from the secondary track 120.

Figure 9A:
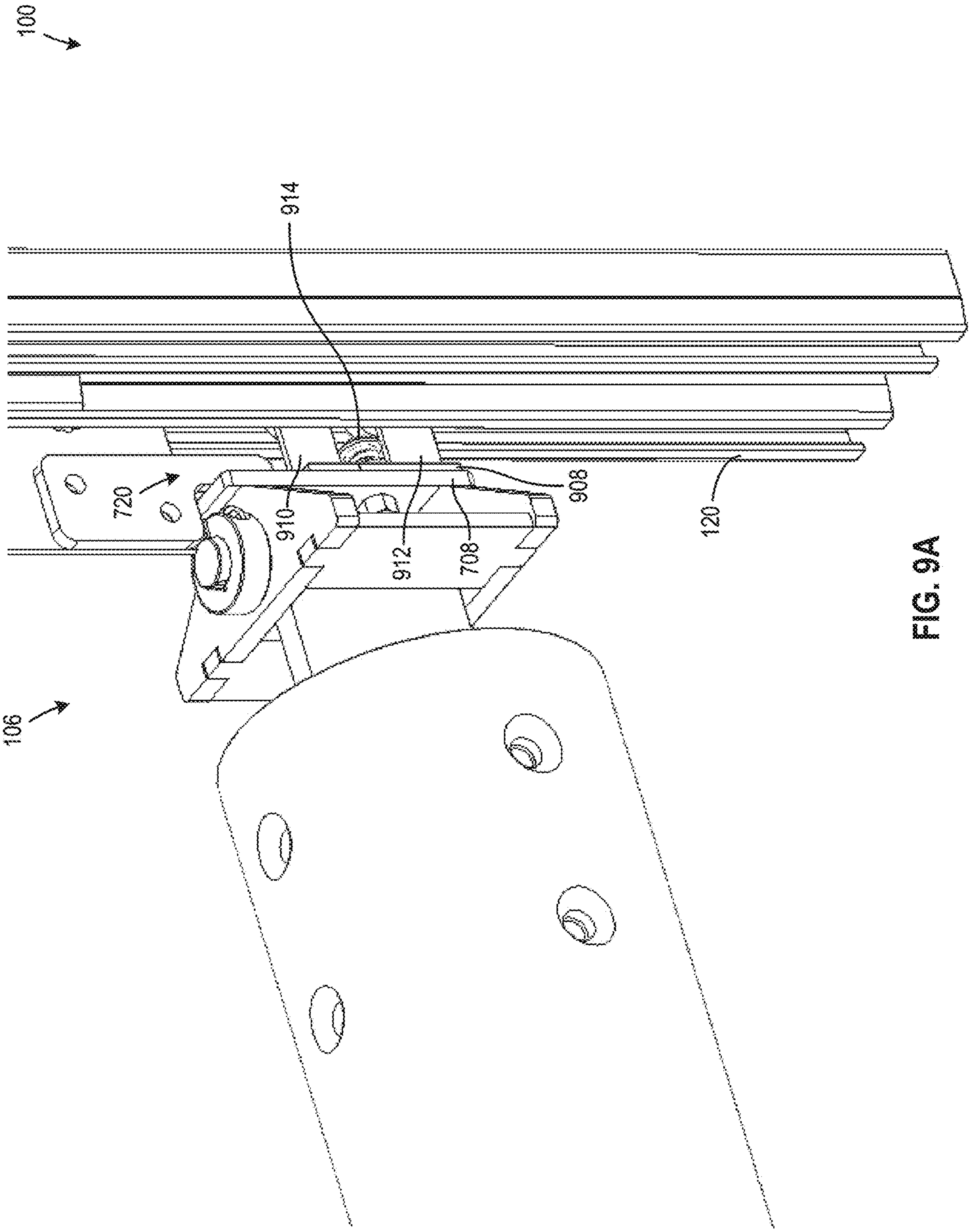
FIG. 9A is side view of a trolley of the impactable gate of FIG. 1A with the first track omitted.
Figure 9B:
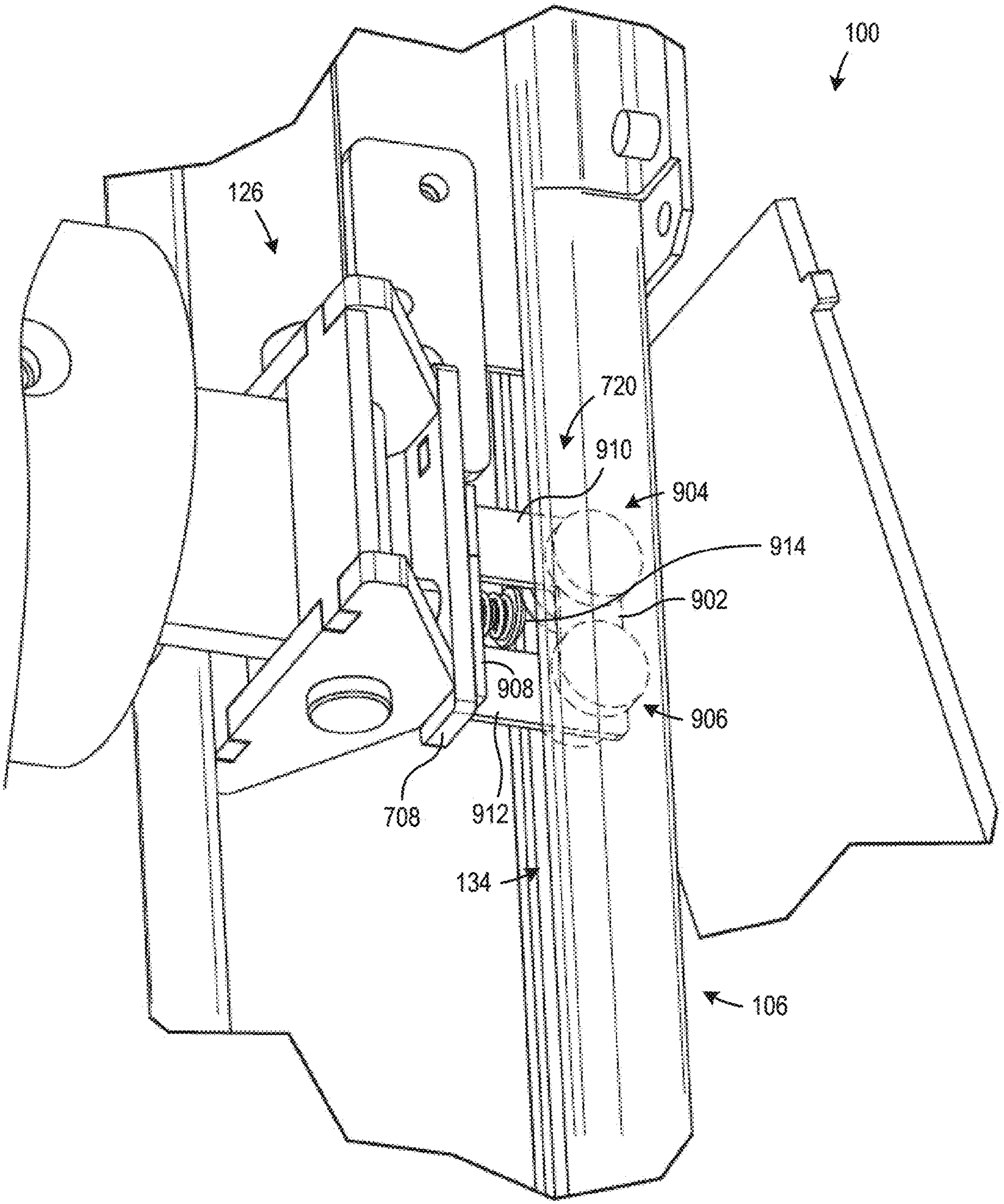
FIG. 9B is a perspective view of the trolley of FIG. 9A with the tube of the post rail and the associated tracks omitted.

FIG. 9A is side view of the trolley 720 of the impactable gate 100 of FIG. 1A with the first track 106 omitted. Further, FIG. 9B is a perspective view of the trolley 720 of the impactable gate 100 of FIG. 1A with the first tube 202 of the post rail 102 and the associated primary and secondary tracks 106, 120 omitted for the sake of clarity. In the illustrated examples of FIGS. 9A and/or 9B, the trolley 720 is to be disposed within the first track 106 and coupled to the bracket 126. In the examples of FIGS. 9A and/or 9B, the trolley 720 includes an example chassis 902, first example wheels 904, and second example wheels 906 disposed within the secondary track 120 (FIG. 9A). In some examples, the first wheels 904 and the second wheels 906 can be coupled to the chassis 902 via axles. The wheels 904, 906 of the trolley 720 ride along the secondary channel 134. The spring-loaded fastener 802 influences the trolley 720 toward the post rail 102 such that the wheels 904, 906 contact an inner surface of the secondary track 120. Thus, the spring-loaded fastener 802 pulls the bracket 126 and the trolley 720 toward each other.

In the illustrated examples of FIGS. 9A and/or 9B, the trolley 720 includes an example platform 908 coupled to the chassis 902. Further, the trolley 720 includes a first example tab 910 and a second example tab 912 extending from the chassis 902 and coupled to the platform 908. In some examples, the spring-loaded fastener 802 is coupled to the platform 908 of the trolley 720. In some examples, the spring 806 is coupled to the platform 908 and a head 914 of the fastener 804. In some examples, the first brace 708 of the bracket 126 contacts the platform 908 when the post rail 102 is in a non-impacted position.

Figure 10A:
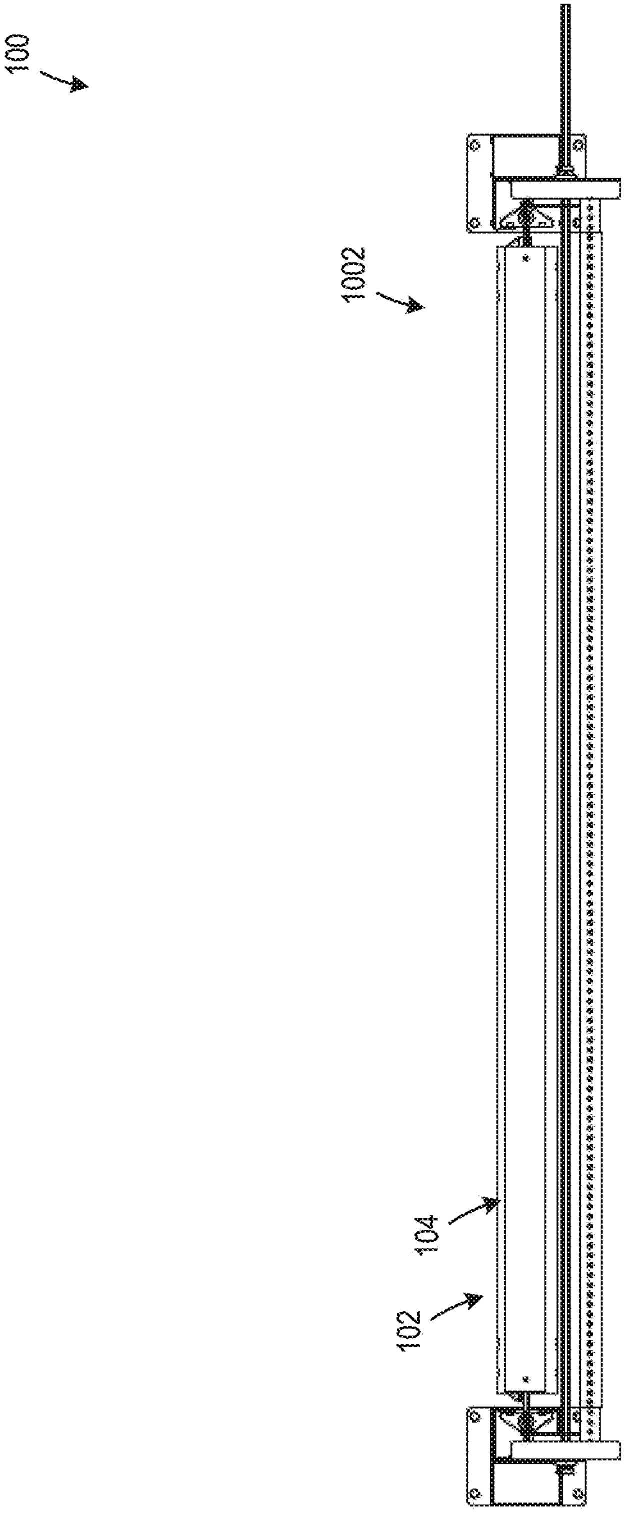
FIG. 10A is a top view of the impactable gate of FIG. 1A in a non-impacted state.
Figure 10B:
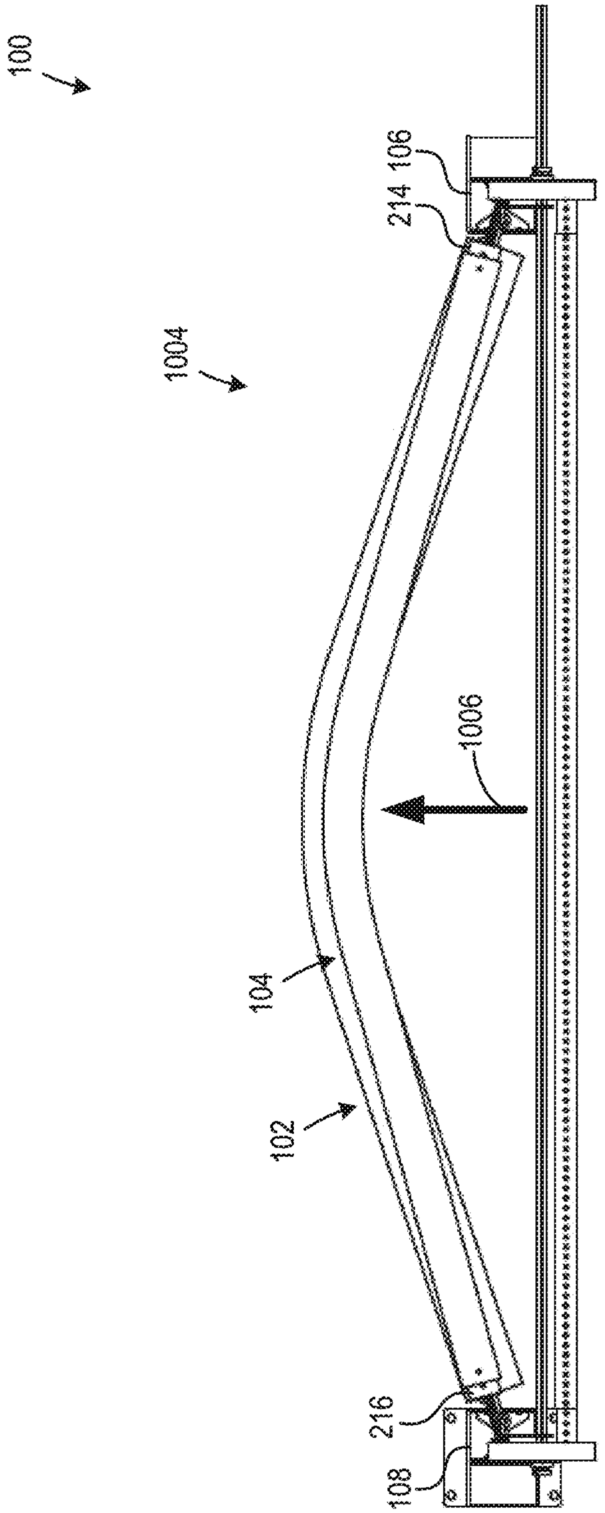
FIG. 10B is a top view of the impactable gate of FIG. 1A in an impacted state.

FIG. 10A is a top view of the impactable gate 100 of FIG. 1A in a non-impacted state. Further, FIG. 10B is a top view of the impactable gate 100 of FIG. 1A in an impacted state. Prior to an impact from a vehicle, the post rail 102 and the track rail 104 are in a non-impacted position 1002 shown in FIG. 10A. In response to an impact from a vehicle, the post rail 102 and the track rail 104 bend into an impacted position 1004 shown in FIG. 1B. More specifically, in the illustrated example of FIG. 10B, a vehicle and/or other object (e.g., a forklift backing into the impactable gate 100) can impart an impact force 1006 on the post and track rails 102, 104 of the impactable gate 100. In some examples, the impact force 1006 causes the post and track rails 102, 104 to bend. In FIG. 10B, the impact force 1006 is acting in a first direction (e.g., forward in FIG. 10B). In some examples, the impactable gate 100 is capable of withstanding the impact force 1006 acting in a second direction different from (e.g., opposite to) the first direction. As shown in FIG. 10B, ends of the track rail 104 are inset relative to ends of the post rail 102 because the track rail 104 slides relative to the slip sleeves 214, 216 used to couple the track rail 104 to the tracks 106, 108 as discussed above.

Figure 11A:
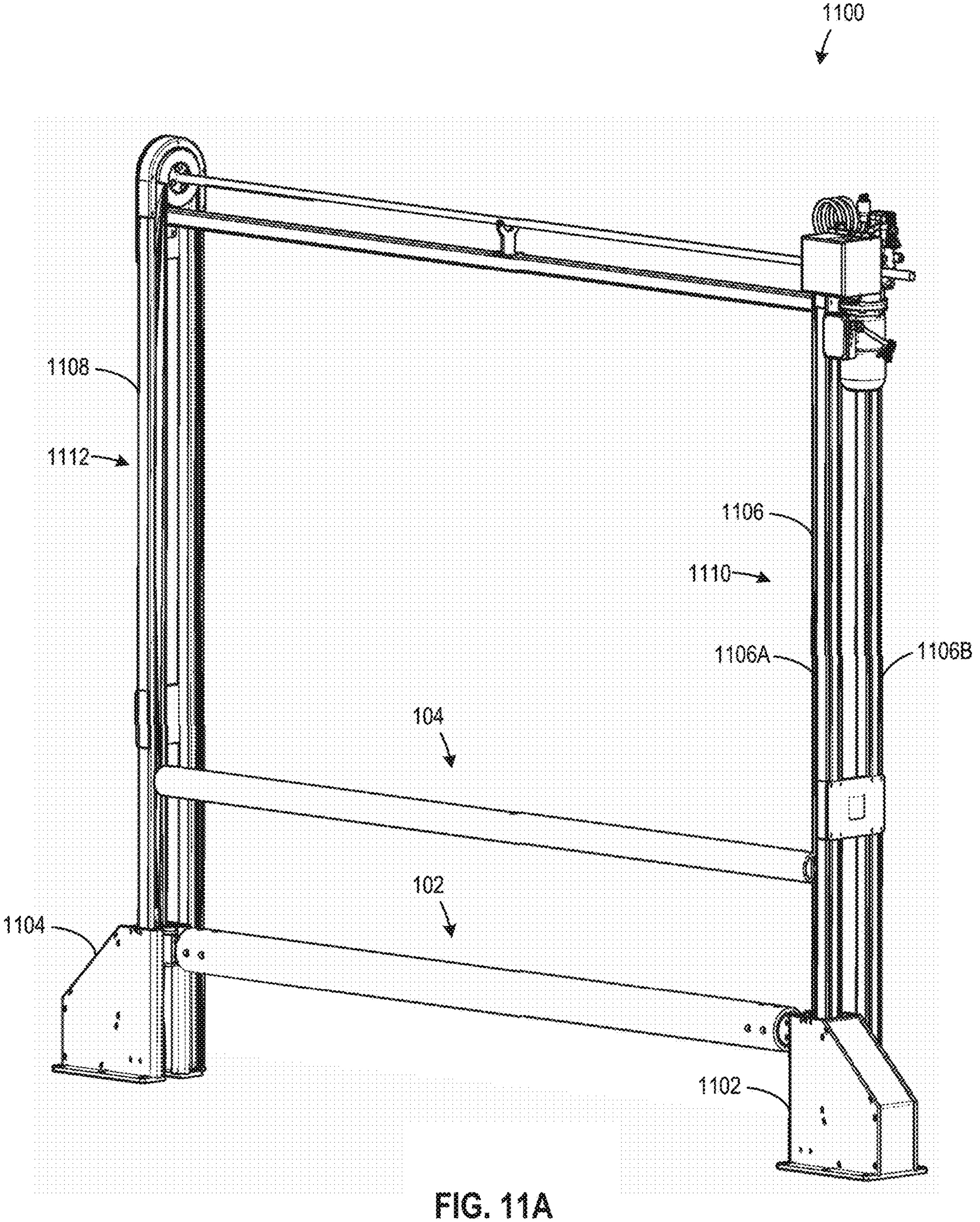
FIG. 11A is a perspective view of a second example impactable gate in accordance with teachings disclosed herein.
Figure 11B:
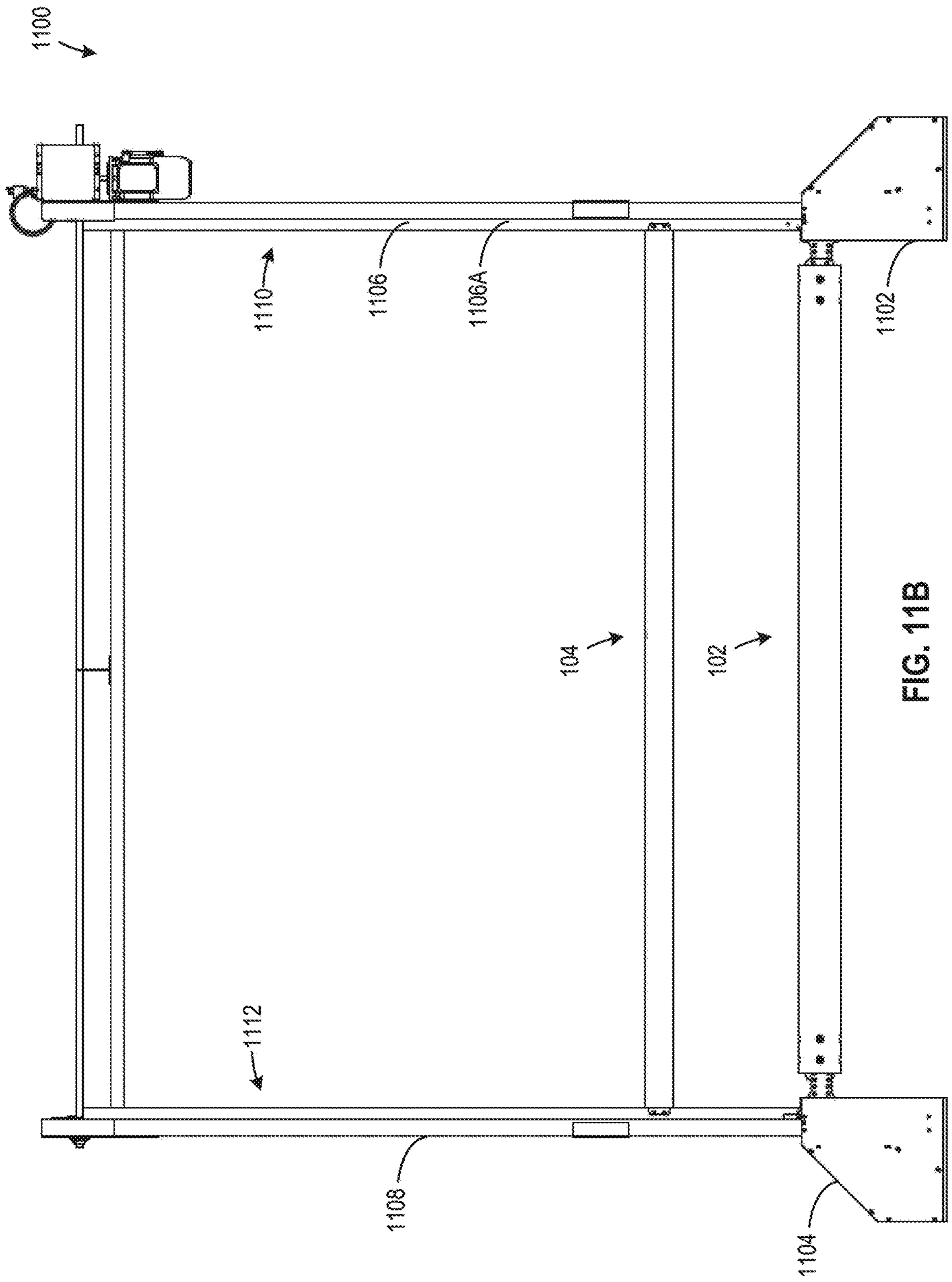
FIG. 11B is a front view of the second impactable gate of FIG. 11A.

FIG. 11A is a perspective view of a second example impactable gate 1100 in accordance with teachings disclosed herein. Further, FIG. 11B is a front view of the second impactable gate 1100 of FIG. 11A. In some examples, the second impactable gate 1100 can be implemented as an impactable gate system or apparatus. In the illustrated examples of FIGS. 11A and/or 11B, the second impactable gate 1100 includes the post rail 102 and the track rail 104 of the impactable gate 100 of FIG. 1A. In some examples, a first base post 1102 and a second base post 1104 of the second impactable gate 1100 are larger than the first and second base posts 122, 124 of FIG. 1A. In some examples, the second impactable gate 1100 can block impacts of similar intensity relative to the impactable gate 100 of FIG. 1A.

In the illustrated examples of FIGS. 11A and/or 11B, the second impactable gate 1100 includes a first track 1106 and a second track 1108. The first and second tracks 1106, 1108 of FIGS. 11A and 11B are similar to the secondary track 120 of FIGS. 1D and 1E. However, the second impactable gate 1100 does not include the first (e.g., primary) track 106 nor the primary channel 132 of FIGS. 1A-1E. Rather, the first track 1106 of FIGS. 11A and/or 11B defines a first example channel 1110, and the second track 1108 defines a second example channel 1112. The first track 1106 and the second track 1108 are similar. Thus, descriptions of the first track 1106 can likewise apply to the second track 1108.

In the illustrated examples of FIGS. 11A and/or 11B, the first track 1106 is similar to the secondary track 120 of FIGS. 1D and 1E. However, in contrast to the secondary track 120, the first track 1106 of FIGS. 11A and/or 11B is exposed to an exterior environment. Furthermore, a first example portion (e.g., an ascending portion) 1106A of the first track 1106 is to be disposed within the first base post 1102, and a second example portion (e.g., a descending portion) 1106B (FIG. 11A) is to be disposed outside of (e.g., alongside) the first base post 1102. Thus, the second impactable gate 1100 of FIGS. 11A and 11B provides more space within the first base post 1102 for a bracket that is larger, stronger, and/or more supportive for the post rail 102 relative to the bracket 126 of FIG. 1B. Descriptions of an example bracket that can be implemented in the second impactable gate 1100 are provided below in connection with FIGS. 14A, 14B, and 15A-15D.

Figure 12A:
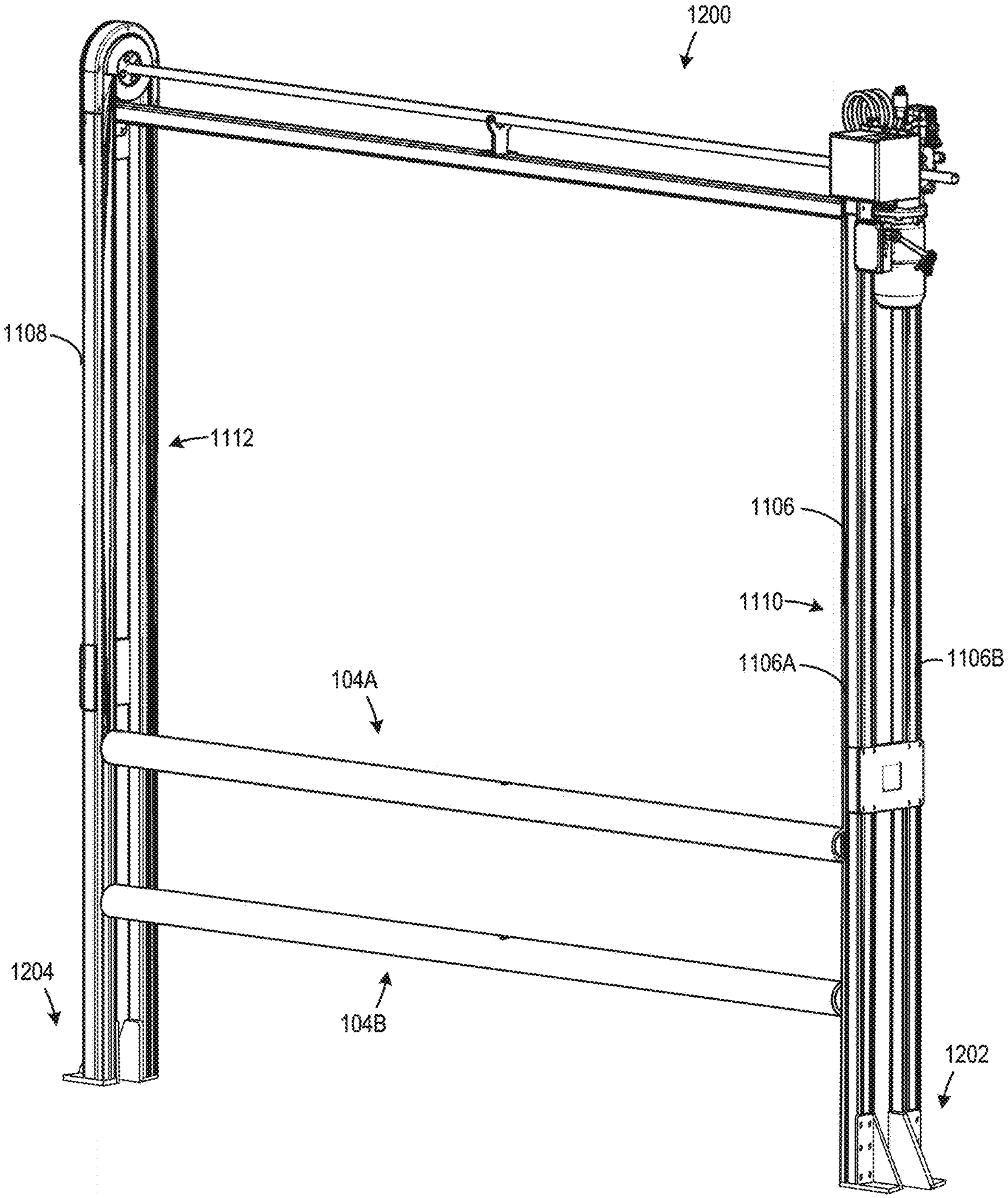
FIG. 12A is a perspective view of a third example impactable gate in accordance with teachings disclosed herein.
Figure 12B:
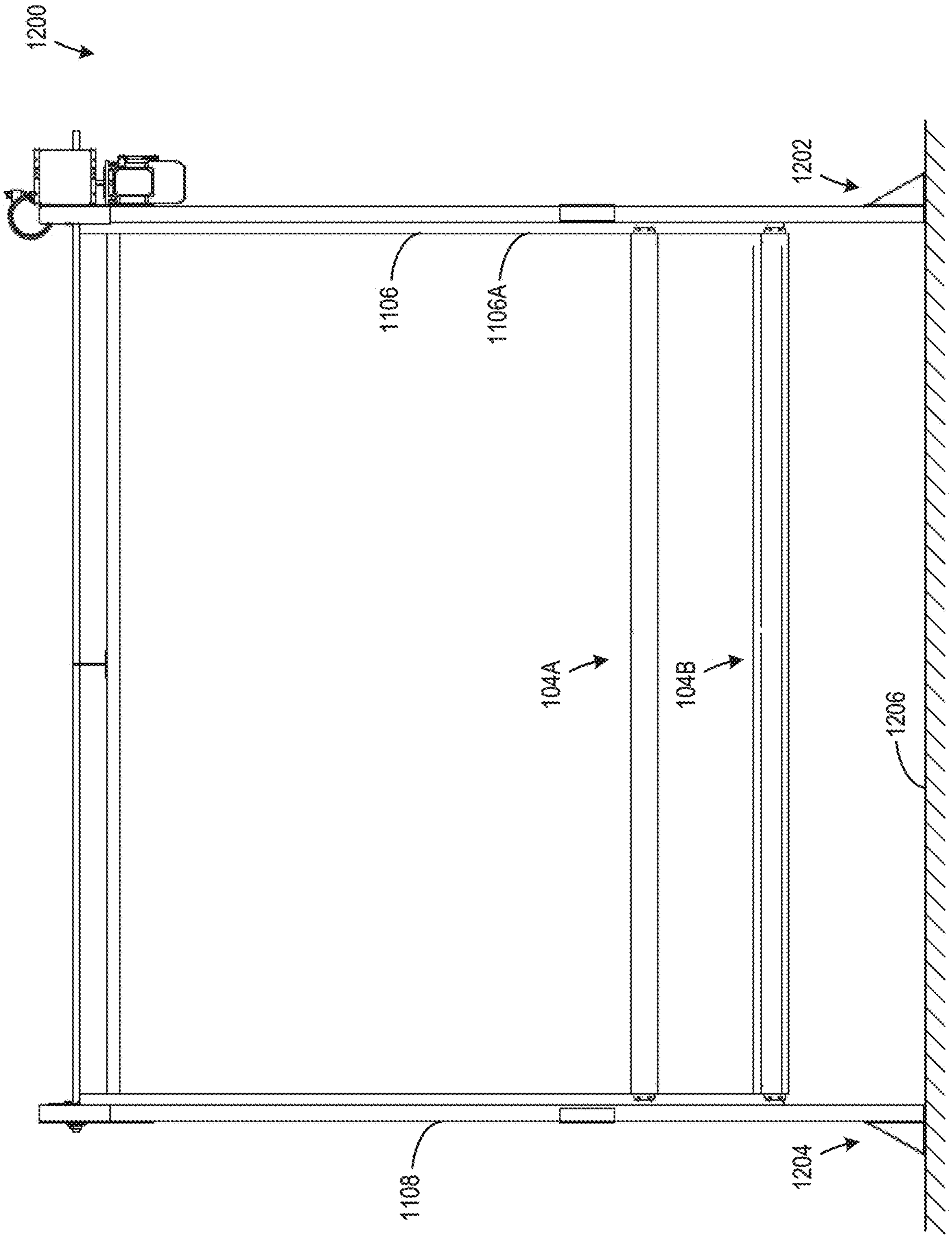
FIG. 12B is a front view of the third impactable gate of FIG. 12A.

FIG. 12A is a perspective view of a third example impactable gate 1200 in accordance with teachings disclosed herein. Further, FIG. 12B is a front view of the third impactable gate 1200 of FIG. 12A. In some examples, the third impactable gate 1200 is able to withstand impacts of lesser magnitude relative to the impactable gate 100 of FIG. 1A and/or the second impactable gate 1100 of FIG. 11A. For example, the third impactable gate 1200 does not include the post rail 102 of FIG. 1A. Rather, the third impactable gate 1200 includes a first example track rail 104A and a second example track rail 104B that are similar to the track rail 104 of FIG. 1A. In some examples, the third impactable gate 1200 includes more or fewer rails similar to the track rail 104 based on an expected vehicle and/or impact force.

In the illustrated examples of FIGS. 12A and/or 12B, the third impactable gate 1200 includes a first example floor bracket 1202 and a second example floor bracket 1204. In some examples, the first floor bracket 1202 is to couple the first track 1106 to a surface 1206 (e.g., the floor 130 of FIG. 1B), and the second floor bracket 1204 is to couple the second track 1108 to the surface 1206. The first floor bracket 1202 and the second floor bracket 1204 are similar. Thus, descriptions of the first floor bracket 1202 can likewise apply to the second floor bracket 1204. The first floor bracket 1202 of the illustrated examples corresponds to a right angle bracket coupled to both the first portion 1106A and the second portion 1106B of the first track 1106. In some examples, the first floor bracket 1202 includes a first right angle bracket coupled to the first portion 1106A and a second right angle bracket coupled to the second portion 1106B.

Figure 13A:
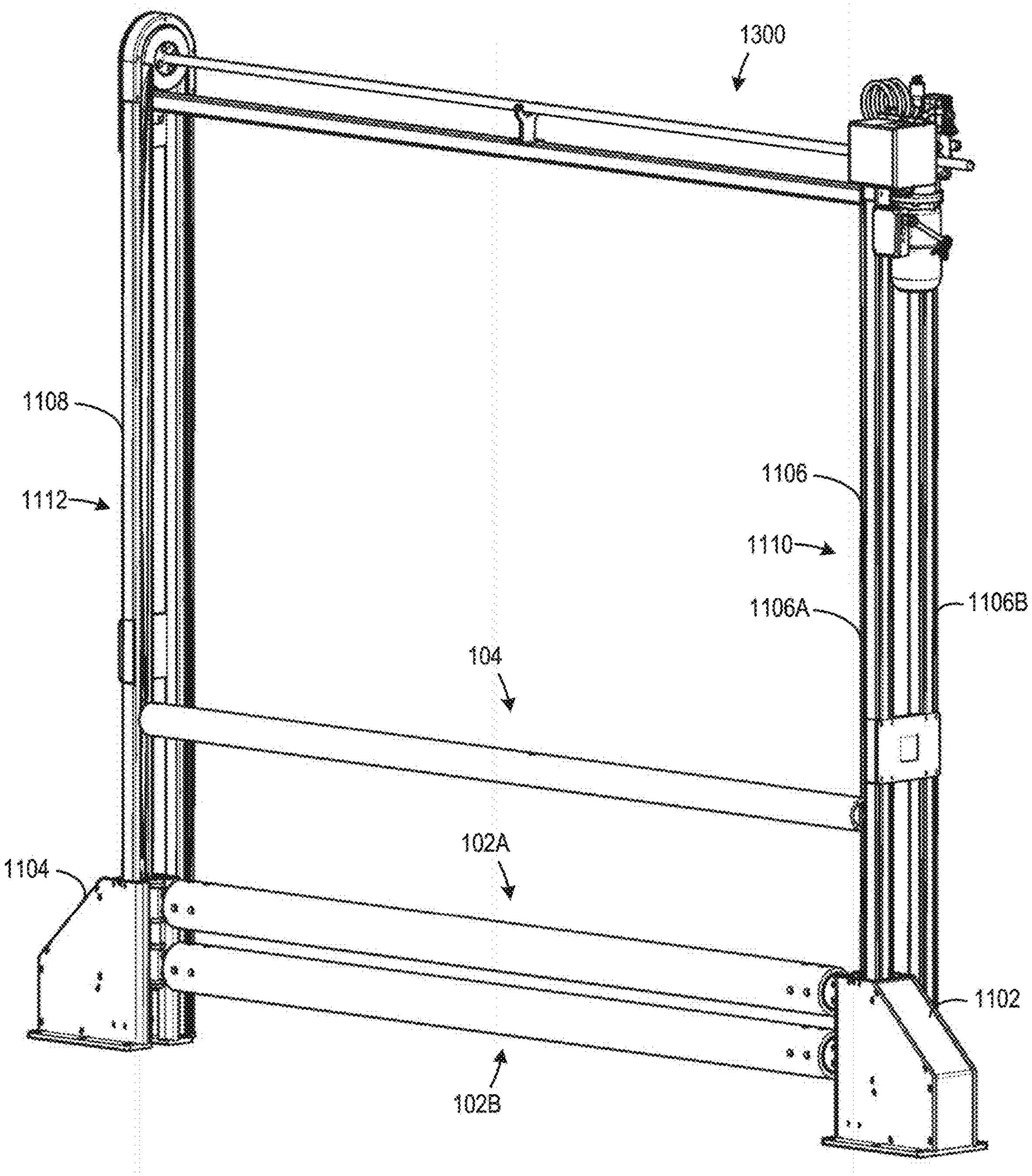
FIG. 13A is a perspective view of a fourth example impactable gate in accordance with teachings disclosed herein.
Figure 13B:
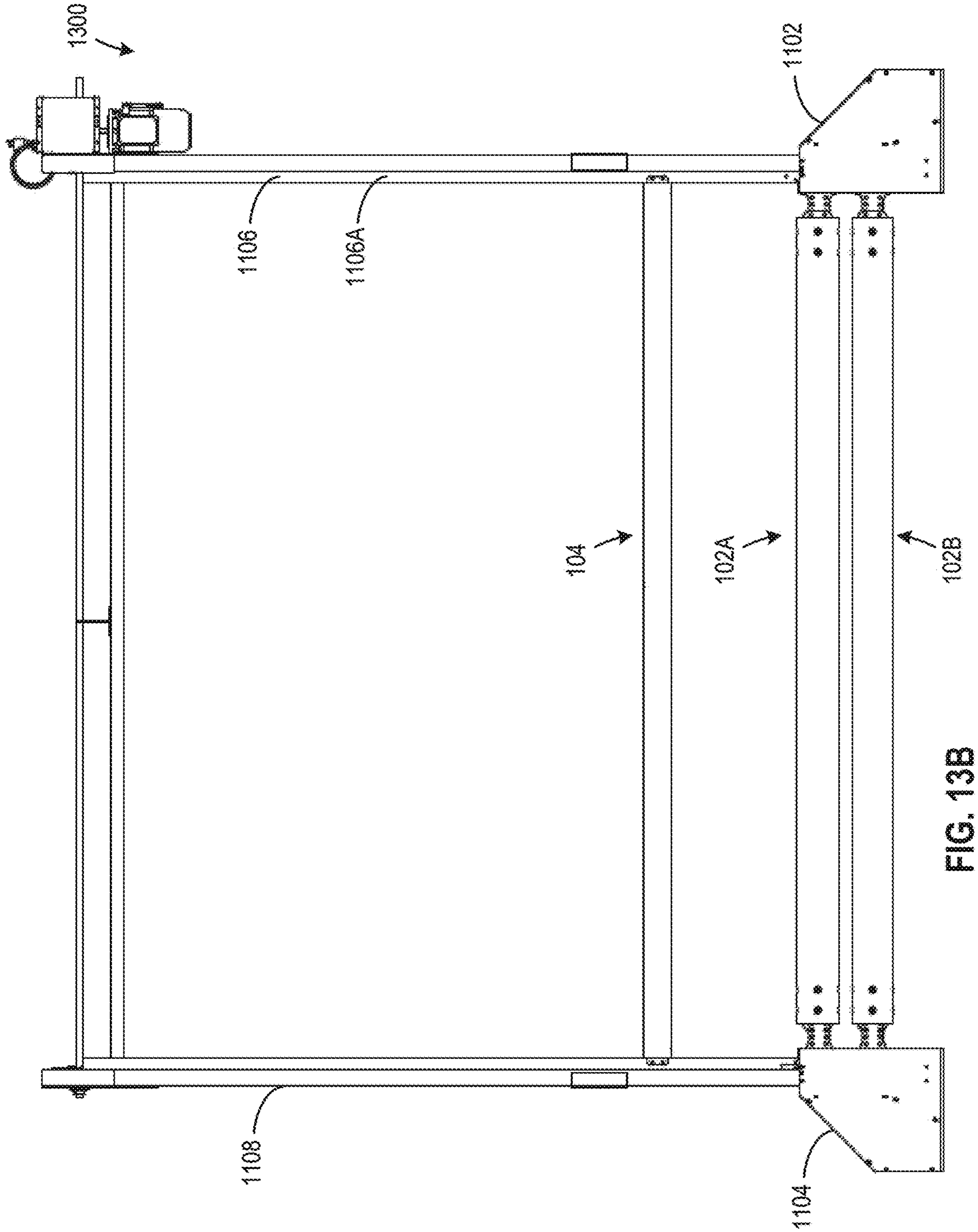
FIG. 13B is a front view of the fourth impactable gate of FIG. 13A.

FIG. 13A is a perspective view of a fourth example impactable gate 1300 in accordance with teachings disclosed herein. Further, FIG. 13B is a front view of the fourth impactable gate 1300 of FIG. 13A. In some examples, the fourth impactable gate 1300 is able to withstand impacts of greater magnitude relative to the impactable gate 100 of FIGS. 1A-1E, the second impactable gate 1100 of FIGS. 11A and/or 11B, and/or the third impactable gate 1200 of FIGS. 12A and/or 12B. In the illustrated examples of FIGS. 13A and/or 13B, the fourth impactable gate 1300 includes a first example post rail 102A and a second example post rail 102B. The first and second post rails 102A, 102B are similar to the post rail 102 of FIG. 1A. In some examples, the fourth impactable gate 1300 includes more of the post rails 102 (e.g., more than two) based on an expected vehicle and/or impact force. By including at least two of the post rails 102A, 102B, the fourth impactable gate 1300 can withstand greater impacts compared to impactable gates implementing only one post rail 102 (e.g., the impactable gate 100 of FIGS. 1A-1E, the second impactable gate 1100 of FIGS. 11A and/or 11B, and/or the third impactable gate 1200 of FIGS. 12A and/or 12B).

Figure 14A:
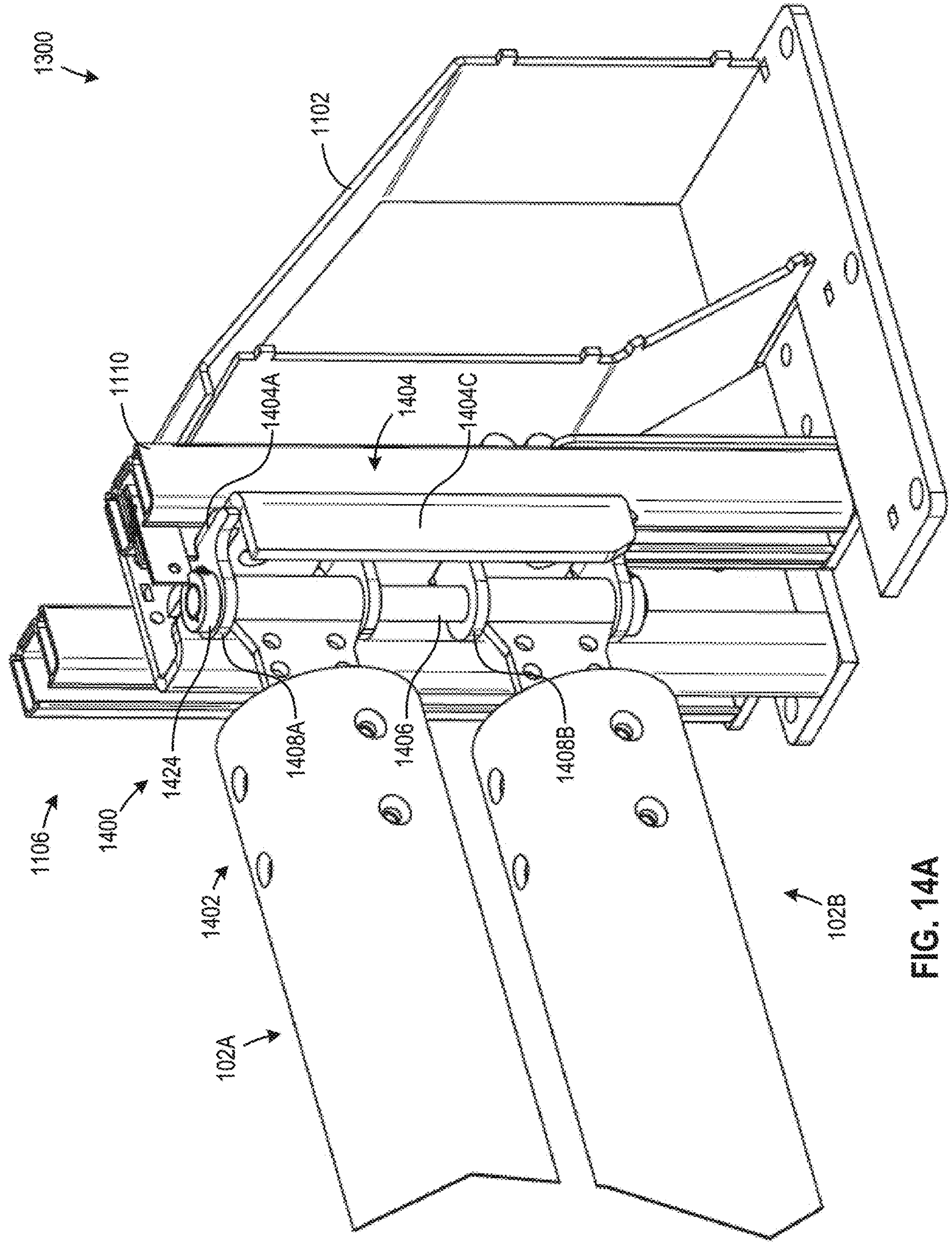
FIG. 14A is a perspective view of another example bracket that can be implemented in the second impactable gate of FIG. 11A and/or the fourth impactable gate of FIG. 13A.
Figure 14B:
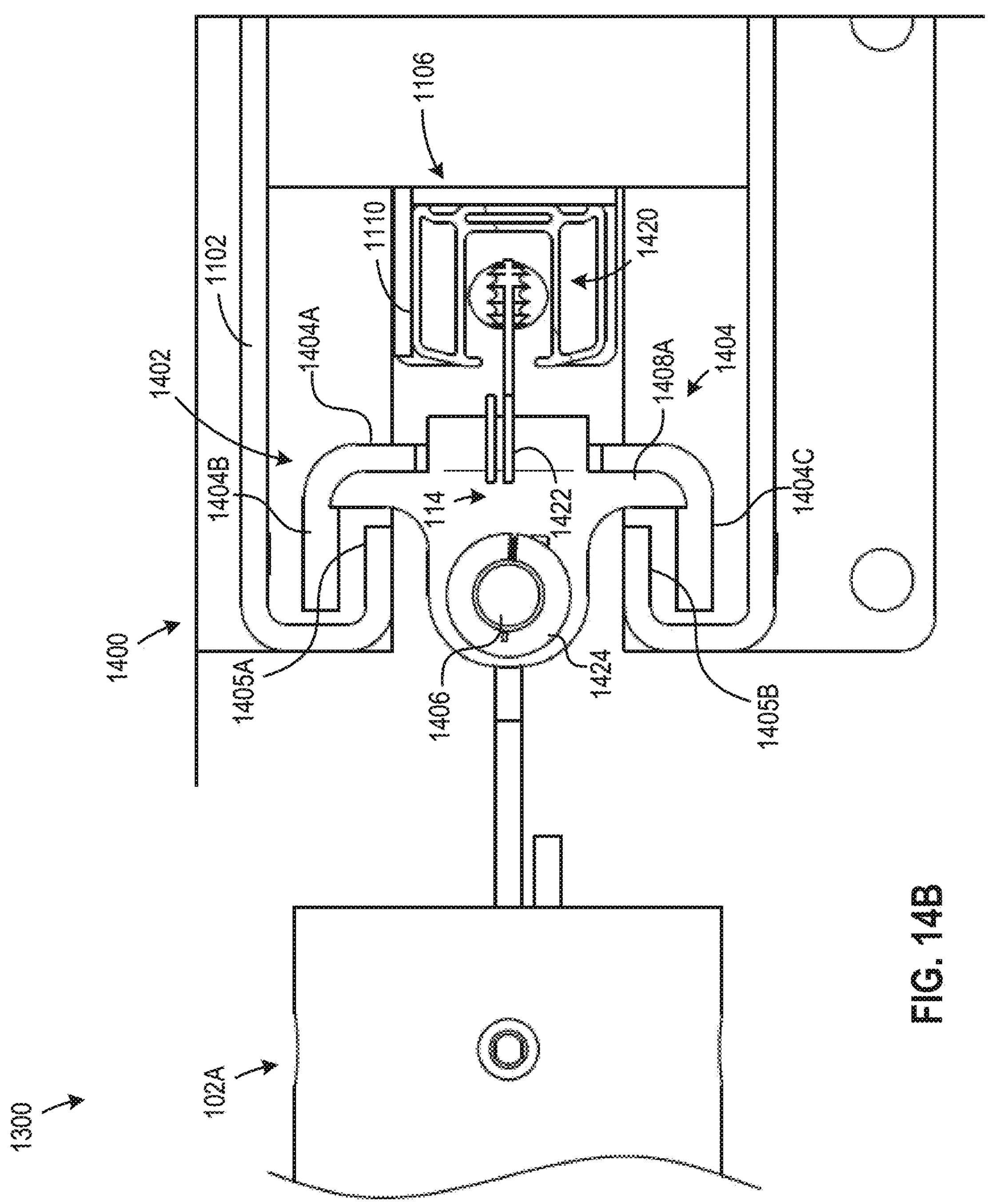
FIG. 14B is a top view of the bracket of FIG. 14A.

FIG. 14A is a perspective view of an example U-bracket 1400 that can be implemented in the second impactable gate 1100 of FIG. 11A and/or the fourth impactable gate 1300 of FIG. 13A. In some examples, the U-bracket 1400 of FIG. 14A may be used in place of the bracket 126 of the first impactable gate 100. Further, FIG. 14B is a top view of the U-bracket 1400 of FIG. 14A. In the illustrated example of FIG. 14A, portions of the first base post 1102 are removed for clarity.

In the illustrated examples of FIGS. 14A and/or 14B, the U-bracket 1400 includes an example body 1402 coupled to the first post rail 102A and the second post rail 102B of the fourth impactable gate 1300 of FIGS. 13A and 13B. In the illustrated examples, the body 1402 includes elements coupled (e.g., welded, etc.) together. More specifically, the body 1402 of the U-bracket 1400 includes a frame 1404 extending along a length of a pin 1406. In this example, the frame 1404 includes a back panel 1404A as well as a first side flange 1404B and a second side flange 1404C extending away from the back panel 1404A. As shown, all three of the back panel 1404A, the first side flange 1404B, and the second side flange 1404C extend along the length of the first track 1106. In this example, the side flanges 1404B, 1404C extend toward the post rail 102A in a direction substantially orthogonal to the back panel 1404A. In other examples, the side flanges 1404B, 1404C can extend away from the back panel 1404A at a different angle than what is shown in the illustrated example.

As most clearly shown in FIG. 14B, the side flanges 1404B, 1404C are spaced apart to fit around and overlap with a first support flange 1405A and a second support flange 1405B on the first base post 1102. In this example, the support flanges 1405A, 1405B extend away from the post rail 102A (e.g., in a direction opposite to the side flanges 1404B, 1404C of the frame 1404 of the U-bracket 1400). As a result, during an impact, the support flanges 1405A, 1405B engage with and catch the side flanges 1404B, 1404C to transfer an impact force from the post rail 102A to the first base post 1102. Further, in the illustrated example, the frame 1404 includes at least a first plate 1408A and a second plate 1408B (FIG. 14A) coupled to the back panel 1404A, the first side flange 1404B, and the second side flange 1404C. The first plate 1408A maintains a connected position of the first post rail 102A on the pin 1406, and the second plate 1408B maintains a connected position of the second post rail 102B on the pin 1406.

In the illustrated examples of FIGS. 14A and/or 14B, the U-bracket 1400 is coupled to the first channel 1110 of the first track 1106. In some examples, the fourth impactable gate 1300 includes an example trolley 1420 disposed within the first channel 1110. The trolley 1420 can ride or slide along the internal channel 1110. Further, the trolley 1420 is coupled to the frame 1404, and the U-bracket 1400 can translate along the first track 1106. Furthermore, the U-bracket 1400 includes a tab 1422 extending from the body 1402 (e.g., the frame 1404) to fasten the U-bracket 1400 to the first drive strip 114. Thus, the U-bracket 1400 is coupled to the first drive strip 114 and moves in conjunction with the first drive strip 114.

In the illustrated example of FIG. 14B, the U-bracket 1400 includes one or more retaining rings 1424 mounted on at least the first plate 1408A to support and orient the pin 1406. In some examples, the retaining rings 1424 include bearings to allow the pin 1406 to rotate relative to the U-bracket 1400. The first and second post rails 102A, 102B can rotate relative to the U-bracket 1400 based on the pin 1406. Although the U-bracket 1400 of the illustrated examples is implemented in the fourth impactable gate 1300, the U-bracket 1400 can also be implemented in the second impactable gate 1100 and/or in the first impactable gate 100.

Figure 15B:
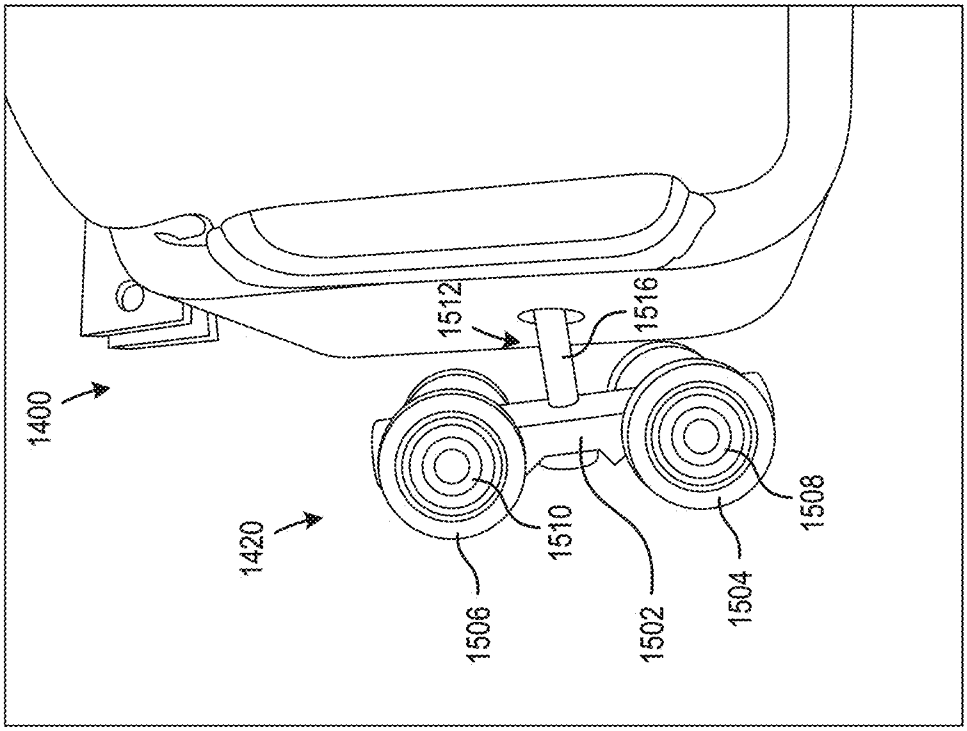
FIG. 15B is a side perspective view of the bracket and the trolley of FIG. 15A.
Figure 15A:
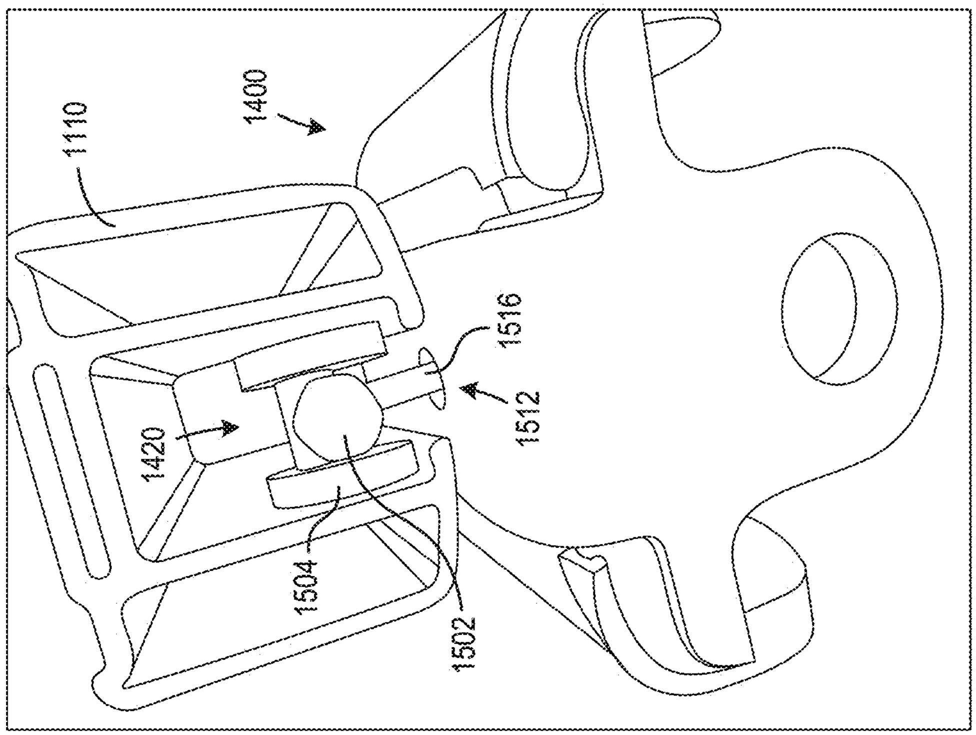
FIG. 15A is a bottom perspective view of the bracket and another example trolley of FIGS. 14A and 14B.
Figure 15D:
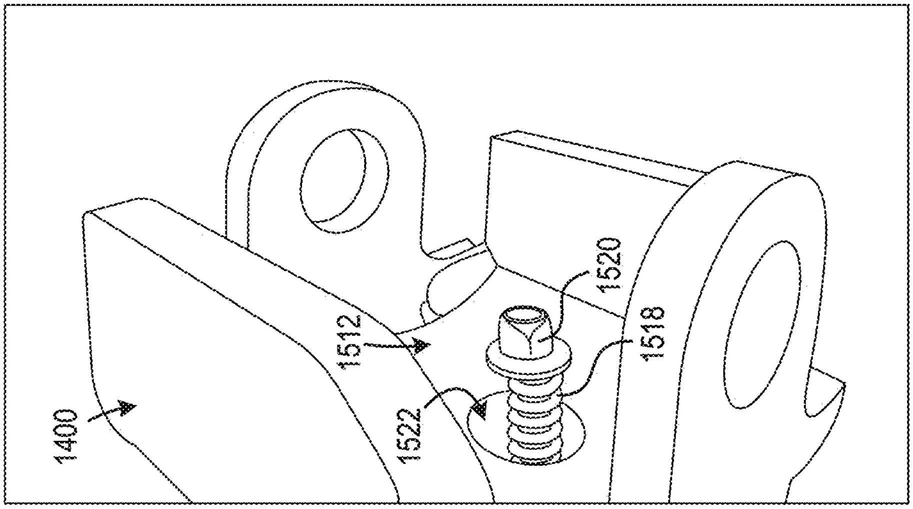
FIGS. 15C and 15D are other bottom perspective views of the bracket and the trolley of FIGS. 15A and 15B.
Figure 15C:
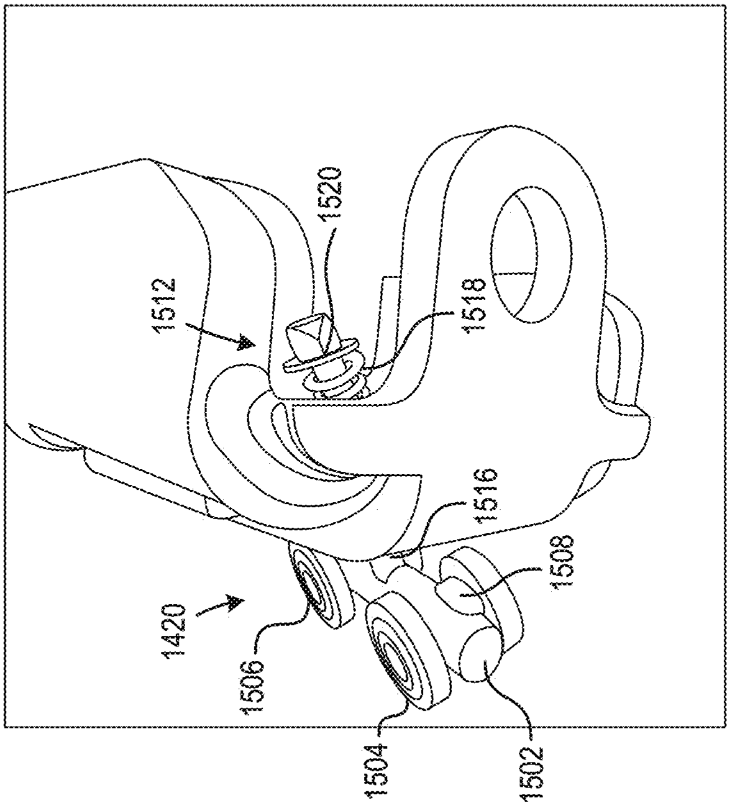

FIG. 15A is a bottom perspective view of the U-bracket 1400 and the trolley 1420 of FIGS. 14A and/or 14B. Further, FIG. 15B is a side perspective view of the U-bracket 1400 and the trolley 1420 of FIG. 15A external to the first channel 1110. FIGS. 15C and 15D are other bottom perspective views of the U-bracket 1400 and the trolley 1420 of FIGS. 15A and/or 15B. In the illustrated example of FIG. 15A, the trolley 1420 is to be disposed within the first channel 1110 and coupled to the U-bracket 1400. More specifically, in the illustrated examples of FIGS. 15A-15B, the trolley 1420 includes a chassis 1502, first wheels 1504, and second wheels 1506 disposed within the first channel 1110. The first wheels 1504 are coupled to the chassis 1502 via a first axle 1508. The second wheels 1506 are coupled to the chassis 1502 via a second axle 1510. The first and second wheels 1504, 1506 of the trolley 1420 ride along the first channel 1110. The trolley 1420 includes a spring-loaded fastener 1512 to couple the trolley 1420 to the U-bracket 1400. In some examples, the spring-loaded fastener 1512 influences or urges the U-bracket 1400 and the trolley 1420 toward each other.

In the illustrated examples, the spring-loaded fastener 1512 of the trolley 1420 includes a bolt 1516 and a spring 1518. Furthermore, the spring-loaded fastener 1512 includes an end cap 1520 (e.g., nut and washer, etc.) to retain the spring 1518. The spring 1518 is disposed within a counterbored hole 1522 of the U-bracket 1400. Thus, the spring 1518 contacts the end cap 1520 and a sunken surface within the counterbored hole 1522. In some examples, the spring-loaded fastener 802 of FIGS. 8A-8B can be used instead of the spring-loaded fastener 1512 of FIGS. 15A-15D. Likewise, in some examples, the spring-loaded fastener 1512 of FIGS. 15A-15D can be used instead of the spring-loaded fastener 802 of FIGS. 8A-8B.

Figure 16:
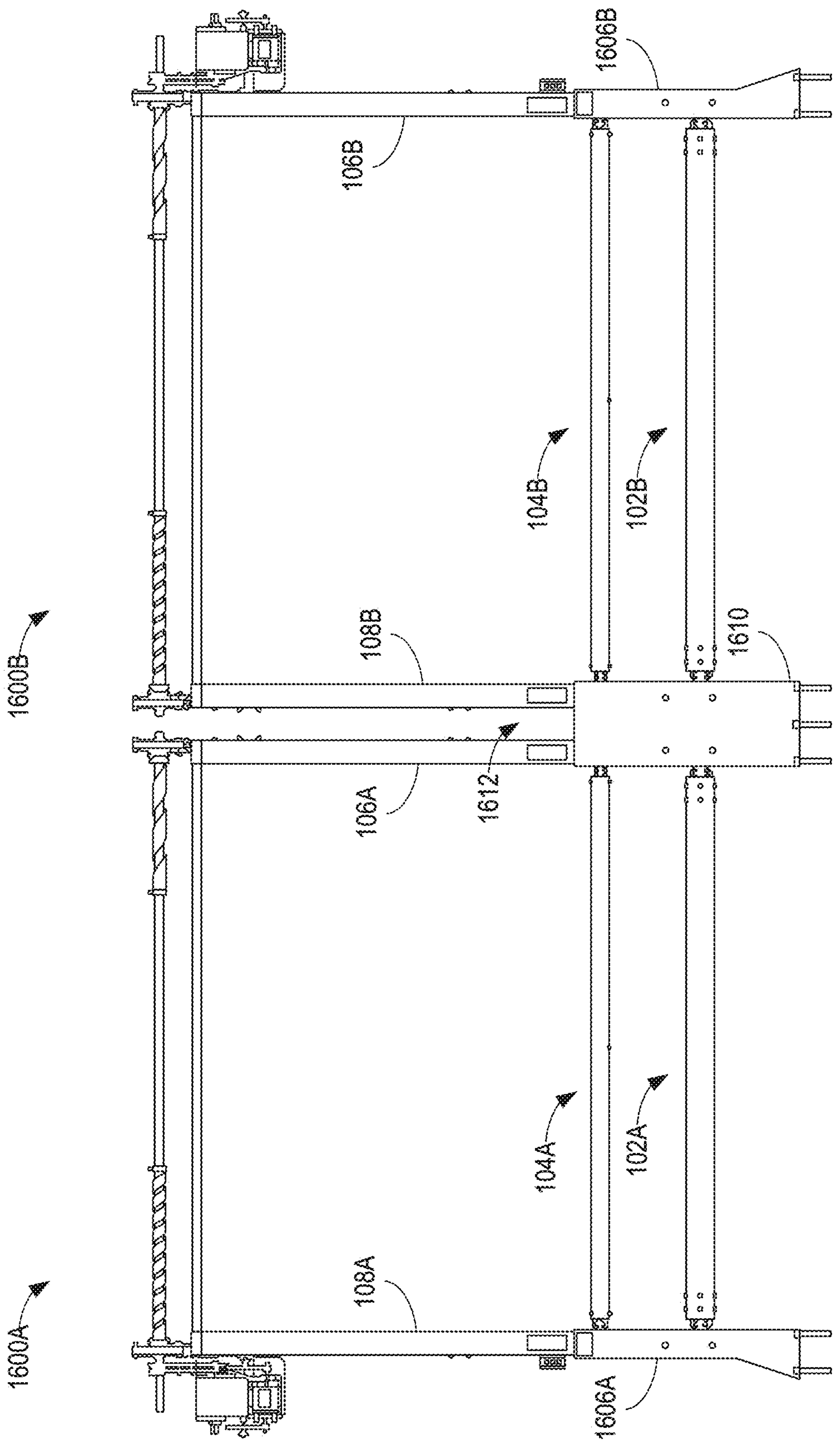
FIG. 16 is a front view of fifth and sixth example impactable gates in accordance with teachings disclosed herein.

FIG. 16 is a front view of fifth and sixth example impactable gates 1600A, 1600B constructed in accordance with teachings disclosed herein. In the illustrated example of FIG. 16, the fifth impactable gate 1600A is substantially the same as the sixth impactable gate 1600B. Thus, unless otherwise specified, descriptions of the fifth impactable gate 1600A can likewise apply to the sixth impactable gate 1600B. Additionally, the fifth and sixth impactable gates 1600A, 1600B of FIG. 16 are similar to the impactable gate 100 of FIGS. 1A-1E. For example, the fifth and sixth impactable gates 1600A, 1600B of FIG. 16 include respective ones of the post rail 102A, 102B and respective ones of the track rail 104A, 104B coupled between respective ones of the first tracks 106A, 106B and respective ones of the second tracks 108A, 108B. However, instead of the base posts 122, 124 of the impactable gate 100 of FIGS. 1A-1E, the fifth and sixth impactable gates 1600A, 1600B of FIG. 16 include respective example tall base posts 1606, where a first tall base post 1606A is coupled to the second track 108A of the fifth impactable gate 1600A and a second tall base post 1606B is coupled to the first track 106B of the sixth impactable gate 1600B.

In some examples, the tall base posts 1606A, 1606B have a first height (e.g., approximately 48 inches) greater than a second height (e.g., approximately 21 inches) of the base posts 122, 124 of FIG. 1A. While the height of the tall base posts 1606A, 1606B is approximately 48 inches in this example, the height can be different (e.g., greater than 48 inches, at least 21 inches and up to 48 inches, less than 21 inches, etc.) in some examples. In some examples, as a result of the relatively increased height of the tall base posts 1606A, 1606B in FIG. 16 (e.g., compared to the base posts 122, 124 of FIG. 1A), the tall base posts 1606A, 1606B can increase strength of the fifth and sixth impactable gates 1600A, 1600B and/or can reduce damage to the respective tracks 108A, 106B (e.g., in the event of impact of a vehicle with one(s) of the tracks 106A, 106B, 108A, 108B and/or one(s) of the rails 102A, 102B, 104A, 104).

In the illustrated example of FIG. 16, an example common member (e.g., a joint member, a common base post) 1610 couples the fifth and sixth impactable gates 1600A, 1600B. For example, the first track 106A of the fifth impactable gate 1600A and the second track 108B of the sixth impactable gate 1600B are coupled together and/or to the floor via the common member 1610. In some examples, utilizing the common member 1610 at the first and second tracks 106A, 108B enables the fifth and sixth impactable gates 1600A, 1600B to be positioned closer together (e.g., reduces a gap 1612 between the fifth and sixth impactable gates 1600A, 1600B) compared to when ones of the tall base posts 1606 are coupled to the first and second tracks 106A, 108B. As a result, the common member 1610 can reduce a footprint of the fifth and sixth impactable gates 1600A, 1600B, and/or can restrict passage of objects (e.g., humans, debris, etc.) through the gap 1612 between the fifth and sixth impactable gates 1600A, 1600B. Further, in some examples, the utilization of the common member 1610 can reduce part costs and/or manufacturing costs compared to when the tall base posts 1606 are used at the respective first and second tracks 106A, 108B. In this example, the height of the common member 1610 is substantially equal to the height of the tall base posts 1606 (e.g., approximately 48 inches). In some examples, the height of the common member 1610 may be different (e.g., greater than 48 inches, at least 21 inches and up to 48 inches, less than 21 inches, etc.). While two of the impactable gates (e.g., the fifth and sixth impactable gates 1600A, 1600B) are coupled together by the common member 1610 in this example, a different number (e.g., three or more) of impactable gates may be coupled together using additional one(s) of the common member 1610. In other examples, the common member 1610 can be omitted (along with the sixth impactable gate 1600B) and replaced with a corresponding tall base post 1606. That is, in some examples, an impactable gate can be implemented with two tall base posts 1606 for each of the two tracks 106, 108 without the need for the common member 1610 to combine the gate with a separate gate.

Figure 17:
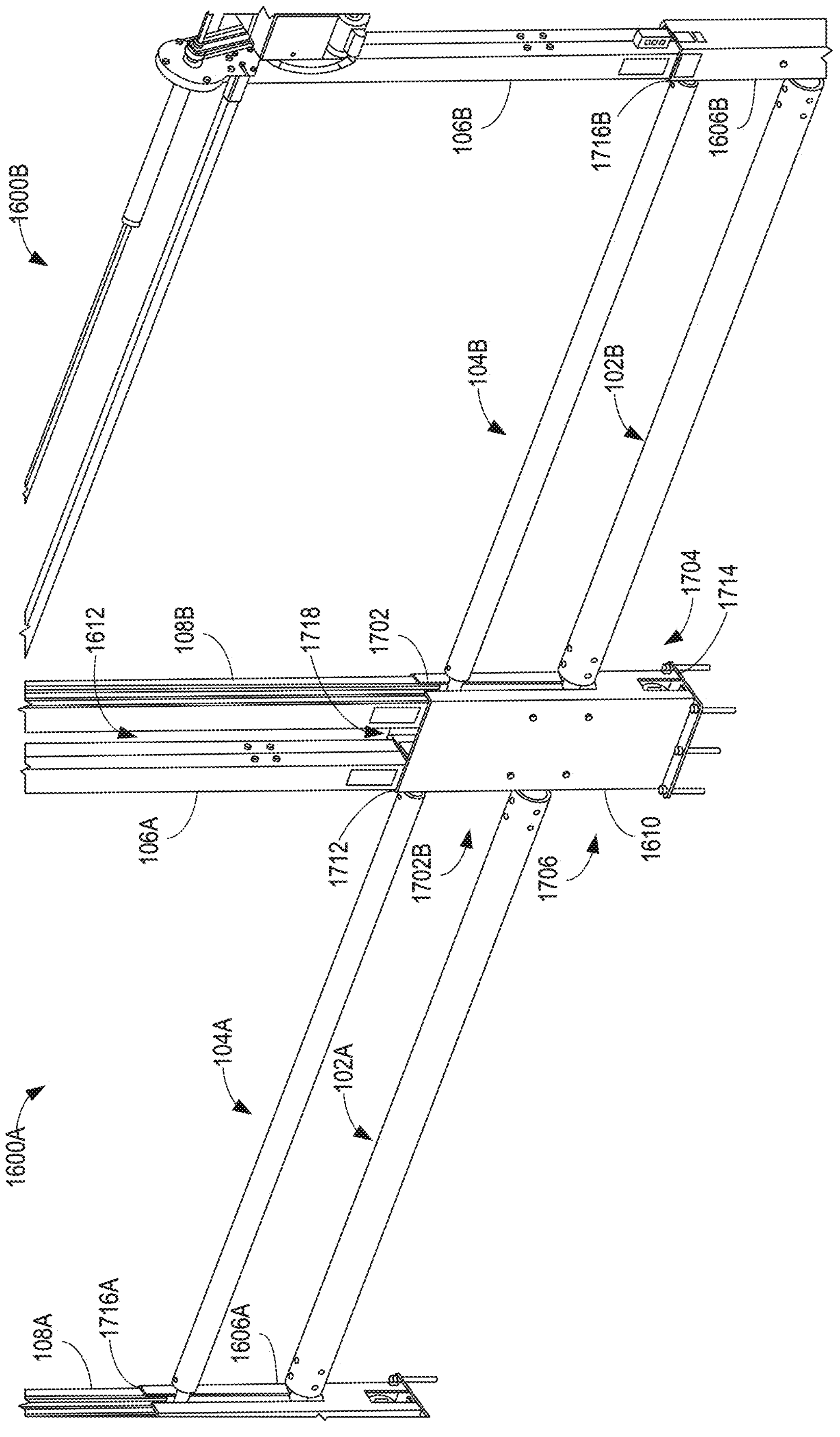
FIG. 17 is a perspective view of the fifth and sixth impactable gates of FIG. 16.

FIG. 17 is a perspective view of the example common member 1610 of FIG. 16. In the illustrated example of FIG. 17, the common member 1610 includes a first example slot 1702A on a first side 1704 of the common member 1610, where the first side 1704 faces the first track 106B of the sixth impactable gate 1600B. In some examples, the common member 1610 includes a second example slot 1702B (not shown) on a second side 1706 (e.g., opposite the first side 1704) of the common member 1610, where the second side 1706 faces the second track 108A of the fifth impactable gate 1600A. In some examples, the second slot 1702B on the second side 1706 of the common member 1610 is substantially the same as the first slot 1702A on the first side 1704 of the common member 1610. In this example, the slots 1702A, 1702B extend from a top edge 1712 of the common member 1610 to a point between the top edge 1712 and a bottom edge 1714 of the common member 1610. In some examples, the second post and track rails 102B, 104B are positioned in and/or are slidable within the first slot 1702 on the first side 1704 of the common member 1610, and the first post and track rails 102A, 104A are positioned in and/or are slidable within the second slot 1702B on the second side 1706 of the common member 1610. In some examples, additional one(s) of the slots (e.g., a third slot 1702C and/or a fourth slot 1702D) can be included in respective one(s) of the tall base posts 1606A, 1606B, and the respective one(s) of the post rails 102A, 102B and/or the track rails 104A, 104B are positioned in and/or slidable within the respective slots 1702C, 1702D. In some examples, when the fifth and sixth impactable gates 1600A, 1600B are in the closed (e.g., blocking) position shown in FIG. 17, the post rails 102A, 102B and/or the track rails 104A, 104B are lower than the top edge 1712 of common member 1610 (e.g., and/or lower than top edges 1716A, 1716B of the respective tall base posts 1606A, 1606B).

In the illustrated example of FIG. 17, the common member 1610 defines a width of the gap 1612 between the first track 106A of the fifth impactable gate 1600A and the second track 108B of the sixth impactable gate 1600B. In this example, the common member 1610 is substantially hollow between the first and second tracks 106A, 108B, and a top end 1718 of the common member 1610 is open between the first and second tracks 106A, 108B. In some examples, a cover can be positioned across the top edge 1712 of the common member 1610 between the first and second tracks 106A, 108B to restrict and/or prevent debris from entering the common member 1610 at the top end 1718. In some examples, the common member 1610 can be substantially solid (e.g., filled) between the first and second tracks 106A, 108B.

Figure 18:
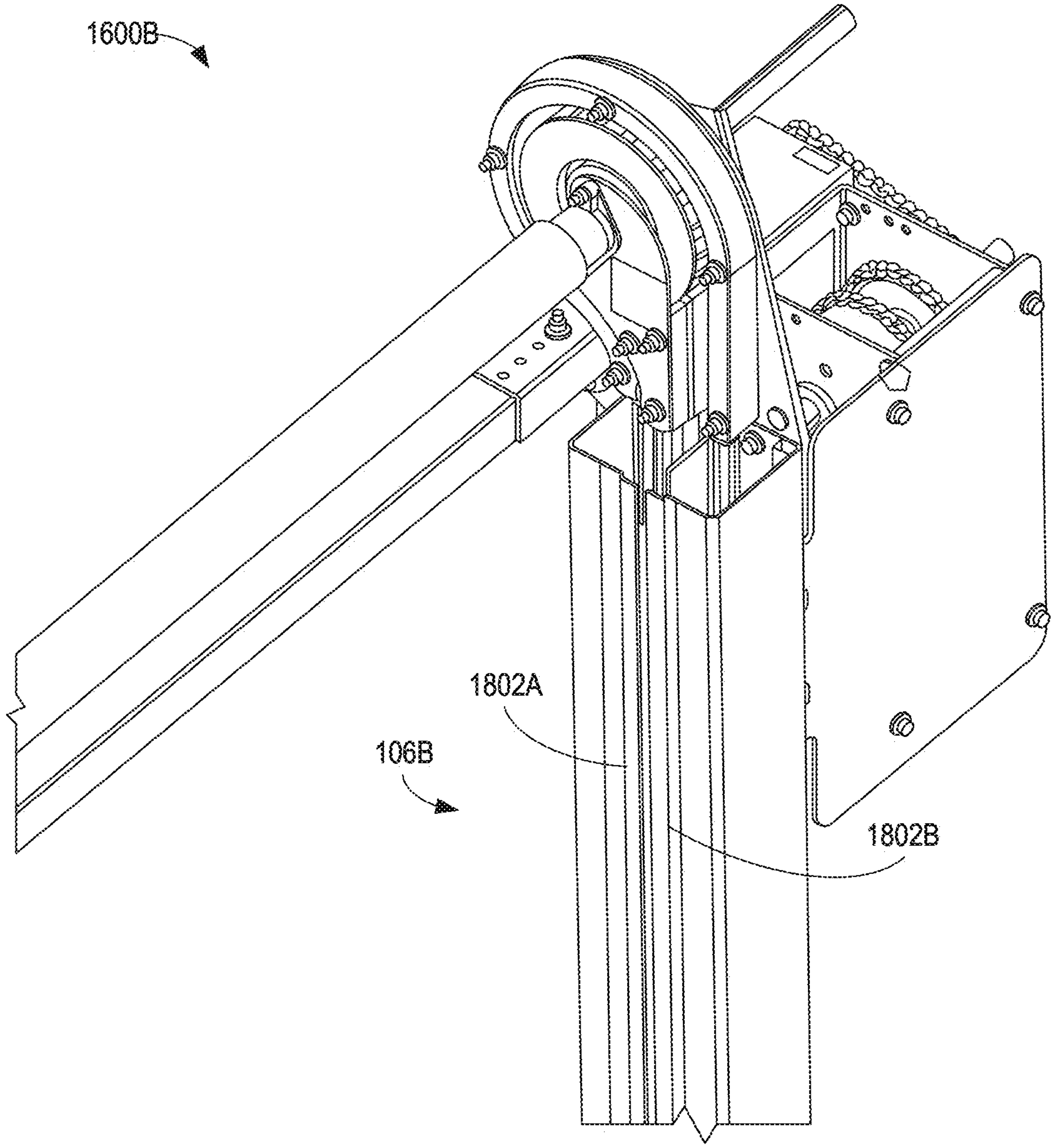
FIG. 18 is a partial perspective view of the sixth impactable gate of FIGS. 16 and/or 17 including example brush seals.

FIG. 18 is a partial perspective view of the sixth impactable gate 1600B of FIGS. 16 and/or 17 including example brush seals 1802A, 1802B. In the illustrated example of FIG. 18, the brush seals 1802A, 1802B are positioned along the first track 106B of the sixth impactable gate 1600B. In some examples, additional ones of the brush seals 1802A, 1802B can similarly be implemented along the second track 108B of the sixth impactable gate 1600B and/or along one(s) of the tracks 106A, 108B of the fifth impactable gate 1600A of FIGS. 16 and/or 17. Additionally or alternatively, the brush seals 1802A, 1802B can be implemented in one or more of the impactable gates 100, 1100, 1200, 1300 described above. In the illustrated example of FIG. 18, the second post and track rails 102B, 104B of FIGS. 16 and/or 17 can be positioned and/or slidably coupled between the brush seals 1802A, 1802B. In some examples, the brush seals 1802A, 1802B can restrict and/or prevent debris from entering the first track 106B of the sixth impactable gate 1600B and, as a result, can facilitate relatively smooth and/or unrestricted travel of the rails 102B, 104B along the first track 106B. In some examples, bristles of at least one of the brush seals 1802A, 1802B extend into the path of the post and track rails 102B, 104B to contact or brush against the post and track rails 102B, 104B as the rails move along the first track 106B.

Figure 19:
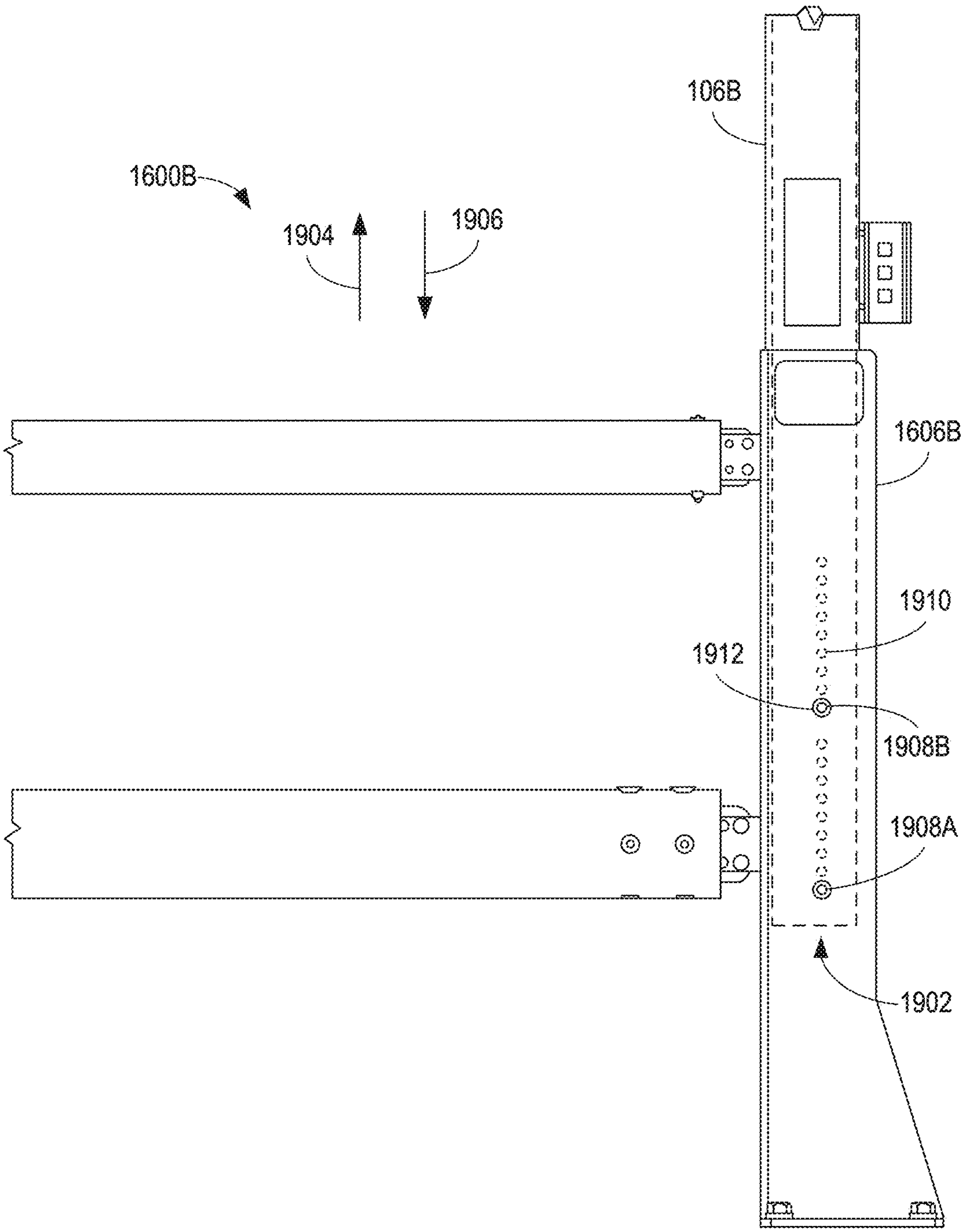
FIG. 19 is a partial front view of the sixth impactable gate of FIGS. 16 and/or 17.

FIG. 19 is a partially transparent front view of the example tall base post 1606B of the sixth impactable gate 1600B of FIGS. 16 and/or 17. In the illustrated example of FIG. 19, an end 1902 of the first track 106B of the sixth impactable gate 1600B extends (e.g., at least partially extends) into the tall base post 1606B. In some examples, a height of the sixth impactable gate 1600B can be adjusted by adjusting a position of the first track 106B relative to the tall base post 1606B (e.g., by adjusting a distance which the first track 106B extends into the tall base post 1606B). For example, the first track 106B can be moved in a first direction 1904 (e.g., upward in FIG. 19) relative to the tall base post 1606B to increase the height of the sixth impactable gate 1600B, and the first track 106B can be moved in a second direction 1906 (e.g., opposite the first direction 1904, downward in FIG. 19) relative to the tall base post 1606B to reduce the height of the sixth impactable gate 1600B.

In the illustrated example of FIG. 19, the tall base post 1606B includes first example openings 1908A, 1908B, and the first track 106B includes second example openings 1910. In some examples, a position of the first track 106B relative to the tall base post 1606B (and, thus, the height of the sixth impactable gate 1600B) can be maintained (e.g., kept constant) by substantially aligning the first openings 1908A, 1908B with respective ones of the second openings 1910, and inserting fasteners (e.g., bolts, pins) 1912 into the first openings 1908A, 1908B and the respective ones of the second openings 1910. While the tall base post 1606B includes two of the first openings 1908A, 1908B in this example, the tall base post 1606B can include a different number (e.g., three or more) of the first openings 1908A, 1908B in some examples. In some examples, the common member 1610 includes similar openings to enable adjustments in the height of the corresponding track in the common member 1610.

In some examples, a range and/or number of available heights of the sixth impactable gate 1600B is based on a number of and/or spacing between the second openings 1910. For example, in FIG. 19, the second openings 1910 are positioned such that the height of the sixth impactable gate 1600B can be adjusted by up to 8 inches and by 1-inch increments. In some examples, an incremental and/or total adjustability of the height of the sixth impactable gate 1600B may be different. For example, the height can be adjusted by a range greater than or less than 8 inches, and/or can be adjusted by increments greater than or less than 1 inch. In some examples, the tall base post 1606B can include the second openings 1910 (e.g., instead of the first openings 1908A, 1908B), and the first track 106B can include the first openings 1908A, 1908B (e.g., instead of the second openings 1910).

Figure 20:
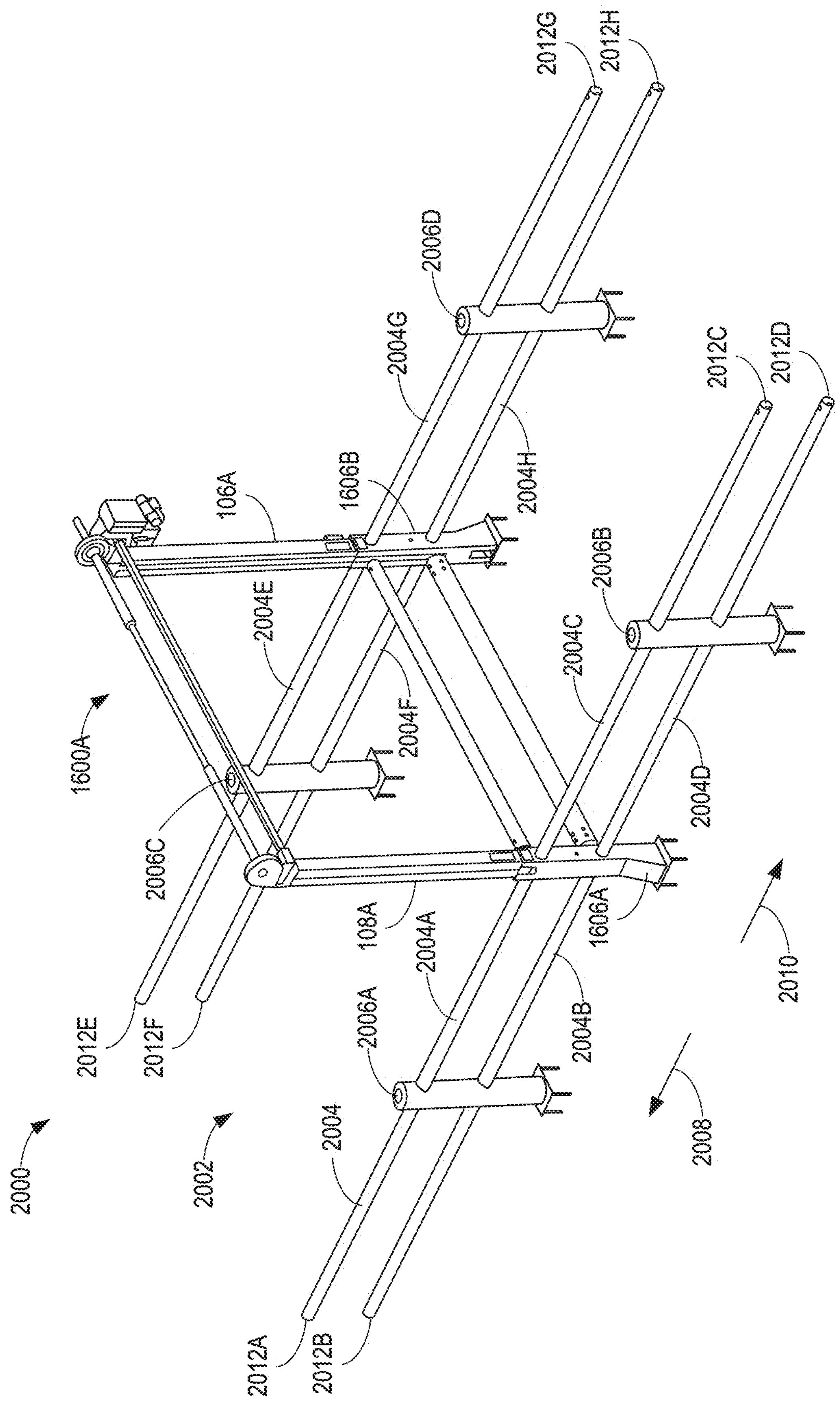
FIG. 20 is a perspective view of an example aisle rail configuration in accordance with teachings disclosed herein.
Figure 21:
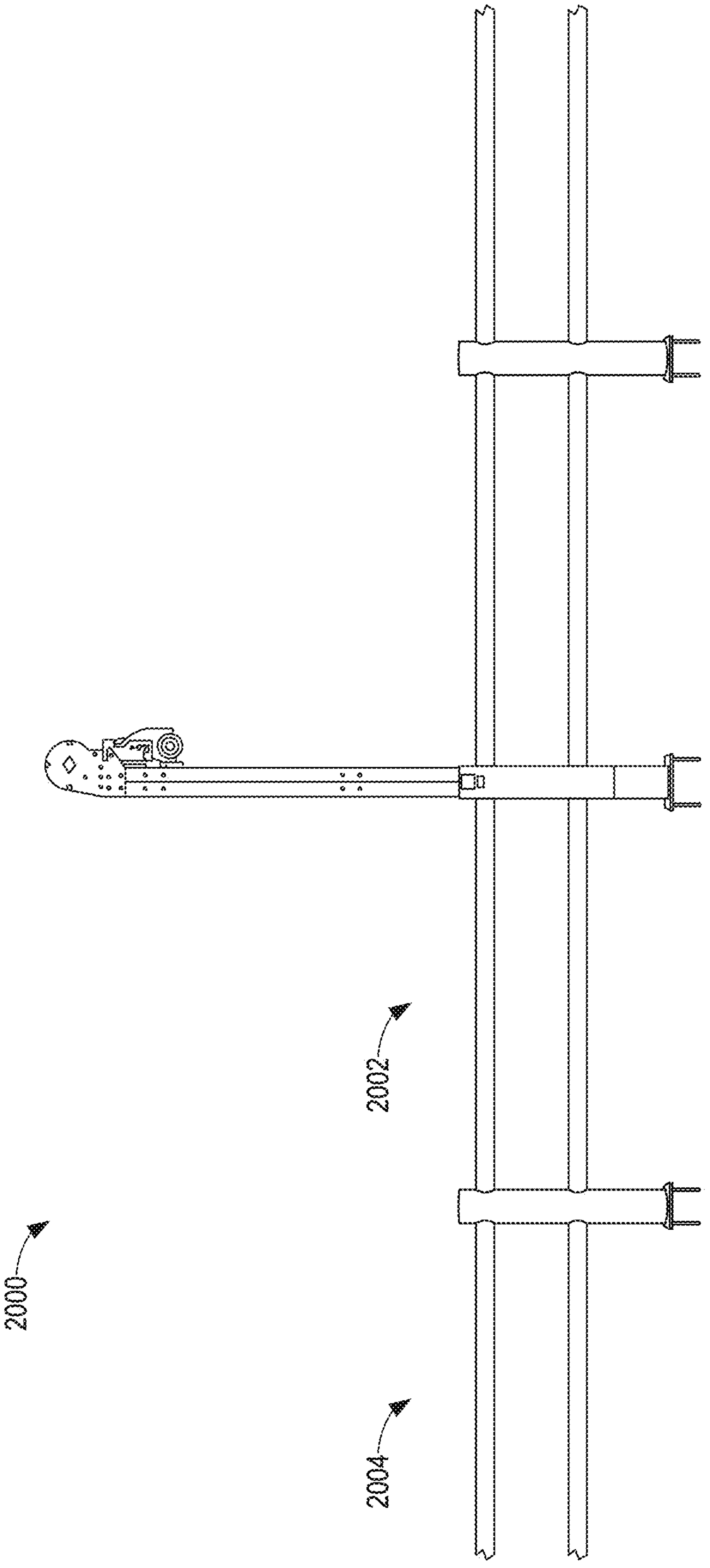
FIG. 21 is a side view of the example aisle rail configuration of FIG. 20.

FIG. 20 is a perspective view of an example aisle rail configuration 2000 constructed in accordance with teachings of this disclosure, and FIG. 21 is a side view of the example aisle rail configuration 2000 of FIG. 20. In some examples, the aisle rail configuration 2000 of FIGS. 20 and/or 21 can be used to selectively block and/or enable traffic through an example aisle 2002 defined using example barrier rails (e.g., static rails) 2004. In the illustrated example of FIG. 20, the aisle rail configuration 2000 includes and/or implements the fifth impactable gate 1600A of FIGS. 16 and/or 17. In this example, the second track 108A of the fifth impactable gate 1600A is coupled to the floor via the first tall base post 1606A. However, instead of the fifth impactable gate 1600A being coupled to the sixth impactable gate 1600B via the common member 1610 (as shown in of FIGS. 16 and/or 17), the first track 106A of the fifth impactable gate 1600A is coupled to the floor via the second tall base post 1606B in this example.

In the illustrated example of FIG. 20, the aisle rail configuration 2000 includes example rail posts 2006 (e.g., including a first example rail post 2006A, a second example rail post 2006B, a third example rail post 2006C, and a fourth example rail post 2006D), where the rail posts 2006 can be coupled (e.g., bolted) to the floor in some examples. While four of the rail posts 2006 are used in this example, a different number of the rail posts 2006 (e.g., three or less, five or more, etc.) may be used instead. In the illustrated example of FIG. 20, the rail posts 2006 are used to support respective ones of the barrier rails 2004. For example, the first rail post 2006A supports first and second barrier rails 2004A, 2004B extending from the first tall base post 1606A in a first direction 2008, the second rail post 2006B supports third and fourth barrier rails 2004C, 2004D extending from the first tall base post 1606A in a second direction 2010 (e.g., different from and/or opposite to the first direction 2008), the third rail post 2006C supports fifth and sixth barrier rails 2004E, 2004F extending from the second tall base post 1606B in the first direction 2008, and the fourth rail post 2006D supports seventh and eighth barrier rails 2004G, 2004H extending from the second tall base post 1606B in the second direction 2010. As such, in the example of FIG. 20, the barrier rails 2004 are arranged in pairs extending from the respective tall base posts 1606A, 1606B in the respective first and second directions 2008, 2010. In some examples, a different number of the barrier rails 2004 may be used instead. For example, one(s) of the barrier rails 2004 may be omitted, and/or one or more additional barrier rails can extend from one(s) of the tall base posts 1606A, 1606B. In some examples, the barrier rails 2004 and associated posts 2006 are implemented in accordance with the example disclosed in U.S. patent application Ser. No. 17/984,952, which is incorporated herein by reference in its entirety.

In the illustrated example, the barrier rails 2004 are similar (e.g., have a similar length, width, and/or cross-sectional shape). In some examples, one or more of the barrier rails 2004 may have a different length, width, and/or cross-sectional shape (e.g., compared to other one(s) of the barrier rails 2004). In the example of FIG. 20, the second barrier rail 2004B, the fourth barrier rail 2004D, the sixth barrier rail 2004F, and the eighth barrier rail 2004H are positioned at a first example height from the floor, and the first barrier rail 2004A, the third barrier rail 2004C, the fifth barrier rail 2004E, and the seventh barrier rail 2004G are positioned at a second example height (e.g., greater than the first height) from the floor. In some examples, the first height corresponds to a height of the post rail 102 and the second height corresponds to a height of the track rail 104 when the fifth impactable gate 1600A is in the closed (e.g., blocking)

position. In some examples, the first height and/or the second height of the barrier rails 2004 may be different.

In the illustrated example of FIG. 20, the barrier rails 2004 extend through respective ones of the rail posts 2006 between the respective ones of the tall base posts 1606A, 1606B and respective ends 2012 (e.g., a first end 2012A, a second end 2012B, a third end 2012C, a fourth end 2012D, a fifth end 2012E, a sixth end 2012F, a seventh end 2012G, and an eighth end 2012H) of the barrier rails 2004. Stated differently, in some examples, the barrier rails 2004 extend continuously from the respective tall base posts 1606A, 1606B to the respective ends 2012. Alternatively, in some examples, the barrier rails 2004 can be separated at one or more locations between the tall base posts 1606A, 1606B and the respective ends 2012. For example, first portion(s) of the barrier rails 2004 can extend from the respective tall base posts 1606A, 1606B to the respective rail posts 2006, and second portion(s) of the barrier rails 2004 can extend from the respective rail posts 2006 to the respective ends 2012, where the first portion(s) are separate from the second portion(s).

In the illustrated example of FIG. 20, the first, second, third, and fourth barrier rails 2004A, 2004B, 2004C, 2004D are substantially parallel to the fifth, sixth, seventh, and eighth barrier rails 2004E, 2004F, 2004G, 2004H. In some examples, one or more of the barrier rails 2004 can be at an angular offset relative to other one(s) of the barrier rails 2004. For example, while the barrier rails 2004 of FIG. 20 extend in the first and second directions 2008, 2010 perpendicular (e.g., orthogonal) to respective surfaces of the tall base posts 1606A, 1606B, one(s) of the barrier rails 2004 can extend at different angles from the surfaces of the tall base posts 1606A, 1606B. Further, while the barrier rails 2004 are substantially straight (e.g., not curved) in this example, one or more of the barrier rails 2004 may be curved and/or angled in some examples.

In some examples, the barrier rails 2004 are made of a resilient plastic material, such as a polymer (e.g., similar to the first tube 202 and/or the second tube 204 of FIG. 2). Thus, the barrier rails 2004 can bend or deform based on an impact to the impactable gate 100 and then return to their original shape. For example, the barrier rails 2004 can elastically deform without destructive damage and return to an original shape and/or position. In some examples, the material of the barrier rails 2004 are selected based on an expected mass and/or momentum of an impacting vehicle.

In some examples, additional one(s) of rail posts 2006 and/or additional one(s) of the impactable gates (e.g., one or more of the impactable gates 100, 1100, 1200, 1300, 1600A, 1600B) can be coupled to one or more of the barrier rails 2004 (e.g., at the respective ends 2012 of the barrier rails 2004). Further, in some examples, different one(s) of the impactable gates (e.g., one or more of the impactable gates 100, 1100, 1200, 1300, 1600B) can be used in the aisle rail configuration 2000 of FIG. 20 (e.g., in addition to or instead of the fifth impactable gate 1600A).

Figure 22:
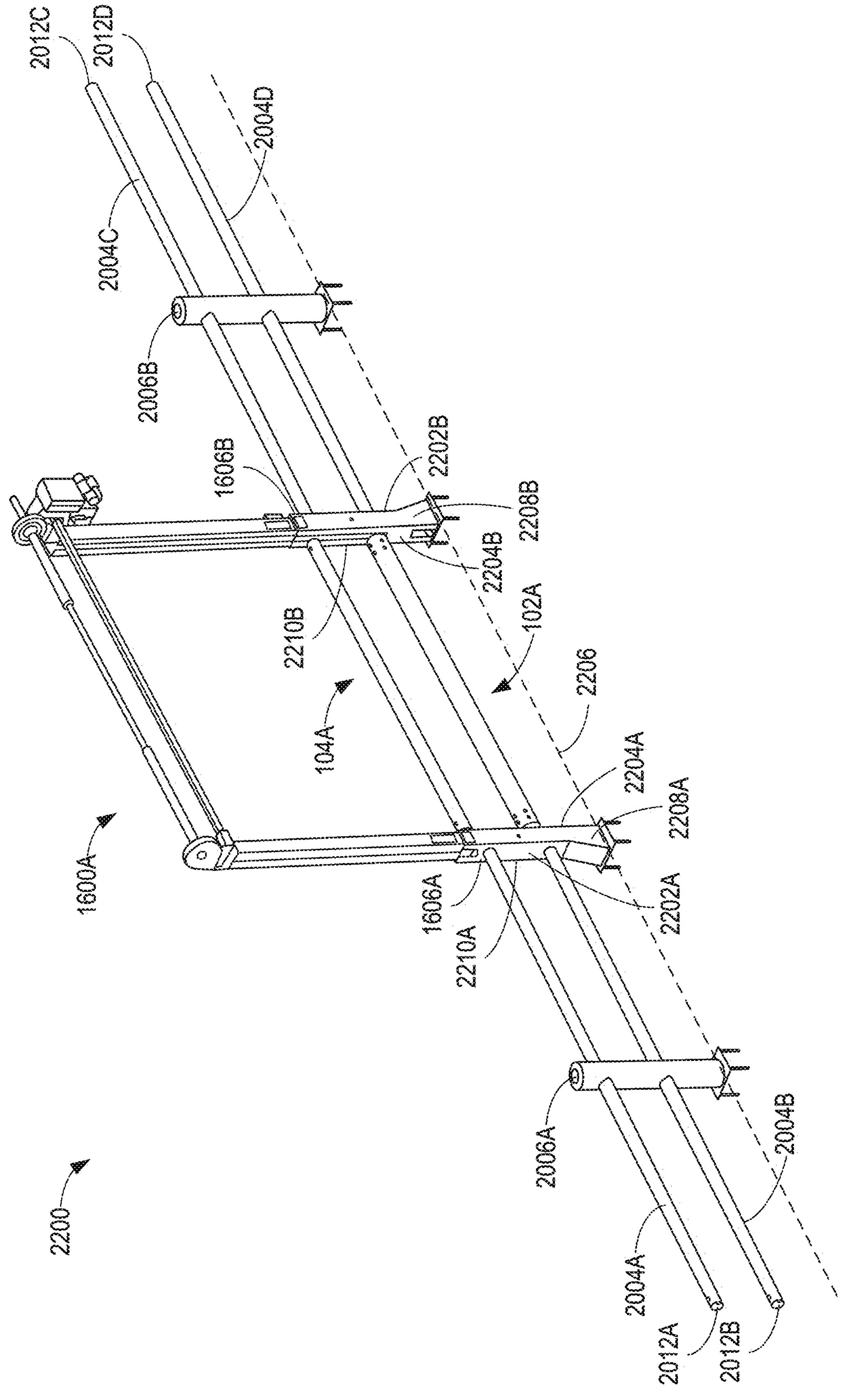
FIG. 22 is a perspective view of an example straight rail configuration in accordance with teachings disclosed herein.
Figure 23:
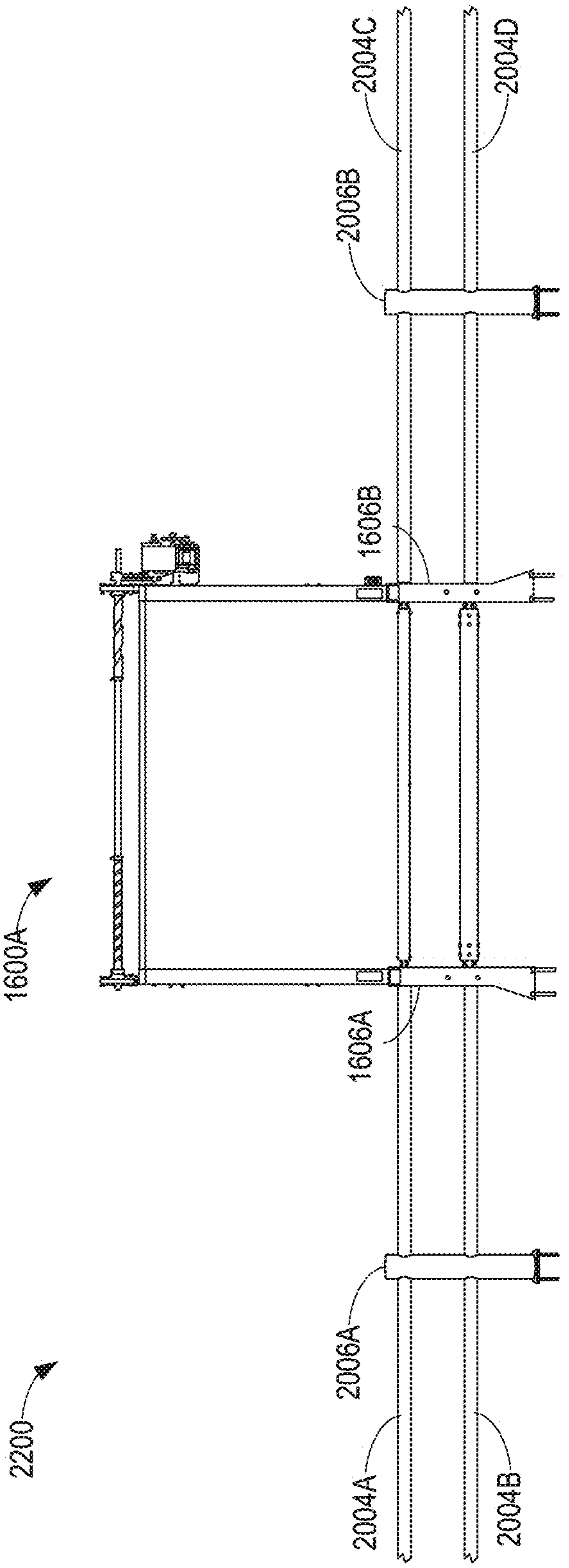
FIG. 23 is a front view of the example straight rail configuration of FIG. 22.

FIG. 22 is a perspective view of an example straight rail configuration 2200 constructed in accordance with teachings of this disclosure, and FIG. 23 is a front view of the example straight rail configuration 2200 of FIG. 22. In the illustrated examples of FIGS. 22 and/or 23, the straight rail configuration 2200 includes the fifth impactable gate 1600A, ones of the barrier rails 2004 (e.g., the first, second, third, and fourth barrier rails 2004A, 2004B, 2004C, 2004D), and ones of the rail posts 2006 (e.g., the first and second rail posts 2006A, 2006B) of FIGS. 20 and/or 21, but in a different arrangement compared to the aisle rail configuration 2000 of FIGS. 20 and/or 21. In this example, the first and second barrier rails 2004A, 2004B are coupled to and/or extend from the first tall base post 1606A of the fifth impactable gate 1600A, and the third and fourth barrier rails 2004C, 2004D are coupled to and/or extend from the second tall base post 1606B of the fifth impactable gate 1600A. In particular, the first and second barrier rails 2004A, 2004B extend (e.g., orthogonally and/or perpendicularly) from a first outer surface 2202A of the first tall base post 1606A, and the third and fourth barrier rails 2004C, 2004D extend (e.g., orthogonally and/or perpendicularly) from a second outer surface 2202B of the second tall base post 1606B, where the first and second outer surfaces 2202A, 2202B face away from the post rail 102A and the track rail 104A of the fifth impactable gate 1600A. Stated differently, the outer surfaces 2202A, 2202B of the respective tall base posts 1606A, 1606B are opposite first and second inner surfaces 2204A, 2204B of the respective tall base posts 1606A, 1606B, where the inner surfaces 2204A, 2204B face the post and track rails 102A, 104A. While the barrier rails 2004 extend from and/or are coupled to the respective outer surfaces 2202A, 2202B in this example, one or more of the barrier rails 2004 can extend from and/or be coupled to one or more side surfaces 2208A, 2208B, 2210A, 2210B of the respective tall base posts 1606A, 1606B in some examples. Further, in this example, the first rail post 2006A supports the first and second barrier rails 2004A, 2004B, and the second rail post 2006B supports the third and fourth barrier rails 2004C, 2004D.

In the illustrated example of FIG. 22, the first tall base post 1606A, the second tall base post 1606B, the first rail post 2006A, and the second rail post 2006B are substantially aligned along an example axis 2206. As a result, the barrier rails 2004A, 2004B, 2004C, 2004D and the post and track rails 102A, 104A are also aligned along the axis 2206. In some examples, the first rail post 2006A and/or the second rail post 2006B may be positioned at an offset from the axis 2206, such that ones of the barrier rails 2004A, 2004B, 2004C, 2004D may be at an angular offset relative to other ones of the barrier rails 2004A, 2004B, 2004C, 2004D and/or relative to the post and track rails 102A, 104A. In some examples, additional one(s) of the barrier rails 2004 and/or the rail posts 2006 can be coupled to the respective ends 2012 of the barrier rails 2004 of FIG. 22, where the additional one(s) of the barrier rails 2004 can be aligned with and/or offset from the axis 2206. In some examples, different one(s) of the impactable gates (e.g., one or more of the impactable gates 100, 1100, 1200, 1300, 1600B) can be used in the straight rail configuration 2200 of FIGS. 22 and/or 23 (e.g., in addition to or instead of the fifth impactable gate 1600A).

Figure 24:
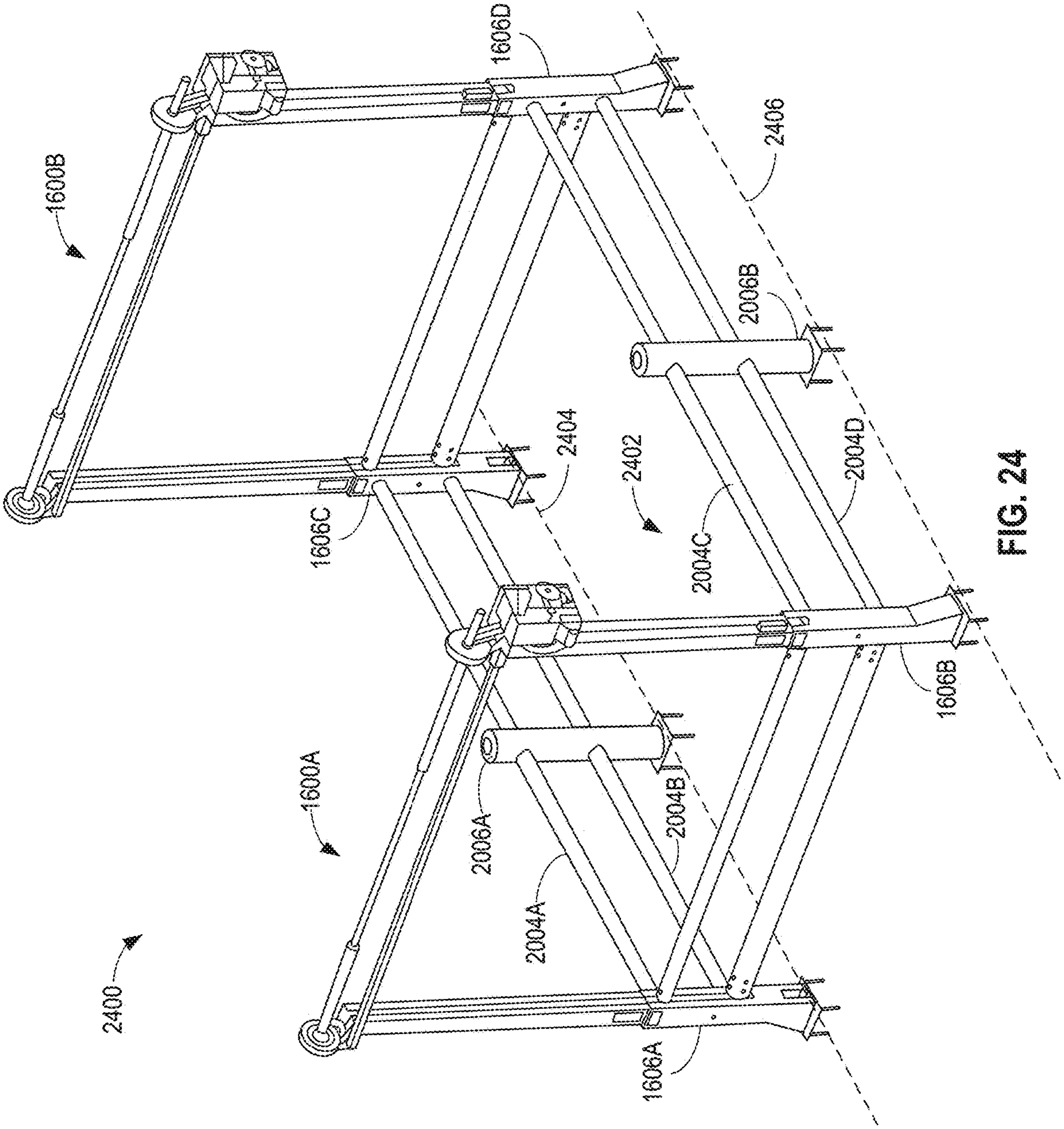
FIG. 24 is a perspective view of an example corral rail configuration in accordance with teachings disclosed herein.
Figure 25:
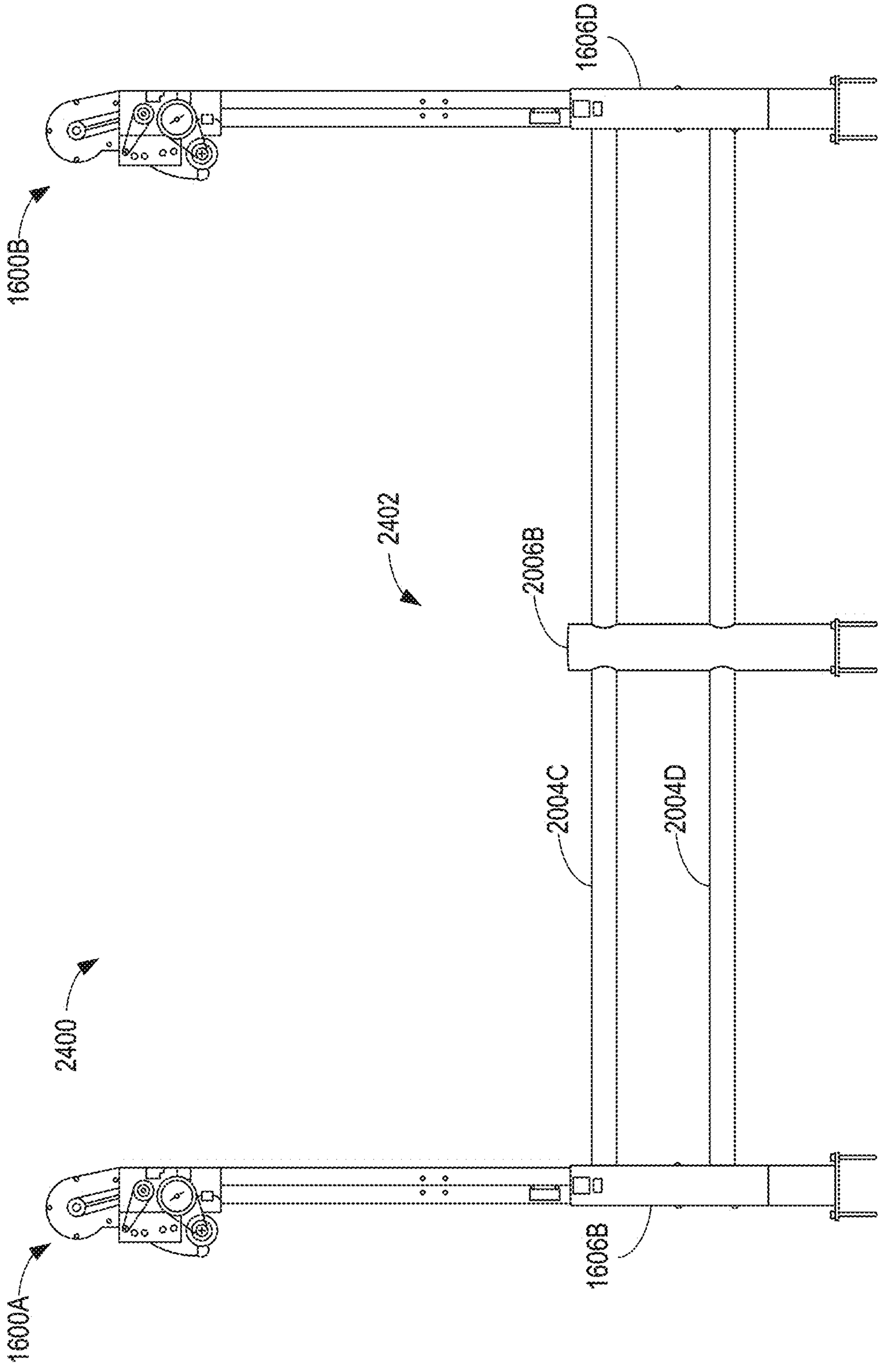
FIG. 25 is a side view of the example corral rail configuration of FIG. 24.

FIG. 24 is a perspective view of an example corral configuration 2400 constructed in accordance with teachings of this disclosure, and FIG. 25 is a side view of the example corral configuration 2400 of FIG. 24. In the illustrated examples of FIGS. 24 and/or 25, the corral configuration 2400 includes the fifth and sixth impactable gates 1600A, 1600B, ones of the barrier rails 2004 (e.g., the first, second, third, and fourth barrier rails 2004A, 2004B, 2004C, 2004D), and ones of the rail posts 2006 (e.g., the first and second rail posts 2006A, 2006B) of FIGS. 20 and/or 21, but in a different arrangement compared to the aisle rail configuration 2000 of FIGS. 20 and/or 21 and/or the straight rail configuration 2200 of FIGS. 22 and/or 23.

In the illustrated example of FIG. 24, the fifth and sixth impactable gates 1600A, 1600B, the barrier rails 2004, and the rail posts 2006 define an example corral 2402, where the fifth and sixth impactable gates 1600A, 1600B can be used to selectively enable access to and/or from the corral 2402. In the illustrated example of FIG. 24, the first and second barrier rails 2004A, 2004B are coupled between the first tall base post 1606A of the fifth impactable gate 1600A and a third tall base post 1606C of the sixth impactable gate 1600B. Further, the third and fourth barrier rails 2004C, 2004D are coupled between the second tall base post 1606B of the fifth impactable gate 1600A and a fourth tall base post 1606D of the sixth impactable gate 1600B. In this example, the first and second barrier rails 2004A, 2004B are supported by the first rail post 2006A, and the third and fourth barrier rails 2004C, 2004D are supported by the second rail post 2006B. In this example, the corral 2402 is rectangular, where the first and third tall base posts 1606A, 1606C and the first rail post 2006A are substantially aligned along a first line 2404 and the second and fourth tall base posts 1606B, 1606D and the second rail post 2006B are substantially aligned along a second line 2406. In some examples, at least one of the first tall base post 1606A, the third tall base post 1606C, or the first rail post 2006A can be offset from the first line 2404, and/or at least one of the second tall base post 1606B, the fourth tall base post 1606D, or the second rail post 2006B can be offset from the second line 2406 (e.g., such that the corral 2402 has a different polygonal shape).

Figure 26:
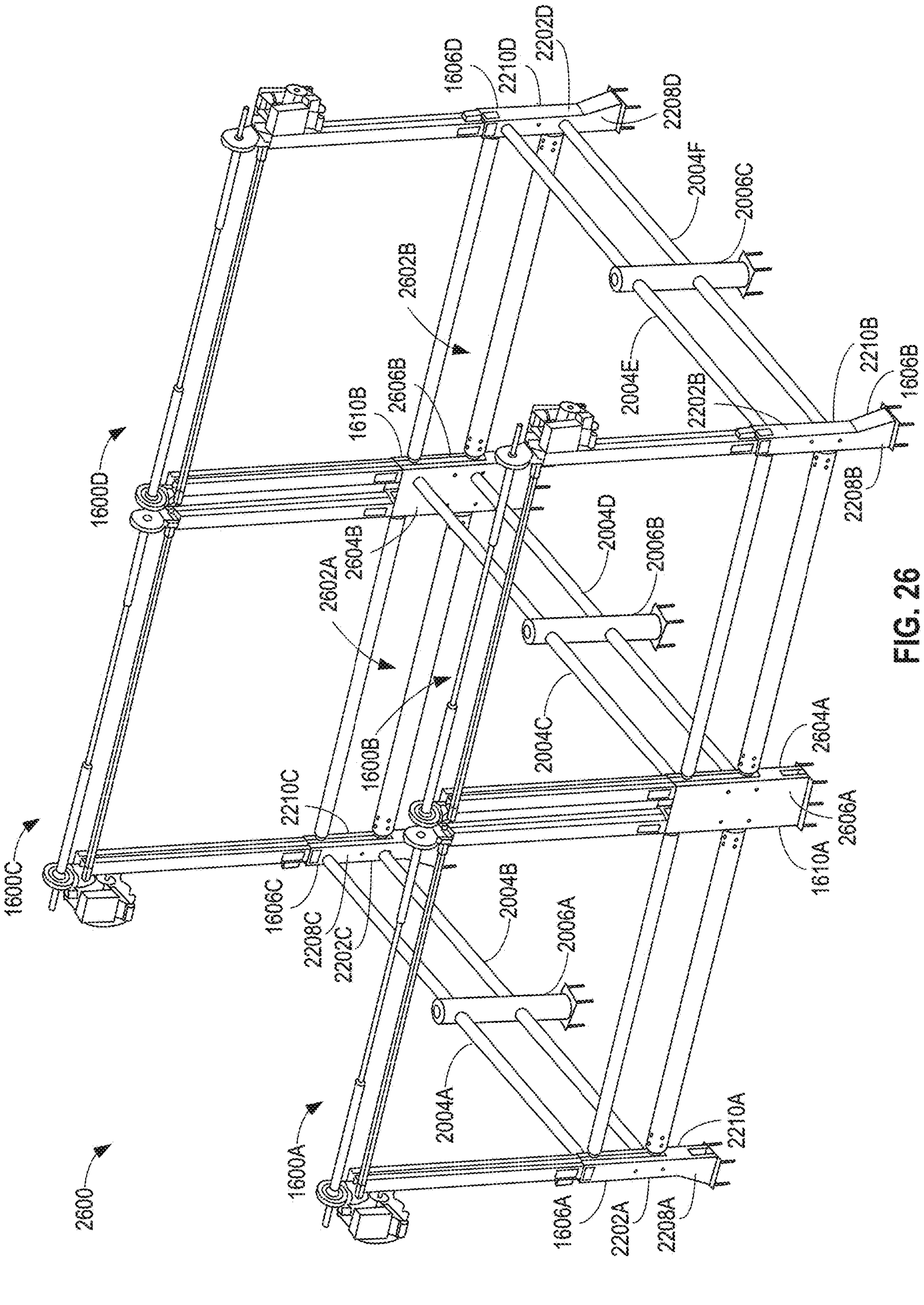
FIG. 26 is a perspective view of an example multi-corral rail configuration in accordance with teachings disclosed herein.

FIG. 26 is a perspective view of an example multi-corral configuration 2600 constructed in accordance with teachings of this disclosure. In the illustrated example of FIG. 26, the multi-corral configuration 2600 includes the fifth and sixth example impactable gates 1600A, 1600B coupled together via a first common member 1610A (e.g., corresponding to the common member 1610 of FIGS. 16 and/or 17), and further includes seventh and eighth example impactable gates 1600C, 1600D coupled together via a second common member 1610B. In this example, the seventh and eighth impactable gates 1600C, 1600D are substantially similar to the fifth and sixth impactable gates 1600A, 1600B.

In the illustrated example of FIG. 26, the multi-corral configuration 2600 defines and/or controls access to and/or from a first example corral 2602A and a second example corral 2602B. In this example, the first and second barrier rails 2004A, 2004B are coupled between the first tall base post 1606A of the fifth impactable gate 1600A and the third tall base post 1606C of the seventh impactable gate 1600C, and the third and fourth barrier rails 2004C, 2004D are coupled between the first common member 1610A and the second common member 1610B. In this example, the first and second barrier rails 2004A, 2004B, the fifth impactable gate 1600A, the third and fourth barrier rails 2004C, 2004D, and the seventh impactable gate 1600C define the first corral 2602A. Further, in this example, the fifth and sixth barrier rails 2004E, 2004F are coupled between the second tall base post 1606B of the sixth impactable gate 1600B and the fourth tall base post 1606D of the eighth impactable gate 1600D. In this example, the third and fourth barrier rails 2004C, 2004D, the sixth impactable gate 1600B, the fifth and sixth barrier rails 2004E, 2004F, and the eighth impactable gate 1600D define the second corral 2602B. In some examples, the fifth and seventh impactable gates 1600A, 1600C can selectively enable access to and/or from the first corral 2602A, and the sixth and eighth impactable gates 1600B, 1600D can selectively enable access to and/or from the second corral 2602B. In this example, the first and second barrier rails 2004A, 2004B are supported by the first rail post 2006A, the third and fourth barrier rails 2004C, 2004D are supported by the second rail post 2006B, and the fifth and sixth barrier rails 2004E, 2004F are supported by the third rail post 2006C.

In some examples, the multi-corral configuration 2600 of FIG. 26 can include one or more additional corrals (e.g., in addition to the first and second corrals 2602A, 2602B). For example, additional one(s) of the impactable gates 1600 and/or the barrier rails 2004 can be coupled to one(s) of the impactable gates 1600 and/or the barrier rails 2004 of FIG. 26 to define the additional corral(s) of the multi-corral configuration 2600. In the illustrated example of FIG. 26, the first and second barrier rails 2004A, 2004B are coupled to and/or extend from respective side surfaces 2210A, 2208C of the first and third tall base posts 1606A, 1606C, and the fifth and sixth barrier rails 2004E, 2004F are coupled to and/or extend from respective side surfaces 2210B, 2208D of the second and fourth tall base posts 1606B, 1606D. Additionally or alternatively, one(s) of the barrier rails 2004 can be coupled to different one(s) of the side surfaces 2208A, 2208B, 2210C, 2210D and/or outer surfaces 2202A, 2202B, 2202C, 2202D of the respective tall base posts 1606A, 1606B, 1606C, 1606D. For example, one(s) of the barrier rails 2004 can be attached and/or coupled to all three surfaces (e.g., the side surfaces 2208, 2210 and the outer surface 2202) of one or more of the tall base posts 1606A, 1606B, 1606C, 1606D, and/or can be coupled to any combination of the three surfaces. Further, while the third and fourth barrier rails 2004C, 2004D are coupled to and/or extend from first and second inner surfaces 2604A, 2604B of the respective first and second common members 1610A, 1610B, one(s) of the barrier rails 2004 can additionally or alternatively be coupled to a first outer surface 2606A of the first common member 1610A and/or a second outer surface 2606B of the second common member 1610B, where the outer surfaces 2606A, 2606B are opposite the respective inner surfaces 2604A, 2604B.

The foregoing examples of the impactable gates 100, 1100, 1200, 1300, 1600A, 1600B, 1600C, 1600D teach or suggest different features. Although each example impactable gate 100, 1100, 1200, 1300, 1600A, 1600B, 1600C, 1600D disclosed above has certain features, it should be understood that it is not necessary for a particular feature of one example to be used exclusively with that example. Instead, any of the features described above and/or depicted in the drawings can be combined with any of the examples, in addition to or in substitution for any of the other features of those examples. One example's features are not mutually exclusive to another example's features. Instead, the scope of this disclosure encompasses any combination of any of the features.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase “at least one of A and B” is intended to refer to implementations including any of (1) at least one A, (2) at least one B, or (3) at least one A and at least one B. Similarly, as used herein in the context of describing structures, components, items, objects and/or things, the phrase “at least one of A or B” is intended to refer to implementations including any of (1) at least one A, (2) at least one B, or (3) at least one A and at least one B. As used herein in the context of describing the performance or execution of processes, instructions, actions, activities and/or steps, the phrase “at least one of A and B” is intended to refer to implementations including any of (1) at least one A, (2) at least one B, or (3) at least one A and at least one B. Similarly, as used herein in the context of describing the performance or execution of processes, instructions, actions, activities and/or steps, the phrase “at least one of A or B” is intended to refer to implementations including any of (1) at least one A, (2) at least one B, or (3) at least one A and at least one B.

As used herein, singular references (e.g., “a”, “an”, “first”, “second”, etc.) do not exclude a plurality. The term “a” or “an” object, as used herein, refers to one or more of that object. The terms “a” (or “an”), “one or more”, and “at least one” are used interchangeably herein. Furthermore, although individually listed, a plurality of means, elements, or actions may be implemented by, e.g., the same entity or object. Additionally, although individual features may be included in different examples or claims, these may possibly be combined, and the inclusion in different examples or claims does not imply that a combination of features is not feasible and/or advantageous.

From the foregoing, it will be appreciated that example methods, apparatus and articles of manufacture have been disclosed that provide one or more benefits including improved impact compliance of gates used in industrial environments, such as loading docks, intersections, corrals, etc. Example impactable gate systems or gate apparatus disclosed herein can be vertically acting and automatically operated via a control system including a motor, sensors, computing systems, etc. Example impactable gates disclosed herein include a plurality of rails (e.g., flexible rails) that include an internal brace to add strength in the vertical direction but allow flexibility in the horizontal direction. Example impactable gates disclosed herein include a bracket to couple a rail to a post, inhibit rail bending and restrict forward movement of the impacting vehicle, and increase the impact force example impactable gates are able to endure. Example impactable gates disclosed herein include a spring-loaded trolley to guide the rail along a track between a raised position and a lowered position. Furthermore, the trolley includes a spring-loaded fastener to allow the ends of the rail to move inward, which provides additional movement (e.g., bending) to the rail during an impact.

Example impactable gate systems and apparatus are disclosed herein. Further examples and combinations thereof include the following:

Example 1 includes an impactable gate system comprising a track to be coupled to a base post, a drive strip slidable along the track, a rail including a tube, the rail to move with the drive strip relative to the track between an opened position and a closed position, and a bracket to be disposed within the track, the bracket to couple the rail to the drive strip, the bracket to be disposed within the base post when the rail is in the closed position.

Example 2 includes the impactable gate system of example 1, wherein the rail is a first rail, the tube is a first tube, further including a second rail spaced from the first rail along the drive strip, the second rail including a second tube, a brace to be disposed within the second tube, the brace having a length, a width, and a thickness, the thickness extending in a direction transverse to a direction of travel of the drive strip along the track, the width greater than the thickness, and a sleeve to be coupled to the drive strip, the sleeve including a slotted hole, the second tube slidably coupled to the sleeve via the slotted hole.

Example 3 includes the impactable gate system of any one of examples 1 or 2, wherein the track is a first track defining a first channel, and further including a second track within the first track, the second track defining a second channel.

Example 4 includes the impactable gate system of example 3, wherein the bracket is to be disposed within the first channel, the bracket to be spaced from an internal surface of the first track when the impactable gate system is in a non-impacted state.

Example 5 includes the impactable gate system of example 4, wherein the bracket is to contact the internal surface of the first track when the impactable gate system is in an impacted state.

Example 6 includes the impactable gate system of example 3, further including a trolley to be disposed within the second channel of the second track, the trolley to be coupled to the bracket.

Example 7 includes the impactable gate system of example 6, wherein the trolley is to be coupled to the bracket with a spring-loaded fastener, the spring-loaded fastener to urge the bracket away from the base post.

Example 8 includes the impactable gate system of example 3, wherein the drive strip is to extend into the first channel, the drive strip including protrusions to retain the drive strip within the second track.

Example 9 includes an apparatus comprising a rail to extend between a first track and a second track, movement of the rail between an open position and a closed position to be guided by the first and second tracks, a base post to support the first track, and a bracket to be coupled to an end of the rail, the bracket to be within the base post when the rail is in the closed position, the bracket to remain spaced apart from the first track when the rail moves between the open position and the closed position, the bracket to be urged toward the base post in response to an impact with the rail.

Example 10 includes the apparatus of example 9, further including a drive strip to move along the first track, the rail to be coupled to the drive strip, the drive strip including protrusions to retain the drive strip within a first channel of the first track, the bracket to be retained within a second channel of the first track and external to the first channel of the first track.

Example 11 includes the apparatus of example 10, further including a trolley to be disposed within the first channel of the first track, the trolley to be coupled to the bracket with a spring-loaded fastener to urge the bracket away from the base post.

Example 12 includes the apparatus of example 10, further including a pin positioned in a body of the bracket, the rail rotatable about the pin.

Example 13 includes the apparatus of example 10, wherein the rail is a first rail, further including a second rail to extend between the first track and the second track, the second rail to be coupled to the drive strip, the first rail positioned at a first height, the second rail positioned at a second height greater than the first height.

Example 14 includes the apparatus of example 13, wherein the second rail is to be lower than a top edge of the base post when the first rail is in the closed position.

Example 15 includes the apparatus of example 13, wherein the end is a first end, the bracket coupled to a second end of the second rail.

Example 16 includes the apparatus of any one of examples 9-15, wherein the base post is a first base post, further including a second base post to support the second track, the second base post spaced apart from the first base post by a distance, and a perforated plate to couple the rail to at least one of the first track or the second track, the perforated plate including a plurality of holes, the rail selectively couplable to different ones of the plurality of holes based on the distance.

Example 17 includes the apparatus of example 16, wherein the base post includes first openings and the first track includes second openings, further including fasteners to be selectively inserted in different ones the first openings and different ones of the second openings to adjust a position of the first track relative to the base post.

Example 18 includes the apparatus of any one of examples 9-15, further including a barrier rail extending from the base post, the base post to support a first end of the barrier rail, and a rail post spaced apart from the base post, the rail post to support a second end of the barrier rails.

Example 19 includes the apparatus of example 18, wherein the barrier rail is one of a plurality of barrier rails, the plurality of barrier rails to define at least one of an aisle or a corral.

Example 20 includes the apparatus of any one of examples 9-15, wherein the base post is a first base post, the rail is a first rail, and further including a second rail to extend between a third track and a fourth track, movement of the second rail to be guided by the third and fourth tracks, and a second base post is to support both the second track and the third track.

Example 21 includes the apparatus of any one of examples 9-15, further including brush seals positioned along the first track, the rail slidable between the brush seals.

Example 22 includes an impactable gate system comprising a base post, a track to extend from the base post, a bracket to be slidably coupled to the track, and a rail to be rotatably coupled to and slidable with the bracket along the track, the rail to move between an open position and a closed position, the bracket to be within the base post when the rail is in the closed position, the bracket to be urged toward the base post when the rail rotates with respect to the bracket.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

The invention claimed is:

1. An impactable gate system comprising:

a first track to be coupled to a base post, the first track defining a first channel;

a second track within the first track, the second track defining a second channel;

a drive strip slidable along the first track;

a rail including a tube, the rail to move with the drive strip relative to the first track between an opened position and a closed position;

a bracket to be within the first track, the bracket to couple the rail to the drive strip, the bracket to be disposed within the base post when the rail is in the closed position; and a trolley to be within the second channel, the trolley to be coupled to the bracket with a spring-loaded fastener, the spring-loaded fastener to urge the bracket away from the base post.

2. The impactable gate system of claim 1, wherein the rail is a first rail, the tube is a first tube, further including a second rail spaced from the first rail along the drive strip, the second rail including:

a second tube;

a brace to be within the second tube, the brace having a length, a width, and a thickness, the thickness extending in a direction transverse to a direction of travel of the drive strip along the first track, the width greater than the thickness; and a sleeve to be coupled to the drive strip, the sleeve including a slotted hole, the second tube slidably coupled to the sleeve via the slotted hole.

3. The impactable gate system of claim 1, wherein the bracket is to be within the first channel, the bracket to be spaced from an internal surface of the first track when the impactable gate system is in a non-impacted state.

4. The impactable gate system of claim 3, wherein the bracket is to contact the internal surface of the first track when the impactable gate system is in an impacted state.

5. The impactable gate system of claim 1, wherein the drive strip is to extend into the first channel, the drive strip including protrusions to retain the drive strip within the second track.

6. An apparatus comprising:

a rail to extend between a first track and a second track, movement of the rail between an open position and a closed position to be guided by the first and second tracks;

a base post to support the first track;

a bracket to be coupled to an end of the rail, the bracket to be within the base post when the rail is in the closed position, the bracket to remain spaced apart from the first track when the rail moves between the open position and the closed position, the bracket to be urged toward the base post in response to an impact with the rail;

a drive strip to move along the first track, the rail to be coupled to the drive strip, the drive strip including protrusions to retain the drive strip within a first channel of the first track, the bracket to be retained within a second channel of the first track and external to the first channel of the first track; and a trolley to be within the first channel of the first track, the trolley to be coupled to the bracket with a spring-loaded fastener to urge the bracket away from the base post.

7. The apparatus of claim 6, further including a pin positioned in a body of the bracket, the rail rotatable about the pin.

8. The apparatus of claim 6, wherein the rail is a first rail, further including a second rail to extend between the first track and the second track, the second rail to be coupled to the drive strip, the first rail positioned at a first height, the second rail positioned at a second height greater than the first height.

9. The apparatus of claim 8, wherein the second rail is to be lower than a top edge of the base post when the first rail is in the closed position.

10. The apparatus of claim 8, wherein the end is a first end, the bracket coupled to a second end of the second rail.

11. The apparatus of claim 6, wherein the base post is a first base post, further including:

a second base post to support the second track, the second base post spaced apart from the first base post by a distance; and a perforated plate to couple the rail to at least one of the first track or the second track, the perforated plate including a plurality of holes, the rail selectively couplable to different ones of the plurality of holes based on the distance.

12. The apparatus of claim 11, wherein the base post includes first openings and the first track includes second openings, further including fasteners to be selectively inserted in different ones the first openings and different ones of the second openings to adjust a position of the first track relative to the base post.

13. The apparatus of claim 6, further including:

a barrier rail extending from the base post, the base post to support a first end of the barrier rail; and a rail post spaced apart from the base post, the rail post to support a second end of the barrier rails.

14. The apparatus of claim 13, wherein the barrier rail is one of a plurality of barrier rails, the plurality of barrier rails to define at least one of an aisle or a corral.

15. The apparatus of claim 6, wherein the base post is a first base post, the rail is a first rail, and further including:

a second rail to extend between a third track and a fourth track, movement of the second rail to be guided by the third and fourth tracks; and a second base post is to support both the second track and the third track.

16. The apparatus of claim 6, further including brush seals positioned along the first track, the rail slidable between the brush seals.

17. An impactable gate system comprising:

a base post;

a first track to extend from the base post;

a second track within the first track;

a bracket to be slidably coupled to and within the first track, the bracket to be external to the second track;

a rail to be rotatably coupled to and slidable with the bracket along the first track, the rail to move between an open position and a closed position, the bracket to be within the base post when the rail is in the closed position, the bracket to be urged toward the base post when the rail rotates with respect to the bracket; and a trolley to be coupled to the bracket, the trolley to be within the second track.

18. The impactable gate system of claim 17, wherein the first track includes an opening and a back surface that is opposite the opening, the opening extending along a length of the track, the second track to be proximate the back surface, the bracket between the opening and the second track.

19. The impactable gate system of claim 17, wherein the first track includes an opening and a back surface that is opposite the opening, the opening extending along a length of the track, the bracket to be urged against an inner surface of the first track in response to an impact with the rail, the inner surface facing towards the back surface.

20. The impactable gate system of claim 17, wherein the rail is to be external to the first track and coupled to the bracket via a plate extending through an opening defined along the first track.

21. The impactable gate system of claim 17, wherein the rail is to rotate relative to the bracket about an axis of rotation that extends along a longitudinal length of the first track.

22. The impactable gate system of claim 17, further including a drive strip that is to extend into the second track, the drive strip having a thickness between opposing first and second sides of the drive strip that is less than a width of an opening defined along a longitudinal length of the second track, the drive strip including protrusions on the opposing first and second sides of the drive strip, a combined thickness of the protrusions measured in a direction perpendicular to the first and second sides of the drive strip greater than the width of the opening.

* * * * *